US006735199B1

(12) United States Patent
Ofek

(10) Patent No.: US 6,735,199 B1
(45) Date of Patent: *May 11, 2004

(54) TIME FRAME SWITCHING RESPONSIVE TO GLOBAL COMMON TIME REFERENCE

(75) Inventor: Yoram Ofek, Riverdale, NY (US)

(73) Assignee: Synchrodyne Networks, Inc., Riverdale, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/536,811

(22) Filed: Mar. 28, 2000

Related U.S. Application Data

(60) Provisional application No. 60/164,437, filed on Nov. 9, 1999.

(51) Int. Cl.⁷ .............................................. H04L 12/28
(52) U.S. Cl. ...................................... 370/389; 370/517
(58) Field of Search ................................ 370/230, 235, 370/252, 253, 389, 392, 395, 396, 352, 353, 356, 413, 465, 503, 517

(56) References Cited

U.S. PATENT DOCUMENTS

| 4,821,259 A | * | 4/1989 | DeBruler et al. ........... 370/354 |
| 5,418,779 A | | 5/1995 | Yemini et al. .............. 370/256 |
| 5,455,701 A | * | 10/1995 | Eng et al. ...................... 398/54 |
| 6,246,701 B1 | * | 6/2001 | Slattery ....................... 370/503 |
| 6,563,837 B2 | * | 5/2003 | Krishna et al. ............. 370/413 |

OTHER PUBLICATIONS

Y. Ofek, "Integration Of Voice Communication On A Synchronous Optical Hypergraph", IEEE INFOCOM'88, 1988.
Li et al., "Time–Driven Priority: Flow Control For Real–Time Heterogeneous Internetworking", IEEE INFOCOM'96, 1996.
Li et al., "Pseudo–Isochronous Cell Forwarding", IEEE INFOCOM'94, pp. 1–19; 1994.
A. R. Jacob, "A Survey of Fast Packet Switches", Computer Communications Review, Jan. 1990, pp. 54–64.
Y. Ofek, "The Topology, Algorithms And Analysis Of A Synchronous Optical Hypergraph Architecture", Ph.D. Dissertation, Electrical Engineering Department, University of Illinois at Urbana, Report No. UIUCDCS–R–87 1343, May 1987.
A. G. Fraser, "Early Experiment with Asynchronous Time Division Networks", IEEE Networks, pp. 12–26, Jan. 1993.
A. Pattavina, "Non–blocking Architecture for ATM Switching", IEEE Communications Magazine, Feb. 1993, pp. 37–48.
John C. Bellamy, "Digital Network Synchronization", IEEE Communications Magazine, Apr. 1995, pp. 70–83.
E. W. Zegura, "Architecture for ATM Switching Systems", IEEE Communications Magazine, Feb. 1993, pp. 28–37.
A. Tannebaum, Computer Networks (3rd Ed.) Prentice Hall, 1996.

(List continued on next page.)

*Primary Examiner*—John Pezzlo
*Assistant Examiner*—Saba Tsegaye
(74) *Attorney, Agent, or Firm*—Sitrick & Sitrick

(57) ABSTRACT

A time frame switching method and system of data units that utilize a global common time reference, which is divided into a plurality of contiguous periodic time frames. The system is designed to operate with high-speed wavelength division multiplexing (WDM) links, i.e., with multiple lambdas. The plurality of data units that are contained in each of the time frames are forwarded in a pipelined manner through the network switches, and can be switched from any incoming WDM channel to any subset of outgoing WDM channels responsive to the global common time reference. The outcome of this switching method is called fractional lambda switching.

34 Claims, 50 Drawing Sheets

OTHER PUBLICATIONS

S.J.Golestani, "A Framing Strategy for Congestion Management", *IEEE Journal on Selected Areas in Communications,* vol. 9, No. 7, Sep. 1991, pp. 1064–1077.

Li et al., "Pseudo–isonchronous Cell Forwarding", *Computer Networks and ISDN Systems,* vol. 30 (1998), pp. 2359–2372.

Li et al., "Time–driven Priority' Flow Control for Real–time Heterogeneous Internetworking", *Proceedings of Infocom,* vol. 15, Los Alamitos, CA, Mar. 1996, pp. 189–197.

A. Pattavina, "Switching Theory: Architecture and Performance in Broadband ATM Networks", John Wiley & Sons, NY (1998), table of contents.

Nichols, et al. "Definition of the Differnetiated Services Field (DS Field) in the IPv4 and Ipv6 Headers", Network Working Group Request for Comments 2474, Dec. 1998, pp. 120–.

Kamiyama, et al., "Quasi–STM Transmission Method Based on ATM Network," IEEE GLOBECOM'94, 1994, pp. 1808–1814.

Mills, et al., "Final Report on the Highball Project," Technical Report 95–4–1, University of Delaware, Apr. 1995.

Awdeh, et al., "Survey of ATM Switch Architectures," Computer Networks and ISDN Systems, No. 27, 1995, pp. 1567–1613.

Broomell, et al., "Classification Categories and Historical Development of Switching Fabric Topologies," Computing Surveys, vol. 15, No. 2, Jun. 1983.

Ahmadi, et al., "A Survey of Modern High–Performance Switching Techniques," IEEE Journal on Selected Areas in Communications, vol. 7, No. 7, Sep. 1989.

T. G. Robertazzi, Editor, "Performance Evaluation of High Speed Switching Fabrics and Networks," IEEE Press, 1992.

Goke, et al., "Banyan Networks for Partitioning Multiprocessor Systems,"1st Annual Symposium on Computer Architecture, Dec. 1973, pp. 21–28.

Shiomoto, et al., "Dynamic Burst Transfer Time–Slot–Base Network," IEEE Communications Magazine, Oct. 1999, pp. 88–96.

Bohm, et al., "The DTM Gigabit Network," Journal of High Speed Networks, vol. 3, No. 2, 1994.

Bohm, et al., "Fast Circuit Switching for the Next Generation of High Performance Networks," IEEE Journal on Selected Areas in Communications, vol. 14, No. 2, pp. 298–305, Feb. 1996.

* cited by examiner

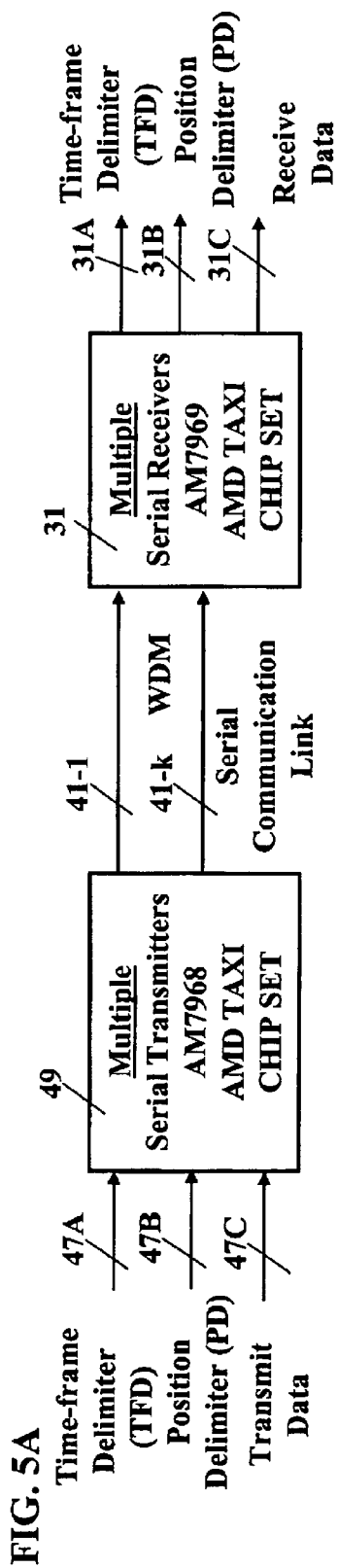

Every buffer $B_i$ has a table, $TB_i$ with an entry for every data packet - each entry has the following parameters:
- $B_i$ - the global time for switching out of this buffer (for B-1, ..., B-k' there is a one-to-one mapping to CTR 002)
- I# - the input port # and O# - the output port #
- POS - the position of the data packet # in the buffer: 1, 2, 3 ...
- P1/P2 - the priority or type of the data packet
- S - the # of data units in the data packet

Input request message - 61:
One request for every switched packet
Thus, multiple requests for multicast packet $<B_i, I\#, O\#, POS=1, P1/P2, S>$
$<B_i, I\#, O\#, POS=2, P1/P2, S>$
...

Input schedule message - 62: $<B_j, I\#, O\#, POS=1, P1/P2, S(s1, s2, ...)$
(list of schedule time slots - for each data unit) >
$<B_i, I\#, O\#, POS=2, P1/P2, S (s1, s2, ...)$
(list of schedule time slots - for each data unit) >
...

Input reject message - 63: $<B_i, I\#, O\#, POS=1, P1/P2, S>$
$<B_i, I\#, O\#, POS=2, P1/P2, S>$
...

The following phases - typically, each phase takes one time frame (TF):

| Phase 1) TF(t) - receive data packet, route (FIG. 8, computation steps 35-01 to 35-04), and schedule (FIG. 11, computation steps 36-03 to 36-07) | |
|---|---|
| Phase 2) TF(t+1) - the packet scheduling and rescheduling controller 36A sends an input request message 61 (FIG. 12) to switch scheduling controller 60. The switch scheduling controller 60 computes the schedule and returns input schedule message 62 to the select buffer and congestion controller 36D. | Possibly more times for rescheduling of: VBR, MCST (multicast) and "Best Effort") - after receiving Input reject message 63 |
| Phase 3) TF(t+2) - The select buffer and congestion controller 36D forwards the data units to the output port 40 via switching fabric 50 according to the input schedule message 62. | |
| Phase 4) TF(t+3) - The output port 40 forward the data packet received during TF(t+2) via the serial transmitter 49. | |

FIG. 14

FIG. 21
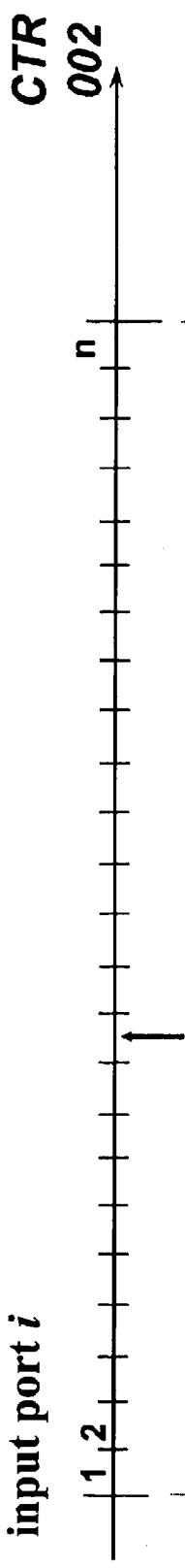
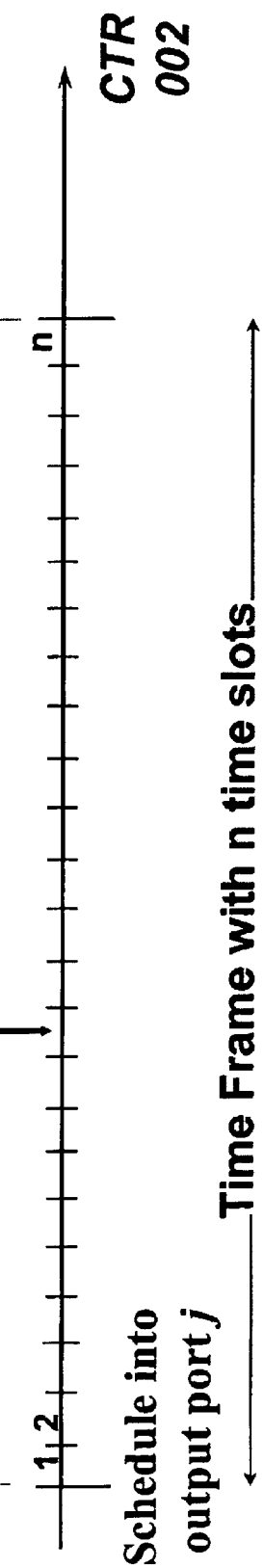

FIG. 27

Mapping: $(p\text{-}in, w\text{-}in, t\text{-}in, c\text{-}in)$ TO $(p\text{-}out, w\text{-}out, t\text{-}switch, c\text{-}switch\ t\text{-}out, c\text{-}out)$

2710 —

- $p\text{-}in$ - input port #
- $w\text{-}in$ - input wavelength (color)
- $t\text{-}in$ - time frame # in (within a time cycle)
- $c\text{-}in$ - time cycle # in (within a super cycle)

2720 —

- $p\text{-}out$ - output port #
- $w\text{-}out$ - output wavelength (color)
- $t\text{-}switch$ - time frame # switch (within a time cycle)
- $c\text{-}switch$ - time cycle # switch (within a super cycle)
- $t\text{-}out$ - time frame # out (within a time cycle)
- $c\text{-}out$ - time cycle # out (within a super cycle)

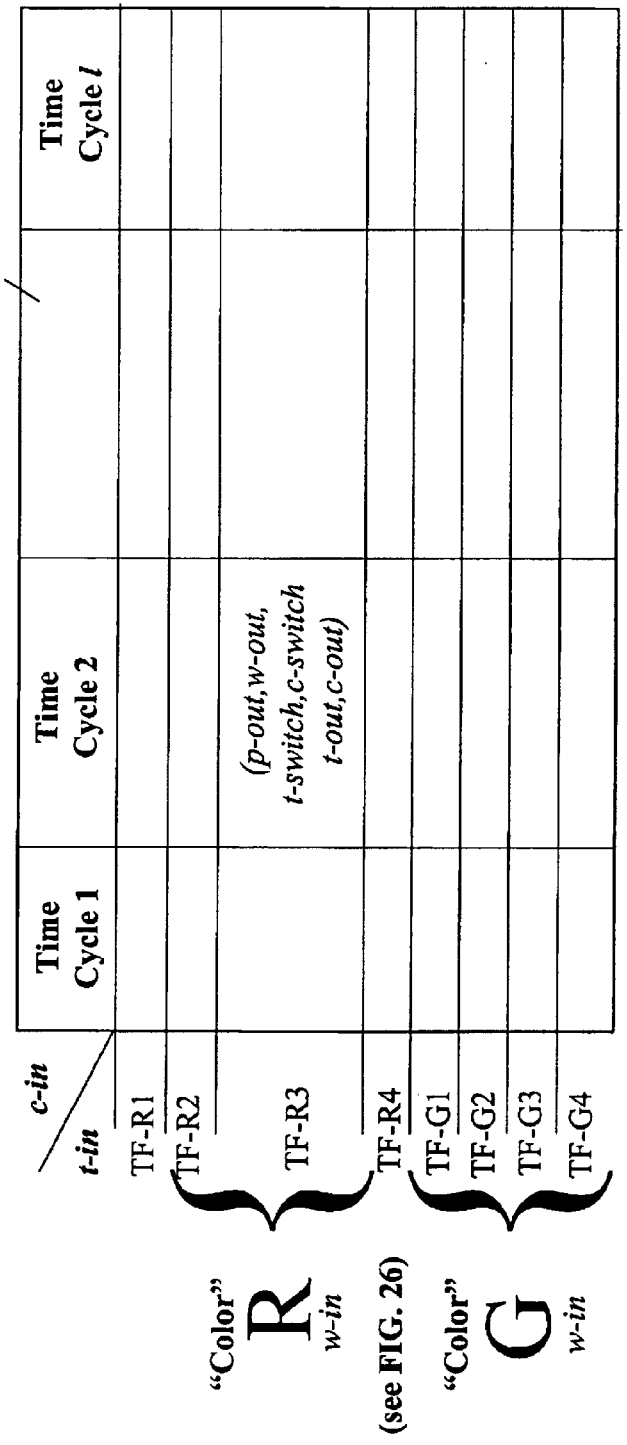

Time frame switching for a given: $p\text{-}in$

FIG. 30

Optical switching & forwarding of time frames

Mapping: *(p-in, w-in, t-in, c-in)* TO *(p-out, w-out, t-out, c-out)* — 3010

- *p-in* - input port #
- *w-in* - input wavelength (color)
- *t-in* - time frame # in (within a time cycle)
- *c-in* - time cycle # in (within a super cycle)

- *p-out* - output port #
- *w-out* - output wavelength (color)
- *t-out* - time frame # out (within a time cycle)
- *c-out* - time cycle # out (within a super cycle)

— 3020

Basic principle: In every time frame within a time cycle and within a super cycle, an input wavelength is switched to a selected defined subset of out-going optical channels — 3030

Table for a given: *w-in* and *p-in*

Time cycle with 4 time frames

Super cycle with 4 time cycles

| | c-in-1 | c-in-2 | c-in-3 | c-in-4 |
|---|---|---|---|---|
| t-in-1 | | | | |
| t-in-2 | | | | |
| t-in-3 | | | p-out,w-out t-out,c-out | |
| t-in-4 | | | | |

— 3000

Optical switch:

Optical transmission and switching pattern:

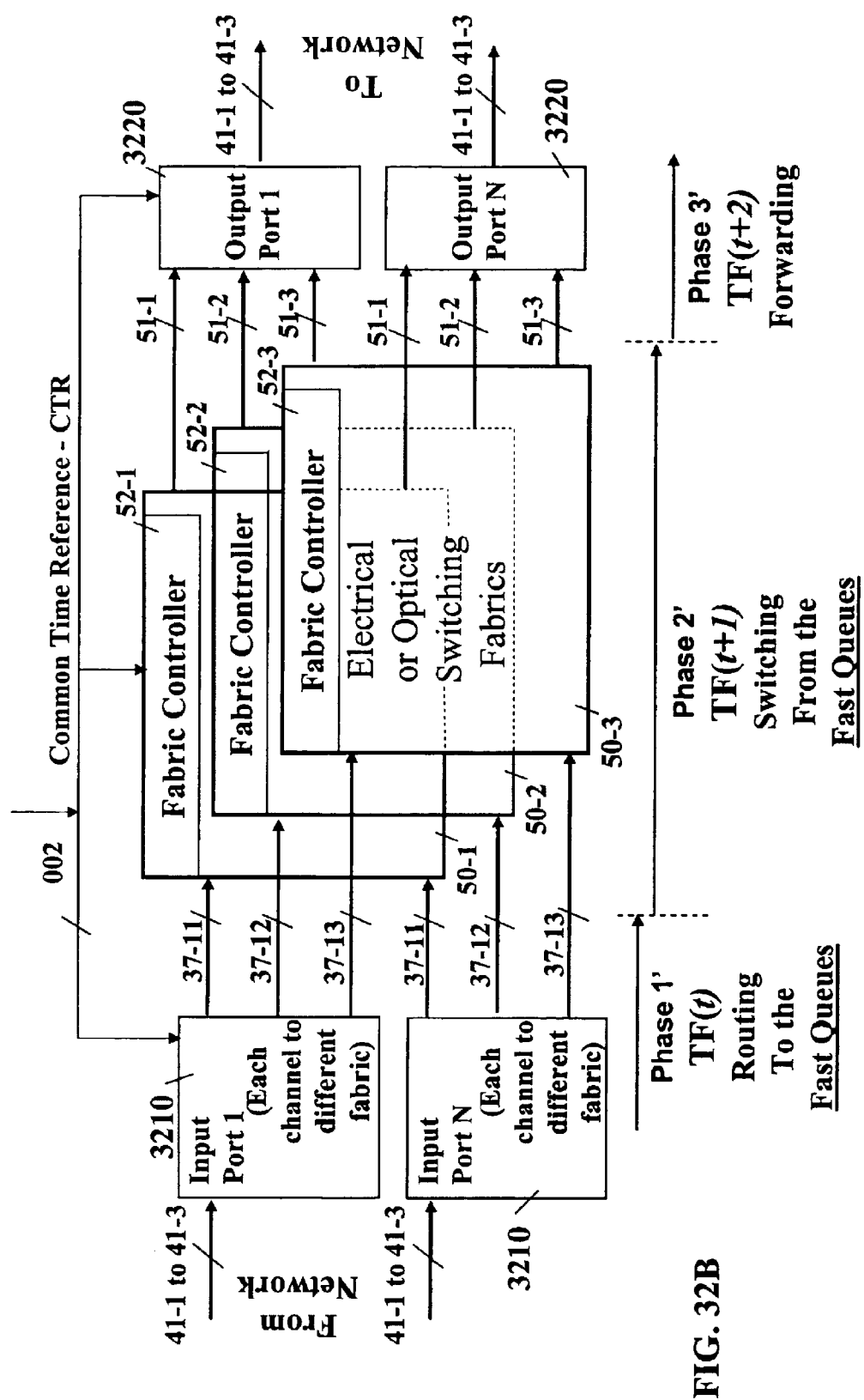

Straight Connection of a 2-by-2 Switching Block

Cross Connection of a 2-by-2 Switching Block

TIME FRAME SWITCHING RESPONSIVE TO GLOBAL COMMON TIME REFERENCE

RELATED APPLICATIONS

This application is a continuation of provisional application serial No. 60/164,437 filed Nov. 9, 1999.

FEDERALLY SPONSORED RESEARCH OR DEVELOPMENT

Not Applicable.

BACKGROUND OF THE INVENTION

This invention relates generally to a method and apparatus for switching of data packets in a communications network in a timely manner while providing low switching complexity and performance guarantees.

Circuit-switching networks, which are still the main carrier for real-time traffic, are designed for telephony service and cannot be easily enhanced to support multiple services or carry multimedia traffic. Its almost synchronous byte switching enables circuit-switching networks to transport data streams at constant rates with little delay or jitter. However, since circuit-switching networks allocate resources exclusively for individual connections, they suffer from low utilization under bursty traffic. Moreover, it is difficult to dynamically allocate circuits of widely different capacities, which makes it a challenge to support multimedia traffic. Finally, the almost synchronous byte switching of SONET, which embodies the Synchronous Digital Hierarchy (SDH), requires increasingly more precise clock synchronization as the lines speed increases [John C. Bellamy, "Digital Network Synchronization", IEEE Communications Magazine, April 1995, pages 70–83].

Packet switching networks like IP (Internet Protocol)-based Internet and Intranets [see, for example, A. Tannebaum, Computer Networks (3rd Ed.) Prentice Hall, 1996] handle bursty data more efficiently than circuit switching, due to their statistical multiplexing of the packet streams. However, current packet switches and routers operate asynchronously and provide "best effort" service only, in which end-to-end delay and jitter are neither guaranteed nor bounded. Furthermore, statistical variations of traffic intensity often lead to congestion that results in excessive delays and loss of packets, thereby significantly reducing the fidelity of real-time streams at their points of reception.

Efforts to define advanced services for both IP and ATM (Asynchronous Transfer Mode) networks have been conducted in two levels: (1) definition of service, and (2) specification of methods for providing different services to different packet streams. The former defines interfaces, data formats, and performance objectives. The latter specifies procedures for processing packets by hosts and switches/routers. The types of services defined for ATM include constant bit rate (CBR), variable bit rate (VBR) and available bit rate (ABR).

The methods for providing different services with packet switching fall under the general title of Quality of Service (QoS). The latest effort in QoS provision over the Internet is carried on by the Differentiated Services (DiffServ) Working Group of the Internet Engineering Task Force (ETF). DiffServ is working on providing QoS on a per-class basis, i.e., each switch provides a different service to packets belonging to different classes. The class to which a packet belongs is identified by a field in the IP packet's header. The DiffServ Working Group has re-defined the usage of the field originally called Type Of Service and has re-named the field DS (Differentiated Services) byte [K. Nichols, S. Blake, F. Baker, D. Black, "Definition of the Differentiated Services Field (DS Field) in the IPv4 and IPv6 Headers," IETF Request for Comment RFC 2474, December 1998].

DiffServ relies on (i) a relatively small set of generic Per Hop Behavior (PHB), which define ways for individual switches to perform packet forwarding, and (ii) access control at the boundary of the network. A switch is configured to apply a specific PHB to each service class (i.e., switches are configured with a mapping between DS field value and corresponding PHB). A number of transport services can be built on those PHBs, including premium service, which is expected to deliver packets end-to-end within short delay and with low loss. One approach to an optical network that uses synchronization was introduced in the synchronous optical hypergraph [Y. Ofek, "The Topology, Algorithms And Analysis Of A Synchronous Optical Hypergraph Architecture", Ph.D. Dissertation, Electrical Engineering Department, University of Illinois at Urbana, Report No. UIUCDCS-R-87 1343, May 1987], which also relates to how to integrate packet telephony using synchronization [Y. Ofek, "Integration Of Voice Communication On A Synchronous Optical Hypergraph", IEEE INFOCOM'88, 1988]. In the synchronous optical hypergraph, the forwarding is performed over hyper-edges, which are passive optical stars. In [Li et al., "Pseudo-Isochronous Cell Switching In ATM Networks", IEEE INFOCOM'94, pp. 428–437, 1994; Li et al., "Time-Driven Priority: Flow Control For Real-Time Heterogeneous Internetworking", IEEE INFOCOM'96, 1996] the synchronous optical hypergraph idea was applied to networks with an arbitrary topology and with point-to point links. The two papers [Li et al., "Pseudo-Isochronous Cell Switching In ATM Networks", IEEE INFOCOM'94, pages 428–437, 1994; Li et al., "Time-Driven Priority: Flow Control For Real-Time Heterogeneous Internetworking", IEEE INFOCOM'96, 1996] provide an abstract (high level) description of what is called "RISC-like forwarding", in which a packet is forwarded, with little if any details, one hop every time frame in a manner similar to the execution of instructions in a Reduced Instruction Set Computer (RISC) machine.

Q-STM (Quasi-Synchronous Transfer Mode) [N. Kamiyama, C. Ohta, H. Tode, M. Yamamoto, H. Okada, "Quasi-STM Transmission Method Based on ATM Network," IEEE GLOBECOM'94, 1994, pages 1808–1814] uses a frame/subframe/slot structure to regulate the forwarding of ATM cells through the network. However, the authors do not suggest or mention the deployment of a common time reference, or the capability to transport variable size data packet, or the ability to combine "best effort" and variable bit rate (VBR) traffic types.

In U.S. Pat. No. 5,418,779 Yemini et al. disclose a switched network architecture with a time reference. The time reference is used in order to determine the time in which multiplicity of nodes can transmit simultaneously over one predefined routing tree to one destination. At every time instance the multiplicity of nodes are transmitting to a different single destination node. However, the patent does not teach or suggest the synchronization requirements among nodes, or the means in which it can be provided, or the method in which it can be used.

In the context of the Highball Project [D. L. Mills, C. G. Boncelet, J. G. Elias, P. A. Schragger, A. W. Jackson, A. Thyagarajan, "Final Report on the Highball Project," Technical Report 95-4-1, University of Delaware, April 1995] a network intended for a moderate number of users (10–100) was developed, deployed, and tested. Nodes are synchronized and transmission resources are reserved to flows so that packets always find output links available on every node traversed. No queuing is performed inside nodes; all queuing is done at the periphery of the network. This requires higher accuracy in the synchronization among nodes and affects the robustness of the system.

Architectures for data packet switching have been extensively studied and developed in the past three decades, see for example [A. G. Fraser, "Early Experiment with Asynchronous Time Division Networks", IEEE Networks, pp. 12–26, January 1993]. Several surveys of packet switching fabric architectures can be found in: [R. Y. Awdeh, H. T. Mouftah, "Survey of ATM Switch Architectures," Computer Networks and ISDN Systems, No. 27, 1995, pages 1567–1613; E. W. Zegura, "Architecture for ATM Switching Systems", IEEE Communications Magazine, February 1993, pages 28–37; A. Pattavina, "Non-blocking Architecture for ATM Switching", IEEE Communications Magazine, February 1993, pages 37–48; A. R. Jacob, "A Survey of Fast Packet Switches", Computer Communications Review, January 1990, pages 54–64].

Circuit switches exclusively use time for routing. A time period is divided into smaller time slices, each possibly containing one byte. The absolute position of each time slice within each time period determines where that particular byte is routed.

In accordance with one aspect of the present invention, time-based routing is supported with more complex periodicity in timing than circuit switching provides for. The time frames of the present invention delineate a vastly larger time period than the cycle time (i.e., the time slices) associated with circuit switching. The present invention also supports routing based on packet headers, which circuit switching cannot provide for.

Moreover, the present invention uses Common Time Reference (CTR). The CTR concept is not used in circuit switching (e.g., T1, T3, and the SONET circuit switching: OC-3, OC-12, OC-48, OC-192, and OC-768). Using or not using CTR has far reaching implications when comparing circuit switching and the current invention. For example, CTR ensures deterministic no slip of time slots or time frames, while enabling deterministic pipeline forwarding of time frames. This is in contrast to circuit switching, where (1) there are time slot slips, and (2) deterministic pipeline forwarding is not possible.

Several surveys of switching fabric architectures and interconnection networks can be found in: [G. Broomell, J. R. Heath, "Classification Categories and Historical Development of Switching fabric Topologies," Computing Surveys, Vol. 15, No. 2, June 1983; H. Ahmadi, W. E. Denzel, "A Survey of Modem High-Performance Switching Techniques," IEEE Journal on Selected Areas in Communications, Vol. 7, No. 7, September 1989; T. G. Robertazzi Editor, "Performance Evaluation of High Speed Switching Fabrics and Networks," IEEE Press, 1992; A. Pattavina, "Switching Theory", John Wiley & Sons, 1998].

Optical data communications include single wavelength standards, wherein a single data stream is transduced into a series of pulses of light carried by an optical fiber from source to destination. These pulses of light are generally of a uniform wavelength. This single wavelength vastly underutilizes the capacity of the optical fiber, which may reasonably carry a large number of signals each at a unique wavelength. Due to the nature of propagation of light signals, the optical fiber can carry multiple wavelengths simultaneously with no degradation of signal, no interference, and no crosstalk imposed by the optical fiber. The process of carrying multiple discrete signals via separate wavelengths of light on the same optical fiber is known in the art as wavelength division multiplexing (WDM). Logically, wavelength division multiplexing may be thought of as equivalent to multiple single wavelength communications conducted in parallel, but the physical implementation does not require multiple optical fibers and therefore realizes cost savings.

The present invention permits a novel combination of time-based routing, which is similar but not identical to circuit switching, combined with data packet forwarding as in packet switching. This combination provides for communication of data via a reserved time frame mechanism, where time frames periods permit communications of a very large number of bytes that are scheduled and switched in a time-based fashion within reserved and scheduled time frames, while simultaneously providing for non-scheduled data packet (NSDP) traffic to be switched and routed via the same WDM (wavelength division multiplexing) optical channels. The non-scheduled data packet (NSDP) traffic can be transmitted during empty portions of an otherwise partially reserved and scheduled time frame period. The non-scheduled traffic can also be routed during fully reserved and scheduled time frame periods that have no scheduled traffic presently associated with them. Finally, NSDPs can be routed during unreserved time frames. The system can decode and be responsive to the control information in the non-scheduled data packet header.

There is a growing disparity between the data transfer speeds and throughput associated with the backbone or core of large networks, which may be in the range of one to tens of gigabits per second, and the data transfer speeds and throughput associated with end-user or node connections, which may be in the range of tens to hundreds of kilobits per second. Switching systems that function efficiently at the slow speeds required by end-user or node connections do not scale linearly or in a cost-effective manner to high speed and high performance variants. Existing circuit switches have additional problems as discussed above, in that with increasing data speeds comes a corresponding requirement for more accurate clocking.

Unlike a circuit switch that might potentially require switching a different route for each byte, the time frame switching in the present invention provides a novel mode of operation where the connection between an input port and an output port is only changed infrequently, such as on a time frame by time frame basis. This mode of operation is an enabling technology to utilize purely optical switching apparatus, as it circumvents the problems typically associated with long switching cycle time.

Moreover, the present invention enables the utilization of very simple interconnection networks such as Banyan Networks [L. R. Goke, G. J. Lipovski, "Banyan Networks for Partitioning Multiprocessor Systems," 1st Annual Symposium on Computer Architecture, December 1973, pages 21–28] whose utilization in other systems may not be advisable due to their blocking features.

The Dynamic Burst Transfer Time-Slot-Base Network (DBTN) [K. Shiomoto, N. Yamanaka, "Dynamic Burst Transfer Time-Slot-Base Network," IEEE Communications Magazine, October 1999, pages 88–96] is based on circuit switching. A circuit is created on-the-fly when the first packet of a burst is presented to the network; the first and subsequent packets are transported through the network over such circuit.

Dynarc and Net Insight, two Sweden based companies, commercialize switches for Metropolitan Area Networks (MANs) based on Dynamic synchronous Transfer Mode (DTM) [C. Bohm, P. Lindgren, L. Ramfelt, P. Sjödin, "The DTM Gigabit Network," Journal of High Speed Networks, Vol. 3, No. 2, 1994. C.Bohm, M. Hidell, P. Lindgren, L. Ramfelt, P. Sjödin, "Fast Circuit Switching for the Next Generation of High Performance Networks," IEEE Journal on Selected Areas in Communications, Vol. 14, No. 2, pages 298–305, February 1996.] DTM deploys a structure of frames and small slots (64 bits) to perform resource allocation and circuit switching. Slots are allocated to the end-systems according to a predefined distribution; a distributed algorithm based on the deployment of control slots is used to reallocate unused slots.

SUMMARY OF THE INVENTION

In accordance with the present invention, a fast switching method is disclosed and is tailored to operate responsive to a global common time such that the switching delay from input to output is known in advance and is minimized in a deterministic way. Consequently, such a switch can be employed in the construction of a backbone network using optical fibers with dense wavelength division multiplexing (DWDM). Such optical fiber links have a transmission rate, with multiple wavelengths, of a few terabits (1012) per second.

The design method disclosed in this invention minimizes the time required for the routing decision and switching of every data packet. Consequently, for a given solid state technology, memory access time and memory word width, this method can support the highest speed optical DWDM links. Moreover, the above is independent of the number of switch ports.

The switching and data packet forwarding method combines the advantages of both circuit and packet switching. It provides for allocation and exclusive use of transmission capacity for predefined connections and for those connections it guarantees loss free transport with low delay and jitter. When predefined connections do not use their allocated resources, other non-reserved data packets can use them without affecting the performance of the predefined connections.

Under the aforementioned prior art methods for providing packet switching services, switches and routers operate asynchronously. The present invention provides real-time services by synchronous methods that utilize a time reference that is common to the switches and possibly end stations comprising a wide area network. The common time reference can be realized by using UTC (Coordinated Universal Time), which is globally available via, for example, GPS (Global Positioning System—see, for example: [Peter H. Dana, "Global Positioning System (GPS) Time Dissemination for Real-Time Applications", Real-Time Systems, 12, pp. 9–40, 1997]. By international agreement, UTC is the same all over the world. UTC is the scientific name for what is commonly called GMT (Greenwich Mean Time), the time at the 0 (root) line of longitude at Greenwich, England. In 1967, an international agreement established the length of a second as the duration of 9,192,631,770 oscillations of the cesium atom. The adoption of the atomic second led to the coordination of clocks around the world and the establishment of UTC in 1972. The Time and Frequency Division of the National Institute of Standards and Technologies (NIST) (see http://www.boulder.nist.gov/timefreq) is responsible for coordinating UTC with the International Bureau of Weights and Measures (BIPM) in Paris.

UTC timing is readily available to individual PCs through GPS cards. For example, TrueTime, Inc. (Santa Rosa, Calif.) offers a product under the trade name PCI-SG, which provides precise time, with zero latency, to computers that have PCI extension slots. Another way by which UTC can be provided over a network is by using the Network Time Protocol (NTP) [D. Mills, "Network Time Protocol" (version 3) IETF RFC 1305]. However, the clock accuracy of NTP is not adequate for inter-switch coordination, on which this invention is based.

In accordance with the present invention, the synchronization requirements are independent of the physical link transmission speed, while in circuit switching the synchronization becomes more and more difficult as the link speed increases. In accordance with the present invention, routing is not performed only based on timing information: routing can be based also on information contained in the header of data packets. For example, Internet routing can be done using IP addresses or using an IP tag/label when MPLS is deployed.

One embodiment of the present invention utilizes an alignment feature within an input port for aligning incoming data packets to a time frame boundary prior to entry to a switching fabric. This embodiment has the additional benefit of providing for filtering non-reserved traffic from the data packet stream and routing said traffic to a separate routing controller for best effort transport. The system decodes and is responsive to control information in the non-reserved data packet header. The remainder of the traffic represents reserved traffic that is first aligned to a time frame boundary and then routed through the switch fabric on a subsequent time frame, thus preserving the synchronous operation of the system. The present invention also provides means to reintegrate the filtered non-scheduled traffic into idle portions as may coexist within the scheduled traffic streams.

One embodiment of the present invention utilizes a deferred alignment feature, which permits the alignment of incoming data packets to be deferred after preliminary routing and queuing has been performed. This embodiment trades additional storage required for a larger plurality of queues for reduced complexity required in the switch fabric. The switch fabric becomes simpler because it is logically divided into a first portion and a second portion, the first portion of which can be relocated upstream of (i.e., before) the alignment buffer queues. By relocating the first portion to a position before the alignment buffer queues, the first portion of the switch fabric may be implemented as a simple data path expander to fan out the data to a large plurality of queues. The complexity and throughput requirements of each queue are also reduced as the functionality is spread out over a wider number of queues.

A novel control mode is provided by the present invention where a packet header comprises new in-band signal information to establish, maintain, and dis-establish (or destroy) a reserved traffic channel. The system decodes and is responsive to the control information in the data packet header. In this control mode, a specially designated data packet works as a "trailblazer" by signaling to each switch in a plurality of connected switches that it is the first of an expected train of associated data packets. The switches of the present invention respond if able by establishing a reserved data channel, a reserved transfer bandwidth, or by reserving capacity for the traffic associated with and following the specially designated data packet. In an analogous fashion, a terminating data packet signals to each switch in a plurality of connected switches that it is the last of a group or train of associated data packets. The switches of the present invention respond by destroying, reallocating, or reclaiming the data transfer capacity or bandwidth that had been made available to the train of data packets. Interstitial data packets within a train of data packets are marked as such to permit the switches to quickly and easily identify the data packet as one belonging to a scheduled and reserved train of data packets and to the corresponding reserved bandwidth or capacity. Data packets not having the special designations indicated above are treated in the conventional way, where they are generally but not exclusively carried on a best effort basis. Note that the in-band scheduling and reservation of the present novel control mode is independent of but operates concurrently and in cooperation with any other reserved traffic mechanism implemented in the switching systems.

A novel time frame switching fabric control is provided in accordance with an alternate embodiment of the present invention, which stores a predefined sequence of switch fabric configurations, responsive to a high level controller that coordinates multiple switching systems, and applies the stored predefined sequence of switch fabric configurations on a cyclical basis having complex periodicity. The application of the stored predefined switch fabric configurations permits the switches of the present invention to relay data over predefined, scheduled, and/or reserved data channels without the computational overhead of computing those schedules ad infinitum within each switch. This frees the switch computation unit to operate relatively autonomously to handle transient requests for local traffic reservation requests without changing the predefined switch fabric configurations at large, wherein the switch computation unit provides for finding routes for such transient requests by determining how to utilize underused switch bandwidth (i.e., "holes" in the predefined usage). The computational requirements of determining a small incremental change to a switch fabric are much less than having to re-compute the entire switch fabric configuration. Further, the bookkeeping operations associated with the incremental changes are significantly less time-consuming to track than tracking the entire state of the switch fabric as it changes over time.

These and other aspects and attributes of the present invention will be discussed with reference to the following drawings and accompanying specification.

BRIEF DESCRIPTION OF THE DRAWINGS

FIG. 5A is a schematic block diagram illustrating at least one serial transmitter and at least one serial receiver connected with a WDM link, in accordance with the present invention;

FIG. 5B is a table illustrating a 4B/5B encoding scheme for data;

FIG. 5C is a table illustrating a 4B/5B encoding scheme for control signals;

FIG. 12 illustrates details of the input request, input reject, and input schedule messages in accordance with the present invention;

FIG. 14 illustrates the four pipelined forwarding phases of forwarding data packets in accordance with the present invention;

FIG. 21 illustrates details of the scheduling computation of the switch scheduling controller in accordance with the present invention;

FIG. 27 illustrates multi-dimensional mapping with four input variables as an example: p-in—input port #, w-in—input wavelength (color), t-in—time frame # in (within a time cycle), c-in—time cycle # in (within a super-cycle); and four output variables: p-out—output port #, w-out—output wavelength (color), t-out—time frame # out (within a time cycle), c-out—time cycle # out (within a super-cycle) in accordance with the present invention;

FIG. 30 illustrates an example of multi-dimensional mapping for all time-driven optical switching with no wavelength conversion, the optical switching being responsive to the common time reference in accordance with the present invention;

FIG. 32A is a schematic diagram of a multiple fabric switch;

FIG. 32B is a timing diagram of a switching operation that is responsive to the common time reference 002 with three pipeline forwarding phases that enable the operation with the pre-computed schedules with the FAST Queuing Method;

DETAILED DESCRIPTION OF THE PREFERRED EMBODIMENT

Figure 1:
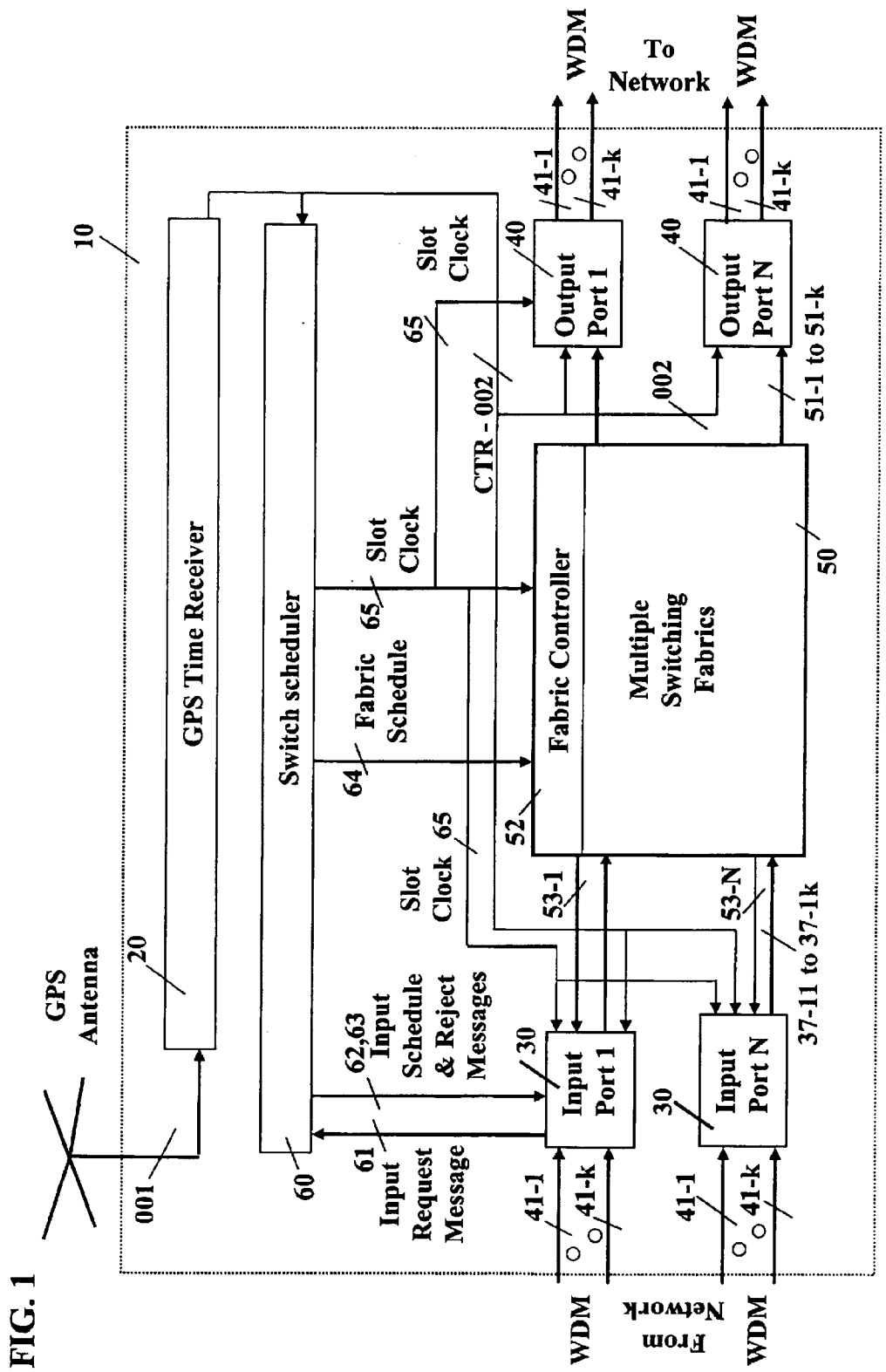
FIG. 1 is a schematic block diagram of one embodiment of a switch connected to a plurality of WDM links with a switch scheduler in accordance with the present invention.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

The present invention relates to a system and method for switching and forwarding data packets over a packet switching network with optical WDM (wavelength division multiplexing) links. The switches of the network maintain a common time reference (CTR), which is obtained either from an external source (such as GPS—Global Positioning System) or is generated and distributed internally. The common time reference is used to define time intervals, which include super-cycles, time cycles, time frames, time slots, and other kinds of time intervals. The time intervals are arranged both in simple periodicity and complex periodicity (like seconds and minutes of a clock).

A packet that arrives to an input port of a switch, is switched to an output port based on either specific routing information in the packet's header (e.g., IPv4 destination address in the Internet, VCI/VPI labels in ATM, MPLS-multi-protocol label switching-labels) or arrival time information. Each switch along a route from a source to a destination forwards packets in periodic time intervals that are predefined using the common time reference.

A time interval duration can be longer than the time duration required for communicating a data packet, in which case the exact position of a data packet in the time interval is not predetermined. A data packet is defined to be located within the time interval which contains the communication of the first bit of the packet, even if the length of the packet is sufficiently long to require multiple time intervals to communicate the entire data packet.

Data packets that are forwarded inside the network over the same route and in the same periodic time intervals constitute a virtual pipe and share the same pipe-ID or PID. A pipe-ID or PID can be either explicit, such as a tag or a label that is generated inside the network, or implicit such as a group of IP addresses or the combination of fields in the data packet header. A virtual pipe can be used to transport data packets from multiple sources and to multiple destinations. The time interval in which a switch forwards a specific packet is determined by the time it reaches the switch, the current value of the common time reference, and possibly the packet's pipe-ID.

A virtual pipe can provide deterministic quality of service guarantees. In accordance with the present invention, congestion-free packet switching is provided for pipe-IDs in which capacity in their corresponding forwarding links and time intervals is reserved in advance. Furthermore, packets that are transferred over a virtual pipe reach their destination in predefined time intervals, which guarantees that the delay jitter is smaller than or equal to one time interval.

Packets that are forwarded from one source to multiple destinations share the same pipe-ID and the links and time intervals on which they are forwarded comprise a virtual tree. This facilitates congestion-free forwarding from one input port to multiple output ports, and consequently, from one source to a multiplicity of destinations. Packets that are destined to multiple destinations reach all of their destinations in predefined time intervals and with delay jitter that is no larger than one time interval.

A system is provided for managing data transfer of data packets from a source to a destination. The transfer of the data packets is provided during a predefined time interval, comprised of a plurality of predefined time frames. The system is further comprised of a plurality of switches. A virtual pipe is comprised of at least two of the switches interconnected via communication links in a path. A common time reference signal is coupled to each of the switches, and a time assignment controller assigns selected predefined time frames for transfer into and out from each of the respective switches responsive to the common time reference signal. Each communications link may use a different time frame duration generated from the common time reference signal.

For each switch, there is a first predefined time frame and a first predefined wavelength within which a respective data packet is transferred into the respective switch, and a second predefined time frame and a second predefined wavelength within which the respective data packet is forwarded out of the respective switch, wherein the first and second predefined time frames may have different durations. The time assignment provides consistent fixed time intervals between the input to and output from the virtual pipe.

In a preferred embodiment, there is a predefined subset of the predefined time frames during which the data packets are transferred in the switch, and for each of the respective switches, there are a predefined subset of the predefined time frames during which the data packets are transferred out of the switch.

Each of the switches is comprised of one or a plurality of uniquely addressable input and output ports. A routing controller maps each of the data packets that arrives at each one of the input ports of the respective switch to a respective one or more of the output ports of the respective switch. Furthermore, each input port and each output port is comprised of one or a plurality of uniquely addressable optical WDM (wavelength division multiplexing) channels.

For each of the data packets, there is an associated time of arrival to a respective one of the input ports. The time of arrival is associated with a particular one of the predefined time frames. For each of the mappings by the routing controller, there is an associated mapping by a scheduling controller, which maps each of the data packets between the time of arrival and forwarding time out. The forwarding time out is associated with a specified predefined time frame.

In the preferred embodiment, there are a plurality of the virtual pipes comprised of at least two of the switches interconnected via communication links in a path. The communication link is a connection between two adjacent switches; and each of the communications links can be used simultaneously by at least two of the virtual pipes. Multiple data packets can be transferred utilizing at least two of the virtual pipes.

In one embodiment of the present invention, there is a fixed time difference, which is constant for all switches, between the time frames for the associated time of arrival and forwarding time out for each of the data packets. A predefined interval is comprised of a fixed number of contiguous time frames comprising a time cycle. Data packets that are forwarded over a given virtual pipe are forwarded from an output port within a predefined subset of time frames in each time cycle. Furthermore, the number of data packets that can be forwarded in each of the predefined subset of time frames for a given virtual pipe is also predefined.

The time frames associated with a particular one of the switches within the virtual pipe are associated with the same switch for all the time cycles, and are also associated with one of input into or output from the particular respective switch.

In one embodiment of the present invention, there is a constant fixed time between the input into and output from a respective one of the switches for each of the time frames within each of the time cycles. A fixed number of contiguous time cycles comprise a super-cycle, which is periodic. Data packets that are forwarded over a given virtual pipe are forwarded from an output port within a predefined subset of time frames in each super-cycle. Furthermore, the number of data packets that can be forwarded in each of the predefined subset of time frames within a super-cycle for a given virtual pipe is also predefined.

In the preferred embodiment, the common time reference signal is devised from the GPS (Global Positioning System), and is in accordance with the UTC (Coordinated Universal Time) standard. The UTC time signal does not have to be received directly from GPS. Such signal can be received by using various means, as long as the delay or time uncertainty associated with that UTC time signal does not exceed half a time frame.

In one embodiment, the super-cycle duration is equal to one second as measured using the UTC (Coordinated Universal Time) standard. In an alternate embodiment the super-cycle duration spans multiple UTC seconds. In another alternate embodiment the super-cycle duration is a fraction of a UTC second. In a preferred embodiment, the super-cycle duration is a small integer number of UTC seconds.

Data packets can be Internet Protocol (IP) data packets, multi-protocol label switching (MPLS) data packets, Frame Relay frames, fiber channel data units, or asynchronous transfer mode (ATM) cells, and can be forwarded over the same virtual pipe having an associated pipe identification (PID). The PID can be explicitly contained in a field of the packet header, or implicitly given by an Internet protocol (IP) address, Internet protocol group multicast address, a combination of values in the IP and/or transport control protocol (TCP) and/or user datagram protocol (UDP) header and/or payload, an MPLS label, an asynchronous transfer mode (ATM) virtual circuit identifier (VCI), and a virtual path identifier (VPI), or used in combination as VCI/NPI.

The routing controller determines two possible associations of an incoming data packet: (i) the output port, and (ii) the time of arrival (ToA). The ToA is then used by the scheduling controller for determining when a data packet should be forwarded by the select buffer controller to the next switch in the virtual pipe. The routing controller utilizes at least one of Pipe-ID, Internet protocol version 4 (IPv4), Internet protocol version 6 (IPv6) addresses, Internet protocol group multicast address, Internet MPLS (multi protocol label swapping or tag switching) labels, ATM virtual circuit identifier and virtual path identifier (VCI/(VPI), and IEEE 802 MAC (media access control) addresses, for mapping from an input port to an output port. The mapping from an input port to an output port can also be determined, solely or in conjunction with the foregoing information, according to the ToA of the data packet.

Each of the data packets is comprised of a header, which can include an associated time stamp. For each of the mappings by the routing controller, there is an associated mapping by the scheduling controller, of each of the data packets between the respective associated time stamp and an associated forwarding time, which is associated with one of the predefined time frames. The time stamp can record the time at which a packet was created by its application.

In one embodiment, the time stamp is generated by the Internet real-time protocol (RTP) entity within a predefined one of the sources or switches. The time stamp can be used by a scheduling controller in order to determine the forwarding time of a data packet from an output port.

Each of the data packets originates from a source or an end station, and the time stamp is generated at the respective end station for inclusion in the respective originated data packet. Such generation of a time stamp can be derived from UTC either by receiving it directly from GPS or by using the Internet's Network Time Protocol (NTP). The time stamp can alternatively be generated at the sub-network boundary, which is the point at which the data enters the synchronous virtual pipe.

In accordance with one aspect of the present invention, a system is provided for transferring data (packets) across a data network while maintaining for reserved data traffic constant bounded jitter (or delay uncertainty) and no congestion-induced loss of data (packets). Such properties are essential for many multimedia applications, such as, telephony and video teleconferencing.

Figure 3:
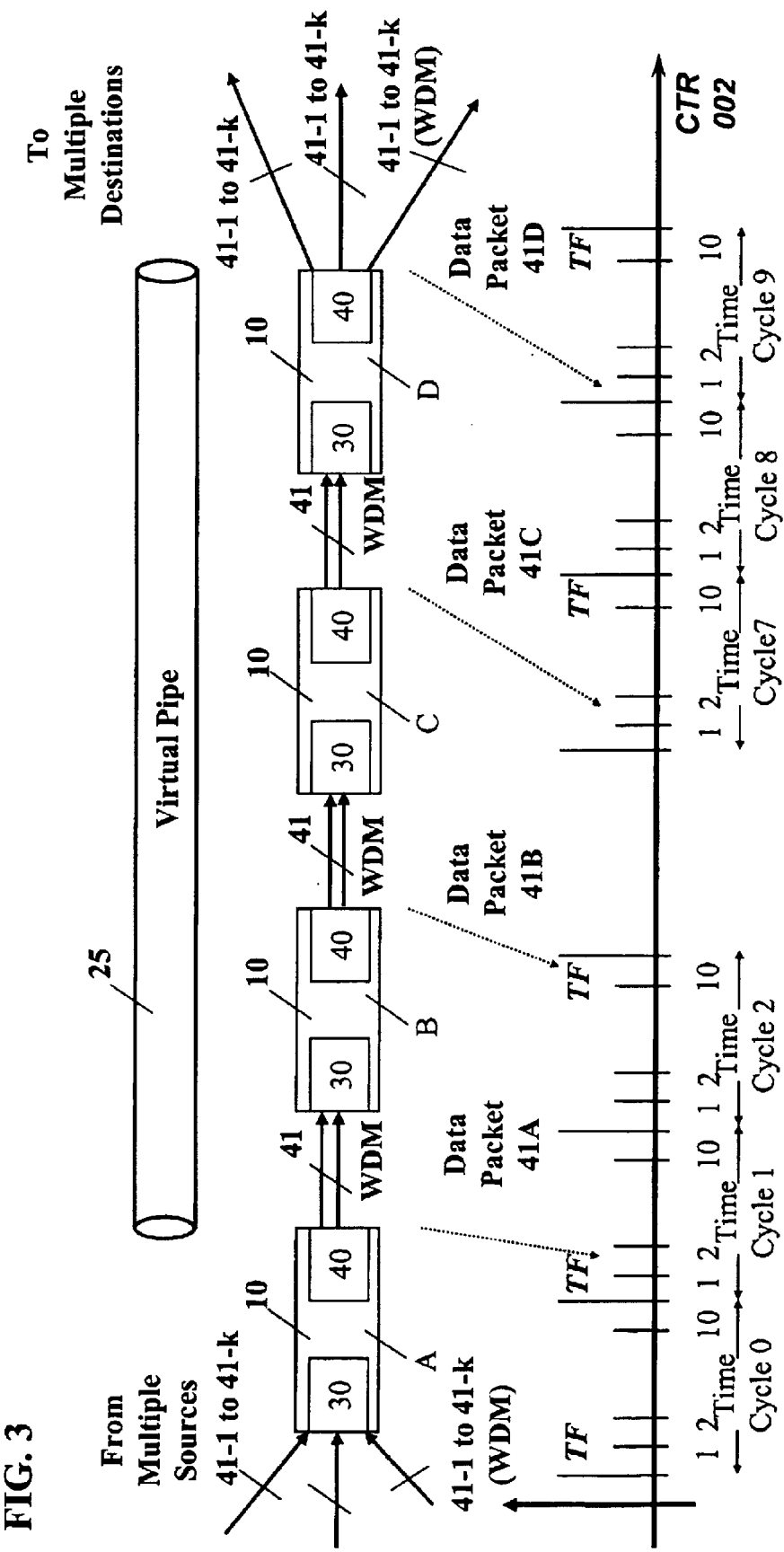
FIG. 3 is a schematic block diagram of a virtual pipe and its timing relationship with a common time reference (CTR) as in the present invention.

In accordance with one aspect of an illustrated implementation of the present invention, one or a plurality of virtual pipes 25 are provided, as shown in FIG. 3, over a data network with general topology. Such data network can span the globe. Each virtual pipe 25 is constructed over one or more switches 10, shown in FIG. 3, which are interconnected via communication links 41 in a path.

FIG. 3 is a schematic illustration of a virtual pipe and its timing relationship with a common time reference (CTR), wherein delay is determined by the number of time frames between the forward time out at Node A and the forward time out at Node D. Each virtual pipe 25 is constructed over one or more switches 10 which are interconnected via communication links 41 in a path.

FIG. 3 illustrates a virtual pipe 25 from the output port 40 of switch A, through switches B and C. The illustrated virtual pipe ends at the output port 40 of node D. The virtual pipe 25 transfers data packets from at least one source to at least one destination.

The data packet transfers over the virtual pipe 25 via switches 10 are designed to occur during a plurality of predefined time intervals, wherein each of the predefined time intervals is comprised of a plurality of predefined time frames. The timely transfers of data packets are achieved by coupling a common time reference signal (not shown) to each of the switches 10.

An output port 40 is connected to a next input port 30 via a communication link 41, as shown in FIG. 3. The communication link can be realized using various technologies compatible with the present invention including fiber optic conduits with WDM (wavelength division multiplexing) channels, copper and other wired conductors, and wireless communication links—including but not limited to, for example, radio frequency (RF) between two ground stations, a ground station and a satellite, and between two satellites orbiting the earth, microwave links, infrared (IR) links, optical communications lasers. The communication link does not have to be a serial communication link. A parallel communication link can be used—such a parallel link can simultaneously carry multiple data bits, associated clock signals, and associated control signals.

FIG. 1 is a schematic block diagram of one embodiment of an SVP switch with a switch scheduler in accordance with the present invention. The SVP switch 10 comprises a common time reference means 20, at least one input port 30, at least one output port 40, a switching fabric 50 with a fabric controller 52, and a switch scheduler 60. In the preferred embodiment, the common time reference means 20 is a GPS receiver which receives a source of common time reference 001 (e.g., UTC via GPS) via an antenna as illustrated. The common time reference means 20 provides a common time reference signal 002 to all input ports 30, all output ports 40, and the switch scheduler 60. GPS time receivers are available from a variety of manufacturers, such as, TrueTime, Inc. (Santa Rosa, Calif.). With such equipment, it is possible to maintain a local clock with accuracy of ±1 microsecond from the UTC (Coordinated Universal Time) standard everywhere around the globe.

Each respective one of the input ports 30 is coupled to the switch scheduler 60 and to the switching fabric 50 with a fabric controller 52. Each respective one of the output ports 40 is coupled to the switch scheduler 60 and to the switching fabric 50. The fabric controller 52 is additionally coupled to the switch scheduler 60.

The switch scheduler 60 supplies a slot clock signal 65 to each respective one of the input ports 30 and each respective one of the output ports 40. The slot clock is an indication of time slots within a single time frame. The switch scheduler 60 also supplies input schedule messages 62 and input reject messages 63 to each respective one of the input ports 30. Each respective one of the input ports 30 supplies input request messages 61 to the switch scheduler 60. The switch scheduler 60 also supplies a fabric schedule 64 to the fabric controller 52.

The switch scheduler 60 is constructed of a central processing unit (CPU), a random access memory (RAM) for storing messages, schedules, parameters, and responses, a read only memory (ROM) for storing the switch scheduler processing program and a table with operation parameters.

Figure 2:
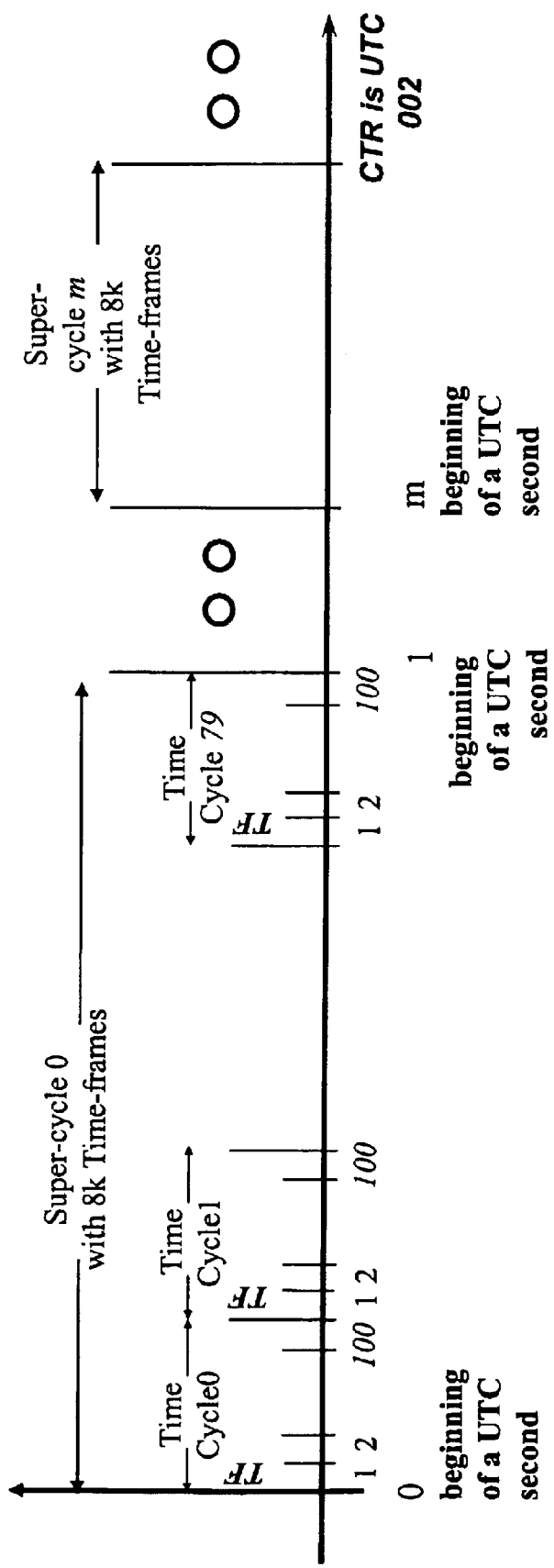
FIG. 2 is a timing diagram of a common time reference (CTR) that is aligned to the coordinated universal time (UTC) standard, as utilized by the present invention, wherein the CTR is divided into a plurality of contiguous periodic super-cycles each comprised of at least one contiguous time cycle each comprised of at least one contiguous time frame, wherein the super-cycle is equal to and aligned with the UTC second.

FIG. 2 is an illustration of a common time reference (CTR) that is aligned to UTC. Consecutive time frames are grouped into time cycles. As shown in the example illustrated in FIG. 2, there are 100 time frames in each time cycle. For illustration purposes, the time frames within a time cycle are numbered 1 through 100.

Consecutive time cycles are grouped together into super-cycles, and as shown in FIG. 2, there are 80 time cycles in each super-cycle. For illustration purposes, time cycles within a super-cycle are numbered 0 through 79. Super-cycles 0 and m are shown in FIG. 2.

FIG. 2 is illustrative of the relationship of time frames, time cycles, and super-cycles; in alternate embodiments, the number of time frames within a time cycle may be different than 100, and the number of time cycles within a super-cycle may be different than 80.

FIG. 2 illustrates how the common time reference signal can be aligned with the UTC (Coordinated Universal Time) standard. In this illustrated example, the duration of every super-cycle is exactly one second as measured by the UTC standard. Moreover, as shown in FIG. 2, the beginning of each super-cycle coincides with the beginning of a UTC second. Consequently, when leap seconds are inserted or deleted for UTC corrections (due to changes in the earth rotation period), the cycle and super-cycle periodic scheduling will not be affected. The time frames, time cycles, and super-cycles are associated in the same manner with all respective switches within the virtual pipe at all times.

In the embodiment illustrated in FIG. 2, the super-cycle duration is equal to one second as measured using the UTC (Coordinated Universal Time) standard. In an alternate embodiment the super-cycle duration spans multiple UTC seconds. In another alternate embodiment the super-cycle duration is a fraction of a UTC second. In another embodiment, the super-cycle duration is a small integer number of UTC seconds. A time frame may be further divided into time slots in the preferred embodiment, not illustrated in FIG. 2.

Pipeline forwarding relates to data packets being forwarded across a virtual pipe 25 (see FIG. 3) with a predefined delay in every stage (either across a communication link 41 or across an SVP switch 10 from input port 30 to output port 40). Data packets enter a virtual pipe 25 from one or more sources and are forwarded to one or more destinations. The SVP switch 10 structure, as shown in FIG. 3, can also be referred to as a pipeline switch, since it enables a network comprised of such switches to operate as a large distributed pipeline architecture, as it is commonly found inside digital systems and computer architectures.

Referring again to FIG. 3, the timely pipeline forwarding of data packets over the virtual pipe 25 is illustrated. As shown in FIG. 3, time cycles each contain 10 time frames, and for clarity the super-cycles are not shown. A data packet is received by one of the input ports 30 of switch A at time frame 1, and is forwarded along this virtual pipe 25 in the following manner: (i) the data packet 41A is forwarded from the output port 40 of switch A at time frame 2 of time cycle 1, (ii) the data packet 41B is forwarded from the output port 40 of switch B, after 18 time frames, at time frame 10 of time cycle 2, (iii) the data packet 41C is forwarded from the output port 40 of switch C, after 42 time frames, at time frame 2 of time cycle 7, and (iv) the data packet 41D is forwarded from the output port 40 of switch D, after 19 time frames, at time frame 1 of time cycle 9.

As illustrated in FIG. 3,

- All data packets enter this virtual pipe 25 (i.e., are forwarded out of the output port 40 of switch A) periodically at the second time frame of a time cycle and are output from this virtual pipe 25 (i.e., are forwarded out of the output port 40 of switch D) after 79 time frames.
- The data packets that enter the virtual pipe 25 (i.e., are forwarded out of the output port 40 of switch A) can come from one or more sources and can reach switch A over one or more input links 41.
- The data packets that exit the virtual pipe 25 (i.e., forwarded out of the output port 40 of switch D) can be forwarded over plurality of output links 41 to one of plurality of destinations.
- The data packets that exit the virtual pipe 25 (i.e., forwarded out of the output port 40 of switch D) can be forwarded simultaneously to multiple destinations, (i.e., multi-cast (one-to-many) data packet forwarding).
- The communication link 41 between two adjacent ones of the switches 10 can be used simultaneously by at least two of the virtual pipes.
- A plurality of virtual pipes can multiplex (i.e., mix their traffic) over the same communication links.
- A plurality of virtual pipes can multiplex (i.e., mix their traffic) during the same time frames and in an arbitrary manner.
- The same time frame can be used by multiple data packets from one or more virtual pipes.

For each virtual pipe there are predefined time frames within which respective data packets are transferred into its respective switches, and separate predefined time frames within which the respective data packets are transferred out of its respective switches. Though the time frames of each virtual pipe on each of its switches can be assigned in an arbitrary manner along the common time reference, it is convenient and practical to assign time frames in a periodic manner in time cycles and super-cycles.

The SVP switch 10 structure, as shown in FIG. 3, can also be referred to as a pipeline switch, since it enables a network comprised of such switches to operate as a large distributed pipeline architecture, as it is commonly found inside digital systems and computer architectures.

Figure 4:
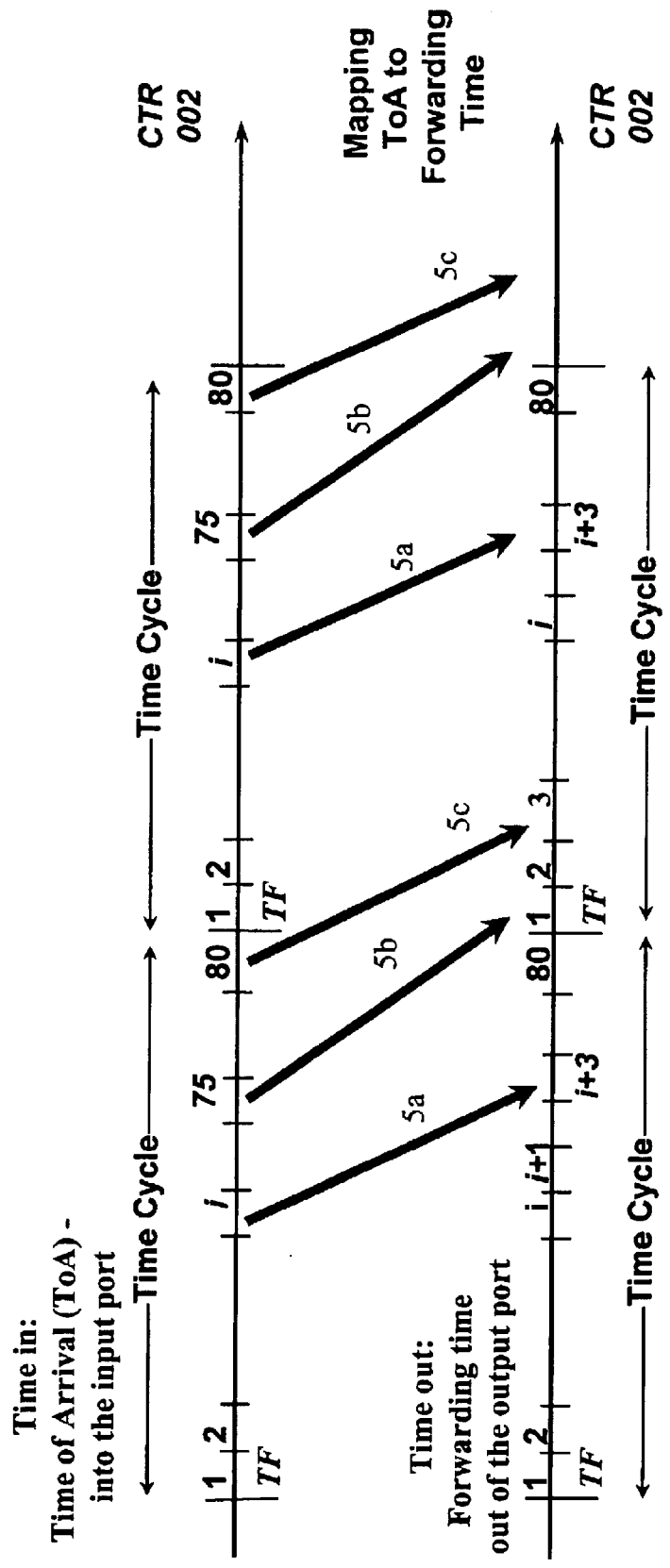
FIG. 4 illustrates the mapping of time frames into and out of a node on a virtual pipe of the present invention.

FIG. 4 illustrates the mapping of the time frames into and out of a node on a virtual pipe, wherein the mapping repeats itself in every time cycle illustrating the time in, which is the time of arrival (ToA), versus the time out, which is the forwarding time out of the output port. FIG. 4 shows the periodic scheduling and forwarding timing of a switch of a virtual pipe wherein there are a predefined subset of time frames (i, 75, and 80) of every time cycle, during which data packets are transferred into that switch, and wherein for that virtual pipe there are a predefined subset of time frames (i+3, 1, and 3) of every time cycle, during which the data packets are transferred out of that switch.

In the illustrated example of FIG. 4, a first data packet 5a arriving at the input port of the switch at time frame i is forwarded out of the output port of the switch at time frame i+3. In this example, the data packet is forwarded out of the output port at a later time frame within the same time cycle in which it arrived. The delay in transiting the switch (dts) determines a lower bound on the value (i+dts). In the illustrated example, dts must be less than or equal to 3 time frames.

Also as shown in FIG. 4, a second data packet 5b arriving at the input port of the switch at time frame 75 is forwarded out of the output port of the switch at time frame 1 within the next time cycle. In this example the data packet is forwarded out of the output port at a earlier numbered time frame but within the next time cycle from which it arrived. Note that data packets in transit may cross time cycle boundaries.

If—for example—each of the three data packets has 125 bytes (i.e. 1000 bits), and there are 80 time frames of 125 microseconds in each time cycle (i.e. a time cycle duration of 10 milliseconds), then the bandwidth allocated to this virtual pipe is 300,000 bits per second. In general, the bandwidth or capacity allocated for a virtual pipe is computed by dividing the number of bits transferred during each of the time cycles by the time cycle duration. In the case of a bandwidth in a super-cycle, the bandwidth allocated to a virtual pipe is computed by dividing the number of bits transferred during each of the super-cycles by the super-cycle duration.

FIG. 5A is an illustration of a serial transmitter and a serial receiver. FIG. 5B is a table illustrating the 4B/5B encoding scheme for data, and FIG. 5C is a table illustrating the 4B/5B encoding scheme for control signals.

Referring to FIG. 5A, a serial transmitter 49 and serial receiver 31 are illustrated as coupled to each link 41. A variety of encoding schemes can be used for a serial line link 41 in the context of this invention, such as, SONET/SDH, 8B/10B Fiber Channel, and 4B/5B Fiber Distributed Data Interface (FDDI). In addition to the encoding and decoding of the data transmitted over the serial link, the serial transmitter/receiver (49 and 31) sends/receives control words for a variety of in-band control purposes, mostly unrelated to the present invention description.

However, two control words, time frame delimiter (TFD) and position delimiter (PD) are used in accordance with the present invention. The TFD marks the boundary between two successive time frames and is sent by a serial transmitter 49 when a CTR 002 clock tick occurs in a way that is described hereafter as part of the output port operation. The PD is used to distinguish between multiple positions within a time frame and is sent by a serial transmitter 49 upon receipt of a position delimiter input 47B.

It is necessary to distinguish in an unambiguous manner between the data words, which carry the information, and the control signal or words (e.g., the TFD is a control signal) over the serial link 41. There are many ways to do this. One way is to use the known 4B/5B encoding scheme (used in FDDI). In this scheme, every 8-bit character is divided into two 4-bit parts and then each part is encoded into a 5-bit codeword that is. transmitted over the serial link 41.

In a preferred embodiment, the serial transmitter 49 and receiver 31 are comprisesd of AM7968 and AM7969 chip sets, respectively, both manufactured by AMD Corporation.

FIG. 5B illustrates an encoding table from 4-bit data to 5-bit serial codeword. The 4B/5B is a redundant encoding scheme, which means that there are more codeword than data words. Consequently, some of the unused or redundant serial codeword can be used to convey control information.

FIG. 5C is a table with 15 possible encoded control codewords, which can be used for transferring the time frame delimiter (TFD) over a serial link. The TFD transfer is completely transparent to the data transfer, and therefore, it can be sent in the middle of the data packet transmission in a non-destructive manner.

When the communication links 41 are SONET/SDH, the time frame delimiter cannot be embedded as redundant serial codeword, since SONET/SDH serial encoding is based on scrambling with no redundancy. Consequently, the TFD is implemented using the SONET/SDH frame control fields: transport overhead (TOH) and path overhead (POH). Note that although SONET/SDH uses a 125 microseconds frame, it cannot be used directly in accordance with the present invention, at the moment, since SONET/SDH frames are not globally aligned and are also not aligned to UTC. However, if SONET/SDH frames are globally aligned, SONET/SDH can be used compatibly with the present invention.

Figure 7:
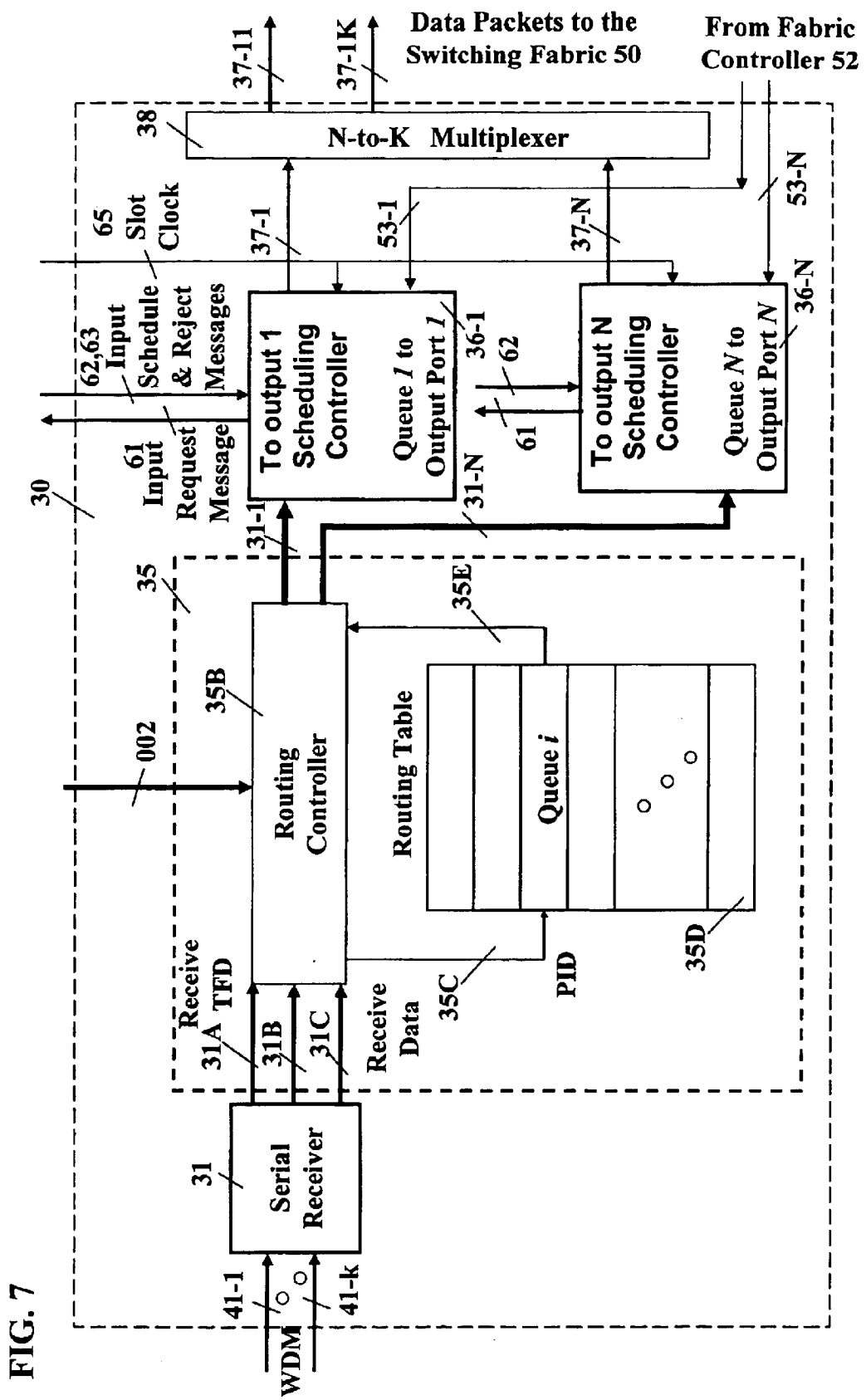
FIG. 7 is a schematic block diagram of an input port in accordance with the present invention.

FIG. 7 is a schematic block diagram of an input port of the present invention, which comprises a serial receiver 31 (which is connected to one or plurality of uniquely addressable optical WDM (wavelength division multiplexing) channels), an input controller 35, a plurality of output scheduling controllers (36-1 to 36-N, collectively 36), and an N-to-k multiplexer 38. Referring simultaneously to FIGS. 5 and 7, the serial receiver 31 transfers the received data packets (31C), the time frame delimiters (31A), and the position delimiters (31B) to the routing controller 35.

The input controller 35 comprises a routing controller 35B that is constructed of a central processing unit (CPU), a random access memory (RAM) for storing the data packets, read only memory (ROM) for storing the routing controller processing program; and a routing table 35D that is used for determining which respective ones of the output scheduling controllers 36 that the incoming data packet should be switched to.

Figures 6A, 6B:
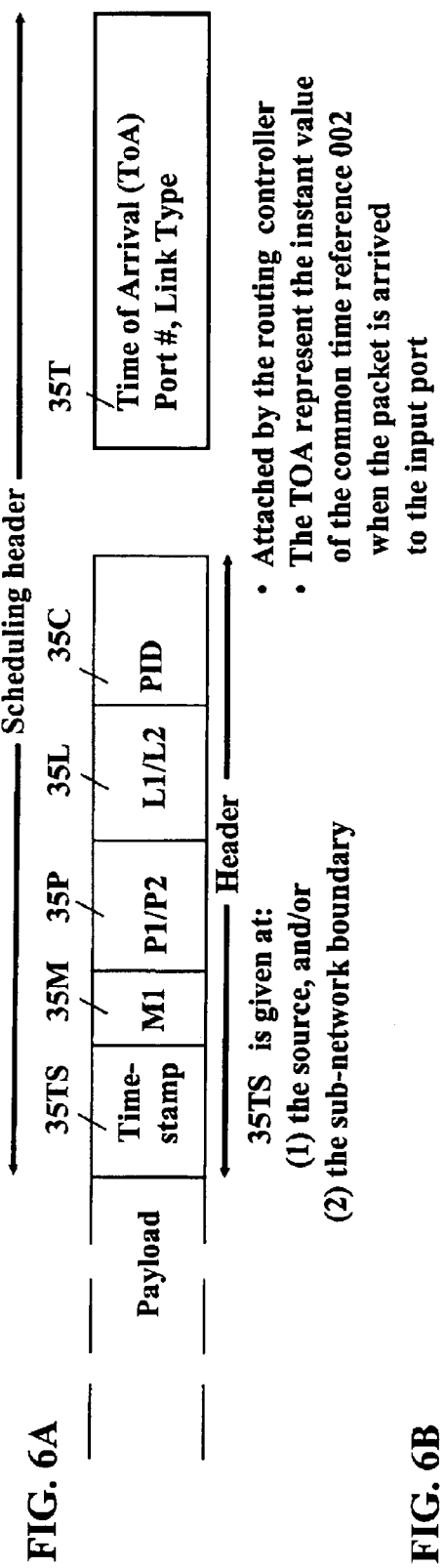
FIG. 6A is a map of a data packet with a header, as utilized in accordance with the present invention.
FIG. 6B illustrates a mapping of additional details of the encoding of the data packet of FIG. 6A.

FIG. 6A is an illustration of a data packet structure with a header that includes a time stamp, two priority bits, a multi-cast bit, and an attached time of arrival (ToA), port number, and link type. As shown in FIG. 6A, the packet header together with the attached time of arrival (ToA), port number, and link type constitute a scheduling header. The scheduling header is used for scheduling the data packet switching from input to output. FIG. 6B is additional detail about the encoding of the priority and multi-cast bits of FIG. 6A.

In one embodiment, an incoming data packet consists of a header and a payload portion. The header includes, as shown in FIGS. 6A and 6B, a time stamp value 35TS, a multi-cast indication 35M, a priority indication 35P, and a virtual PID indication 35C. The priority indication 35P may include encoding of a high and a low priority. In an alternate embodiment, multiple levels of priority are encoded by priority indication 35P. In a preferred embodiment, the multiple levels of priority include Constant Bit Rate (CBR) priority, Variable Bit Rate (VBR) priority, "best-effort" (BE) priority, and Rescheduled priority. The multi-cast indication 35M may include encoding indicating one destination or a plurality of destinations. In the case of a plurality of destinations there can be one or more PIDs.

The data packet header in FIG. 6A further comprises of a 2-bit, L1/L2, field 35L, which provides information regarding this data packet location within a stream of data packets that are part of the same SVP or the same call/connection. As shown in FIG. 6B, the meaning of this field is as follows: L1/L2=00—first data packet location in the flow (SVP)—compute a schedule; L1/L2=01—middle data packet location in the flow—same as the previous schedule; L1/L2=

10—last data packet location in the flow (SVP)—same as the previous schedule; L1/L2=11—decode this data packet address and schedule it regardless of its location.

The main motivation for having the L1/L2 bits in field 35L is for minimizing the scheduling delay. A data packet in the middle of a flow of the same SVP/call/connection will use the same schedule to get across the switching fabric as a predecessor data packet in this flow. This implies that only decoding of the PID 35C is needed in order to determine to which output port the incoming data packet should be switched to.

Referring back to FIG. 7, the incoming data packet header includes a virtual pipe identification, PID 35C, that is used to lookup in the routing table 35D the address 35E of the output scheduling controllers 36 that the incoming data packet should be switched to.

Figure 9:
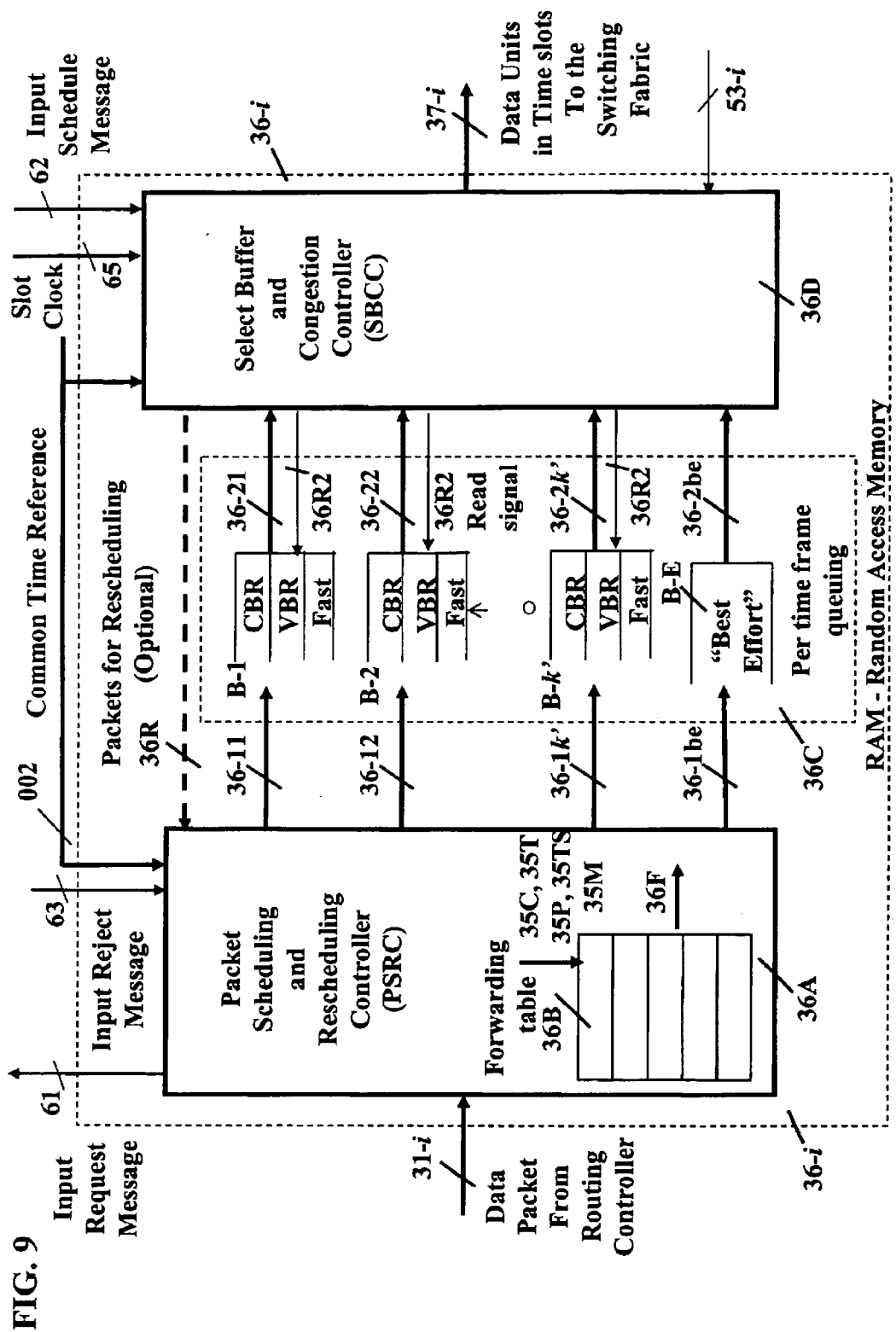
FIG. 9 is a schematic block diagram of an embodiment of a packet scheduling controller in accordance with the present invention.
Figure 17:
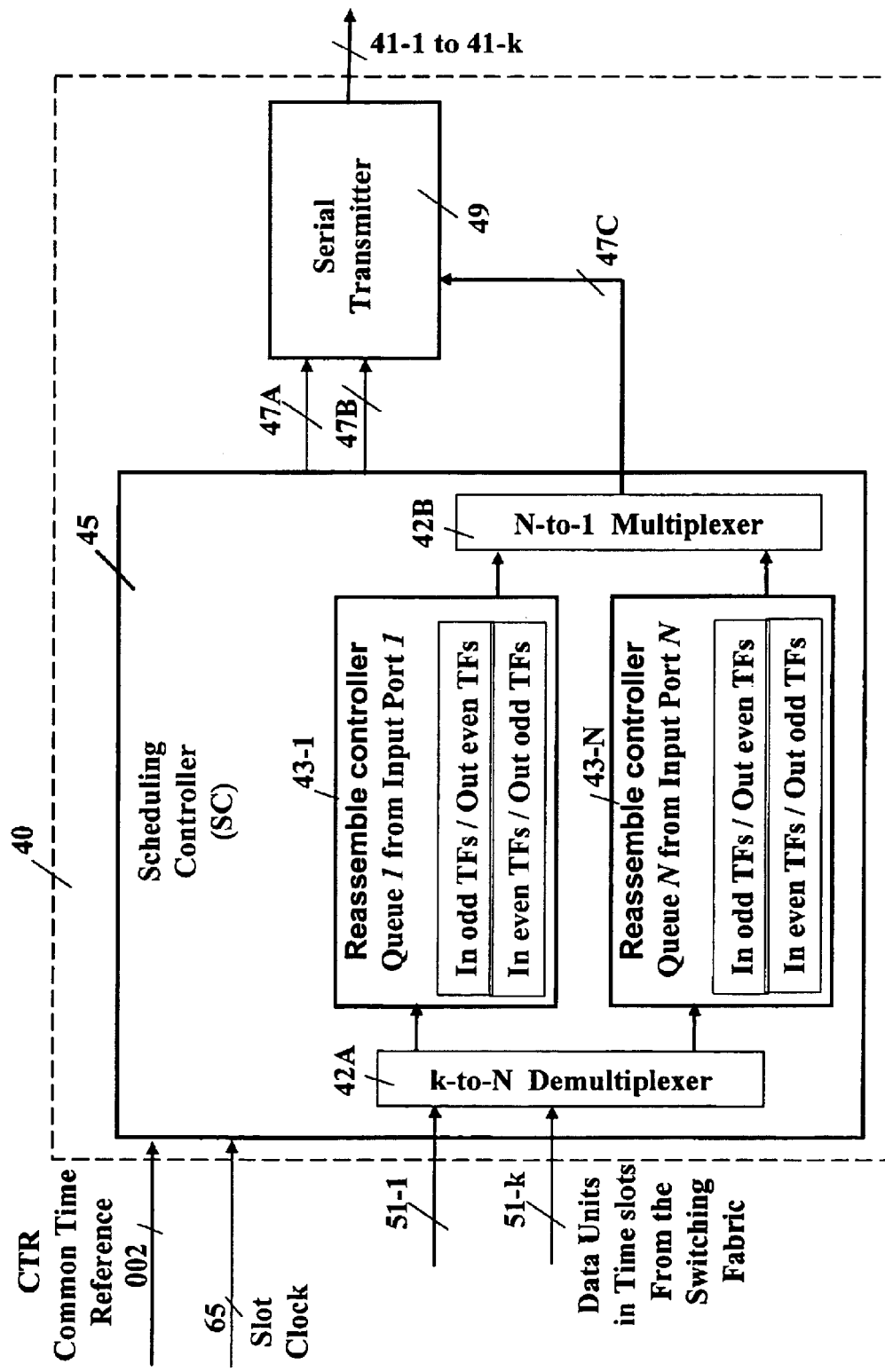
FIG. 17 is a schematic block diagram of an output port in accordance with the present invention.

Before the incoming data packet is transferred into its output scheduling controller(s) 36, the time of arrival (ToA) information 35T is attached to the data packet header as illustrated in FIGS. 6A and 6B. The ToA information is the value of the common time reference (CTR) signal 002 at the time the incoming data packet arrived at the input port. In a preferred embodiment, the ToA 35T may additionally comprise a port number, a link type indication, and the wavelength it was received on: 41-1 to 41-k (in FIG. 1). The ToA 35T is used by the scheduling controller 45 of the output port 40 in the computation of the forwarding time out of the output port, as shown in FIG. 17. Note that the ToA 35T value that is appended to the incoming data packet and is distinct and separate from the time stamp value 35TS that is included as part of the incoming data packet header. As shown in FIG. 9, after the incoming data packet has the ToA information appended to it, it is routed by the routing controller 35B via respective buses (31-1, 31-N) to the respective appropriate output scheduling controller (36-1, 36-N).

The ToA 35T and time stamp 35TS can have a plurality of numerical formats. One example is the format of the Network Time Protocol [D. Mills, Network Time Protocol (version 3) IETF RFC 1305] which is in seconds relative to 0h UTC on 1 January 1900. The full resolution NTP timestamp is a 64-bit unsigned fixed point number with the integer part in the first 32 bits and the fractional part in the last 32 bits. In some fields where a more compact representation is appropriate, only the middle 32 bits are used; that is, the low 16 bits of the integer part and the high 16 bits of the fractional part. The high 16 bits of the integer part must be determined independently.

The incoming data packet can have various formats, such as but not limited to Internet protocol version 4 (IPv4), Internet protocol version 6 (IPv6), and asynchronous transfer mode (ATM) cells. The data packet's PID 35C can be determined by but is not limited to one of the following: an Internet protocol (IP) address, an asynchronous transfer mode (ATM), virtual circuit identifier, a virtual path identifier (VCI/VPI), Internet protocol version 6 (IPv6) addresses, Internet Multi Protocol Label Swapping (MPLS) or tag switching labels, and an IEEE 802 MAC (media access control) address.

As shown in FIG. 7, each respective one of the output scheduling controllers 36 can issue input request messages 61 to the switch scheduler 60 (not shown). Each respective one of the output scheduling controllers 36 can also receive input schedule messages 62 and input reject messages 63 from the switch scheduler 60. Further, each respective one of the output scheduling controllers 36 also receives a slot clock output signal 65 from the switch scheduler 60. Each respective one of the output scheduling controllers 36 includes a plurality of queues, as will be illustrated in greater detail in FIGS. 9 and 10.

Figure 8:
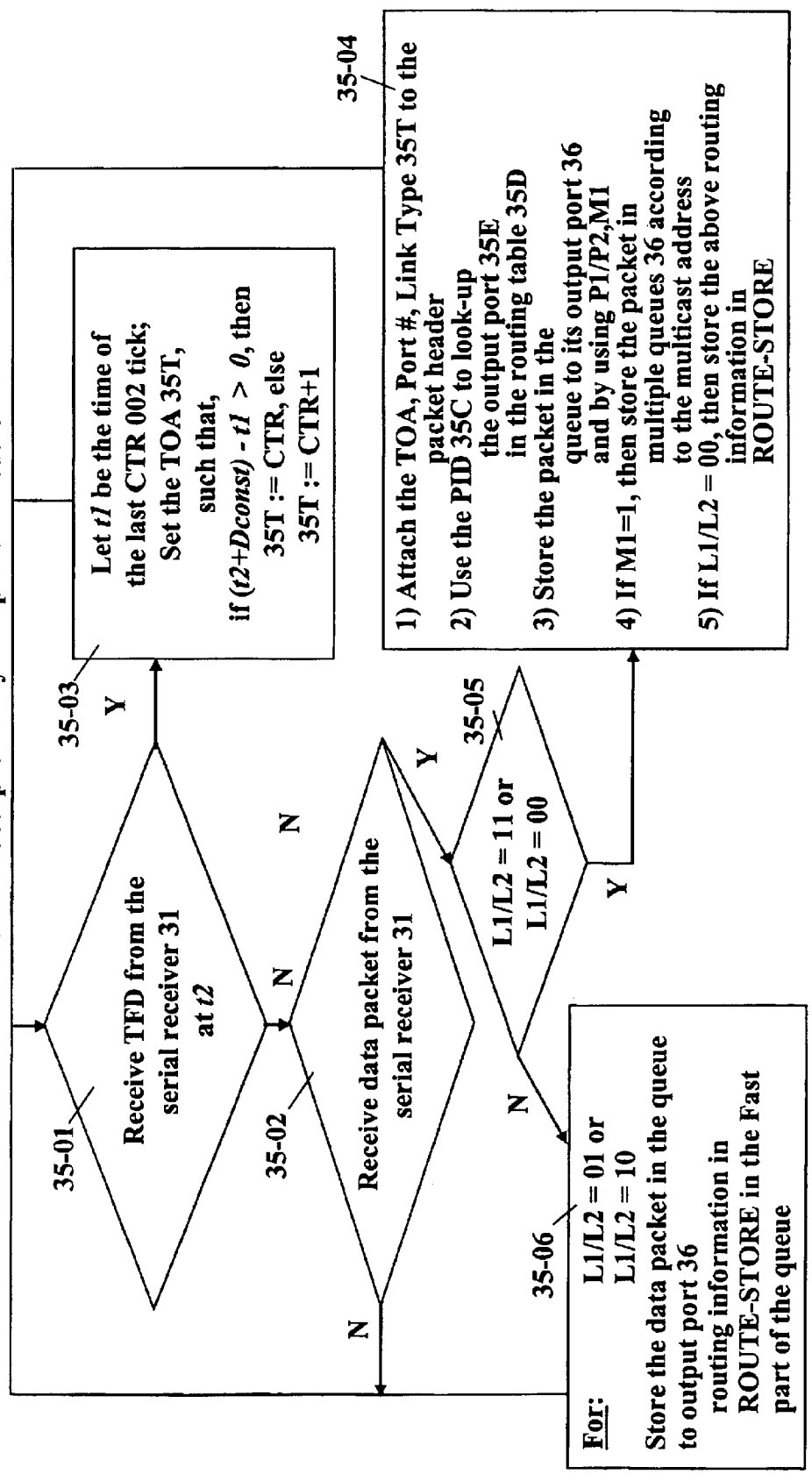
FIG. 8 is a flow diagram illustrating the operation of the routing controller in accordance with the present invention.

FIG. 8 illustrates the flow chart for the input controller 35 processing program executed by the routing controller 35B. The program is responsive to two basic events from the serial receiver 31 of FIG. 7: the received time frame delimiter TFD at step 35-01, and the receive data packet at step 35-02. After receiving a TFD, the routing controller 35 computes the time of arrival (ToA) 35T value at step 35-03 that is to be attached or appended to the incoming data packets.

For the computation of the ToA information 35T the routing controller uses a constant, Dconst, which is the time difference between the common time reference (CTR) 002 tick and the reception of the TFD at time t2 (generated on an adjacent switch by the CTR 002 on that node). This time difference is caused by the fact that the delay from the serial transmitter 49 to the serial receiver 31 is not an integer number of time frames.

When the data packet is received at step 35-04, the routing controller 35B executes the five operations as set forth in step 35-04: attach the ToA information, lookup the address of the queue 36 using the PID, storing the data packet in that queue 36, decode and process multi-cast indication 35M, and since in step 35-05 it was determined that L1/L2=00 then the above routing information is stored in the ROUTE-STORE variable.

The first operation of step 35-04 attaches or appends the ToA information computed in step 35-03 to the incoming data packet. The ToA information 35T may also include link type and port information, as discussed above. The second operation in step 35-04 uses the PID 35C to reference the lookup table 35D to determine the address of the output port 35E of the selected output port queue. The third operation of step 35-04 copies, forwards, or transfers the incoming data packet to the queue 36 responsive to the address 35E.

The fourth operation of 35-04 (decode and process multi-cast indication) may also comprise the method of copying the incoming data packet with appended or attached ToA information into a plurality of the queues 36 to effect a simultaneous multi-cast forwarding operation where the incoming data packet is simultaneously forwarded to more than one output port queue.

The fifth operation of 35-04 saves the routing information in the ROUTE-STORE variable information that will be used to skip the scheduling step for the successive data packet with the same PID. These packets will be routed into the FAST part of the queues B-1 through B-k' in FIGS. 9 and 10.

Figure 10:
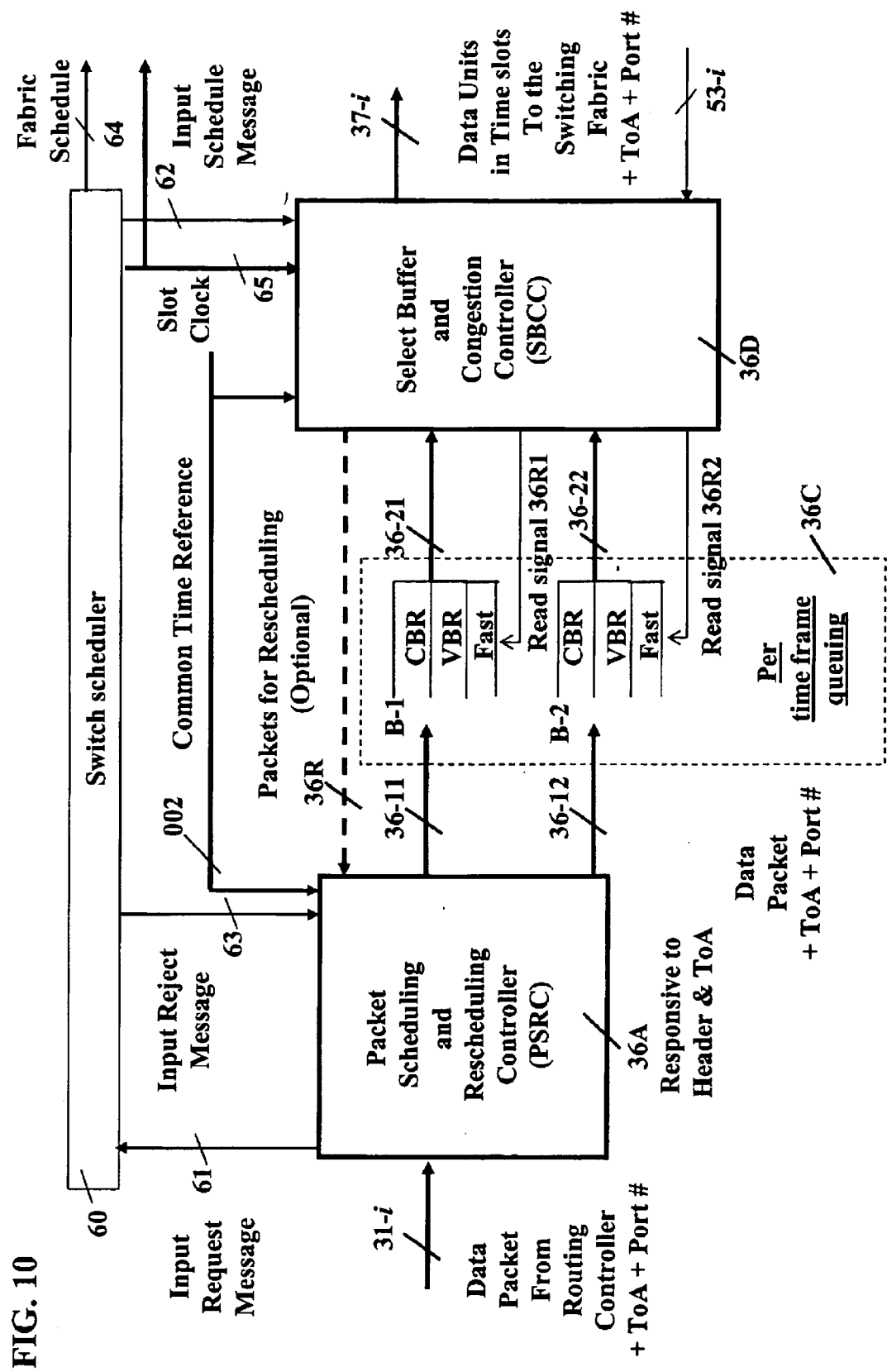
FIG. 10 is a schematic block diagram of an alternate embodiment of a packet scheduling controller in accordance with the present invention.

In step 35-06 in FIG. 8 for L1/L2=01 or L1/L2=10 a data packet is stored in the FAST part of the queues B-1 through B-k' in FIGS. 9 and 10, and consequently this data packet receives the same schedule to be transferred across the switch as previous data packets with same PID.

FIG. 9 is a schematic block diagram of an embodiment of an output scheduling controller 36-i (i.e., where i is in the range 1 to N, examples including 36-1 and 36-N). The output scheduling controller 36-i comprises a packet scheduling and rescheduling controller (PSRC) 36A, a select buffer and congestion controller (SBCC) 36D, and a random access memory (RAM) 36C. The random access memory 36C comprises a plurality of queues B-1, B-2, B-k', and B-E (for "best effort" data packets).

The PSRC 36A is constructed of a central processing unit (CPU), a random access memory (RAM) for storing the data packet, read only memory (ROM) for storing the packet scheduling and rescheduling controller processing program; and a forwarding table 36B that is used for determining which respective ones of the output scheduling controller queues B-1, B-2, B-k', and B-E within 36C that the incoming data packet should be switched to.

The PSRC 36A receives a common time reference signal 002 from the common time reference means 20 (not shown) and accepts input reject messages 63 from the switch scheduler 60 (also not shown). The PSRC also receives an input 31-i (i.e., where i is in the range 1 to N, examples including 31-1 and 31-N of FIG. 7). The PSRC issues input request messages 61 to the switch scheduler. Common time reference 002, input schedule messages 62 and the slot clock signal 65 are received by the SBCC 36D.

The PSRC forwarding table 36B of FIG. 9 uses information contained in an arriving data packet's time stamp value 35TS, the multi-cast indication 35M, the priority indication 35P, the virtual PID indication 35C, and the time of arrival (ToA) information 35T to produce the selection 36F. The selection 36F then indicates which respective ones of the plurality of queues (B-1, B-2, B-k', and B-E) the data packet should be inserted into.

Within each of the queues B-1, B-2, and B-k' are a plurality of sub-queues CBR, VBR, FAST, and MCST (not shown explicitly, since multicast implies that a data packet is copied to multiple queues to multiple output ports). The sub-queues are used to differentiate between the different types of data packet traffic entering each queue, as constant bit rate (CBR), variable bit rate (VBR), best-effort, and FAST (for data with pre-computed switching schedules).

The SBCC 36D is constructed of a central processing unit (CPU), a random access memory (RAM) for storing data packets, and a read only memory (ROM) for storing the select buffer and congestion controller processing program. The SBCC 36D produces an output 37-i (i.e., where i is in the range 1 to N, examples including 37-1 and 37-N).

FIG. 10 shows an alternate embodiment of the output scheduling controller 36-i (i.e., where i is in the range 1 to N, examples including 36-1 and 36-N) in accordance with the present invention. The output scheduling controller 36-i comprises a packet scheduling and rescheduling controller (PSRC) 36A, a select buffer and congestion controller (SBCC) 36D, and a random access memory (RAM) 36C. The RAM 36C comprises a plurality of queues B-1, B-2, and so on. The PSRC 36A is constructed of a central processing unit (CPU), a random access memory (RAM) for storing the data packet, read only memory (ROM) for storing the packet scheduling and rescheduling controller processing program; and a routing table that is used with information contained in an arriving data packet's time stamp value 35TS, the multi-cast indication 35M, the priority indication 35P, the virtual PID indication 35C, and the time of arrival (ToA) information 35T for determining which respective ones of the output scheduling controller queues (e.g., B-1, B-2) that the incoming data packet should be switched to.

The SBCC 36D is constructed of a central processing unit (CPU), a random access memory (RAM) for storing data packets, and a read only memory (ROM) for storing the select buffer and congestion controller processing program. The SBCC is additionally coupled to the RAM 36C by read signals 36R1, 36R2, and so forth, respectively to queues B-1, B-2, and so forth. The signals 36R1, 36R2 et. al., permit the SBCC to select which of the sub-queues (e.g., CBR, VBR, FAST) of queues B-1, B-2 et. al., to read.

The SBCC 36D has a feedback output 36R which is coupled to the PSRC 36A. The feedback output 36R is used to indicate that one or more packets queued for scheduled transmission did not successfully transmit. The PSRC uses the output 36R to reschedule and re-enqueue the missed packet in the RAM 36C. The SBCC produces an output 37-i (i.e., where i is in the range 1 to N, examples including 37-1 and 37-N).

The SBCC (of both FIGS. 9 and 10) are responsive to the slot clock 65 and the input schedule messages 62 from the switch scheduler 60 to select a data packet within 36C to forward to output 37-i. At selected times determined by the switch scheduler, and responsive to the aforementioned slot clock 65 and input schedule messages 62, the SBCC in each respective output schedule controller 36-i provides data packets to the switch fabric 50.

The slot clock 65 can be aligned with the common time reference (CTR) 002, in which case the slot clock can be generated by dividing each time frame (defined by the CTR) by a constant number that is equal or greater than 1.

The PSRC (of both FIGS. 9 and 10) are responsive to data packets via input 31-i to generate input request messages 61 to send to the switch scheduler 60. If the input request message is unable to be honored by the switch scheduler, an input reject message 63 is returned to the PSRC.

The RAM 36C (of both FIGS. 9 and 10) provides the function of enqueuing data packets known to be scheduled from the PSRC and dequeuing the data packets requested by the SBCC.

Each of the queues B-1, B-2, et. al., is designated for storage of data packets that will be forwarded in each of the respective time frames in every time cycle, as shown in FIG. 4. Data packets which have low priority, as determined by priority indicator 35P, are switched to the queue B-E for "best effort" transmission. Low priority traffic is non-reserved and may include "best effort" traffic and rescheduled data packets.

Figure 11:
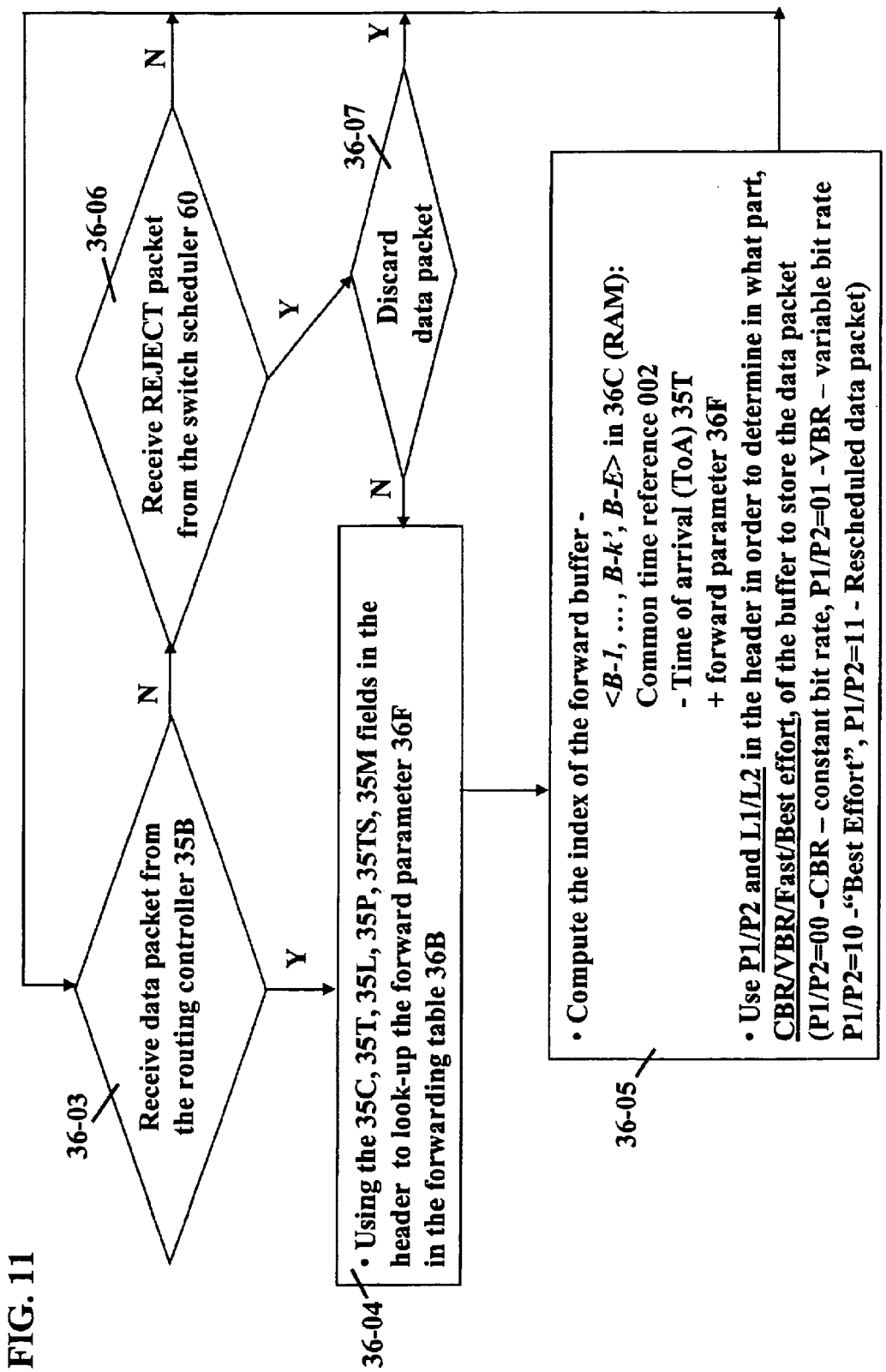
FIG. 11 is a flow diagram describing the operation of the packet scheduling and rescheduling controllers of FIGS. 9 and 10.

FIG. 11 is a flow diagram describing the operation of the packet scheduling and rescheduling controllers 36A (of FIGS. 9 and 10). Flow starts at 36-03, in which the determination of whether a data packet has been received from routing controller 35B is made. Upon receipt of the data packet, in step 36-04 the time stamp value 35TS, the multi-cast indication 35M, the priority indication 35P, the virtual PID indication 35C, and the time of arrival (ToA) information 35T are used to lookup the forward parameter 36F in the forwarding table 36B.

If a data packet has not been received at step 36-03, flow proceeds to step 36-06 where the determination is made if a input reject message 63 has been received from the switch scheduler 60. If there has been no input reject message received, flow continues from 36-03.

If an input reject message has been received, at step 36-07 a check is made to see if the data packet which was rejected has been previously rejected. After a predefined number of rejections, the data packet is discarded as being undeliverable and flow continues at step 36-03. If this is only the first rejection, flow continues at step 36-04.

Upon completing step 36-04, the next operation is at step 36-05 to compute the index of the forwarding buffer within the RAM 36C (i.e., compute the address of the queue in which to place the packet). This address calculation may also include determination of which sub-queue in which to place the data packet (e.g., constant bit rate, variable bit rate, best-effort and multicast). Upon placing the data packet at the correct corresponding index within the RAM 36C, flow continues at step 36-03.

FIG. 12 illustrates details of the input request message 61, input schedule message 62, and input reject message 63 of the present invention. In the preferred embodiment, the input request message 61 comprises the six fields relating to the packet: the global time for switching, the input port number, the output port number, position within the buffer, priority and/or type, and the size. At least one request is made for every data packet to be switched, thus for a multicast data packet (one intended to be forwarded to multiple destinations simultaneously) a plurality of requests must be made, one for each destination.

In the preferred embodiment, the input schedule message 62 comprises the six fields relating to the packet: the global time for switching, the input port number, the output port number, position within the buffer, priority and/or type, and a list (s1, s2, . . . ). One schedule message is issued for every data packet scheduled to be switched, thus for a multicast data packet a plurality of schedule messages will be issued, one for each successfully scheduled destination. The list in the input schedule message comprises a series of time slot size pairs, wherein each pair includes a time slot in which the data packet is scheduled, and a size indication for each data unit to be switched. The accumulated size of all the size indications in a list is at least the size of the input request message size field.

In the preferred embodiment, the input reject message 63 comprises the six fields relating to the packet: the global time for switching, the input port number, the output port number, position within the buffer, priority and/or type, and the size. One rejection is issued for every data packet that failed to be scheduled, thus for a multicast data packet it is possible to receive a plurality of input reject messages, one for each failed destination.

Figure 13:
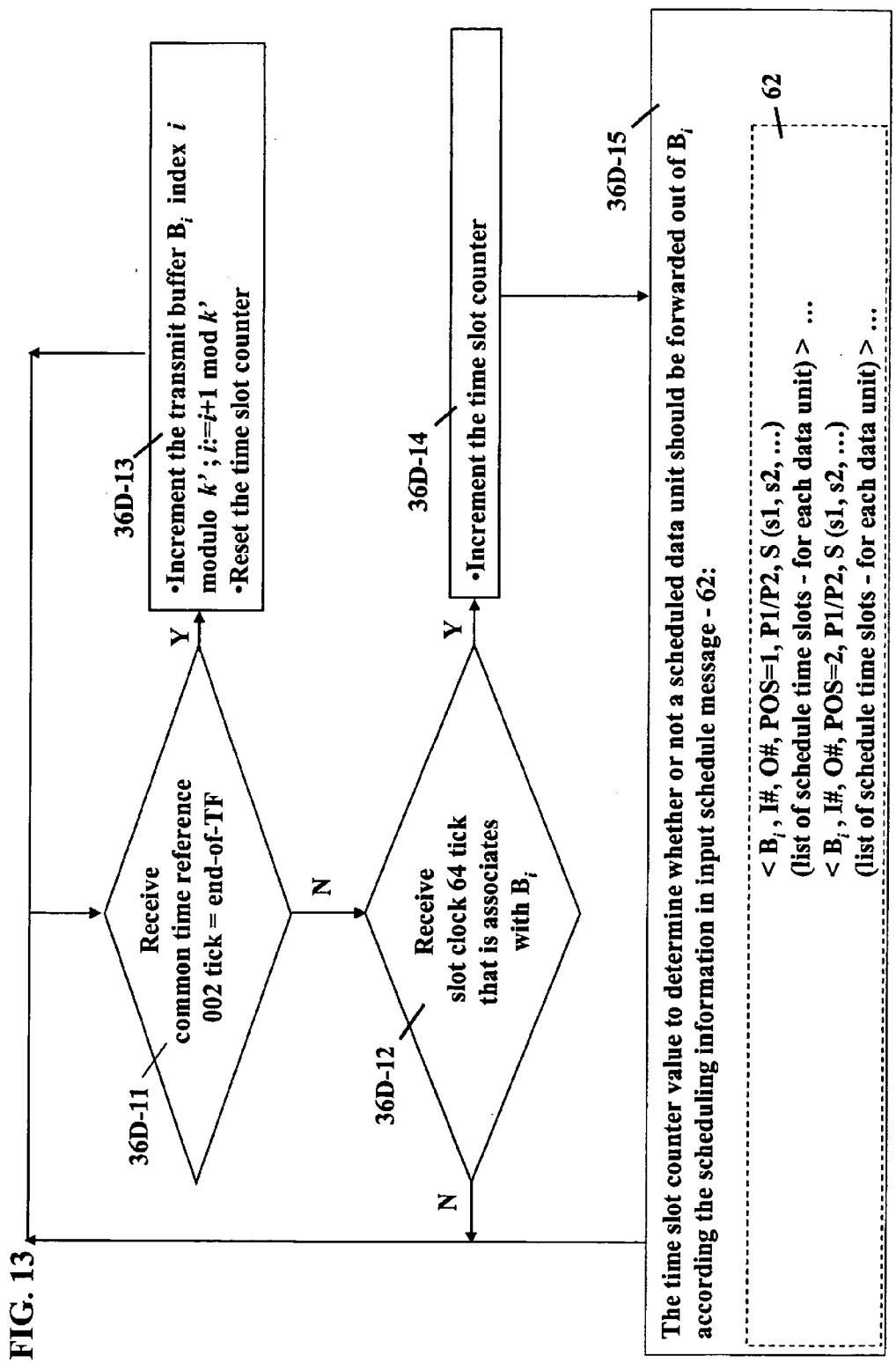
FIG. 13 is a flow diagram illustrating the operation of the select buffer and congestion controllers of FIGS. 9 and 10.

The flow chart for the program executed by the select buffer and congestion controller 36D of FIG. 9 and 10 is illustrated in FIG. 13. The controller 36D determines if a common time reference (CTR) 002 tick (e.g., a pulse or selected transition of the CTR signal) is received at step 36D-1 1. If the common time reference tick is received, step 36D-13 increments the transmit buffer index i (i.e., i:=i+1 mod k', where k' is the number of queues in RAM 36C for scheduled traffic, one for each time frame in a time cycle). The controller 36D also resets a time slot counter before resuming flow at step 36D-11.

At step 36D-12, a determination is made whether a slot clock tick (e.g., a pulse or selected transition of the slot clock signal 65) has occurred. If not, flow continues at step 36D-11. If so, the time slot counter is incremented by one and flow continues with step 36D-15.

At step 36D-15, the present time slot counter value is used to determine if a scheduled data unit should be forwarded out of queue B-i according to the scheduling information in any pending input schedule messages 62 that have been received by the SBCC from the switch scheduler 60. If so, the appropriate data unit is de-queued from the queue B-i and output, and the corresponding respective input schedule message is retired. Flow then continues at step 36D-11.

FIG. 14 illustrates the four pipelined forwarding phases of forwarding data packets as in the present invention. The phases are numbered phase 1, phase 2, phase 3, and phase 4. In the preferred embodiment, each phase is accomplished over a period of time equal to one time frame.

In phase 1, a data packet is received by the input port serial receiver and forwarded to the routing controller 35B where an attachment is made to the data packet header. This attachment includes the ToA 35T and may include other information such as but not limited to port number and link type. Also performed in phase 1 is a routing step by the routing controller 35B which directs the data packet to the corresponding output schedule controller(s), as determined by the multicast indication 35M in the header.

In phase 2, the packet scheduling and rescheduling controller 36A receives the data packet from the routing controller and sends an input request message to the switch scheduler 60. The switch scheduler computes the schedule (on the basis of all requests from all PSRCs) and returns one of an input schedule message or an input reject message. If an input schedule message is received, the PSRC en-queues the data packet for switching in the RAM 36C.

In phase 3, the SBCC 36D de-queues and forwards to the switching fabric 50 data units responsive to the switch scheduler input schedule messages. The switching fabric immediately forwards the switched data units to the correct output port 40.

In phase 4, the output port 40 forwards the data packet received from the switch fabric 50 to the serial transmitter 49 out to one of the WDM communications channels 41-1 through 41-k.

Note that each data packet is comprised of one or more data units, consequently, in phase 3 data units are switched from input to output. However, in phase 4 data packets are forwarded from the output port to the network.

Figure 15:
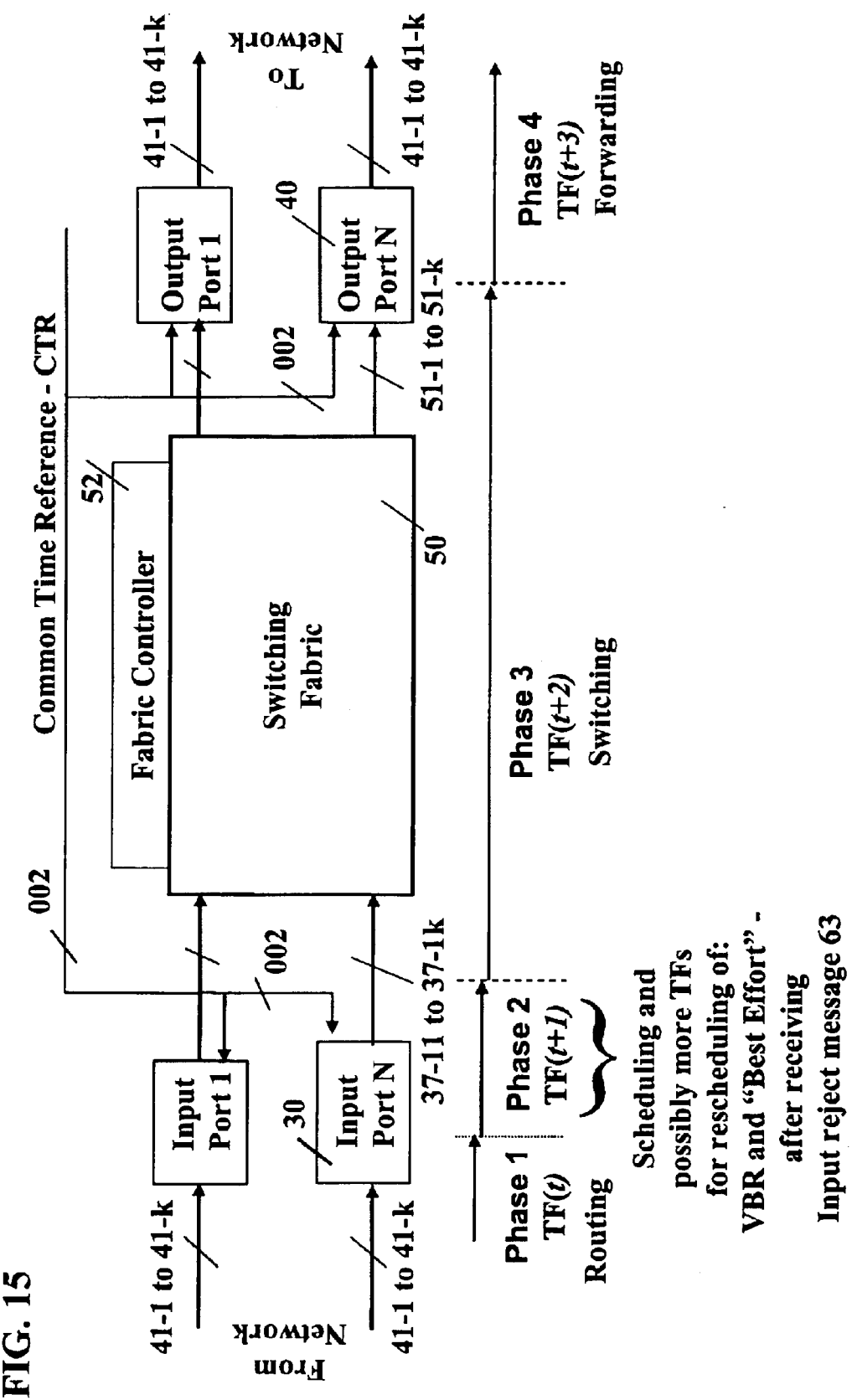
FIG. 15 is a schematic block diagram of a four pipelined forwarding phases of forwarding data packets in accordance with the present invention.

FIG. 15 is a schematic block diagram of the four pipelined forwarding phases of forwarding data packets as in the present invention. As shown in the illustration, data packets in phase 1 are propagated, through the PSRC 36A of the input ports 30 of the SVP switch 10, to the RAM 36C in the input ports 30. In phase 2 the data packet scheduling is done with specific schedule for each of its data units. In phase 3 Data units are transited to the switching fabric and are propagated to the output port 40 and assembled back into their original data packet. Data packets in phase 4 are propagated entirely through the SVP switch 10 and are forwarded to their next switch or destination.

It is to be noted that a data packet need not always to advance from one phase to the next as time frames occur. Specifically, a data packet whose input request message 61 has been rejected (i.e., 63) may remain in phase 2 to be rescheduled, or may be discarded, thereby dropping phases 3 and 4.

Figure 16:
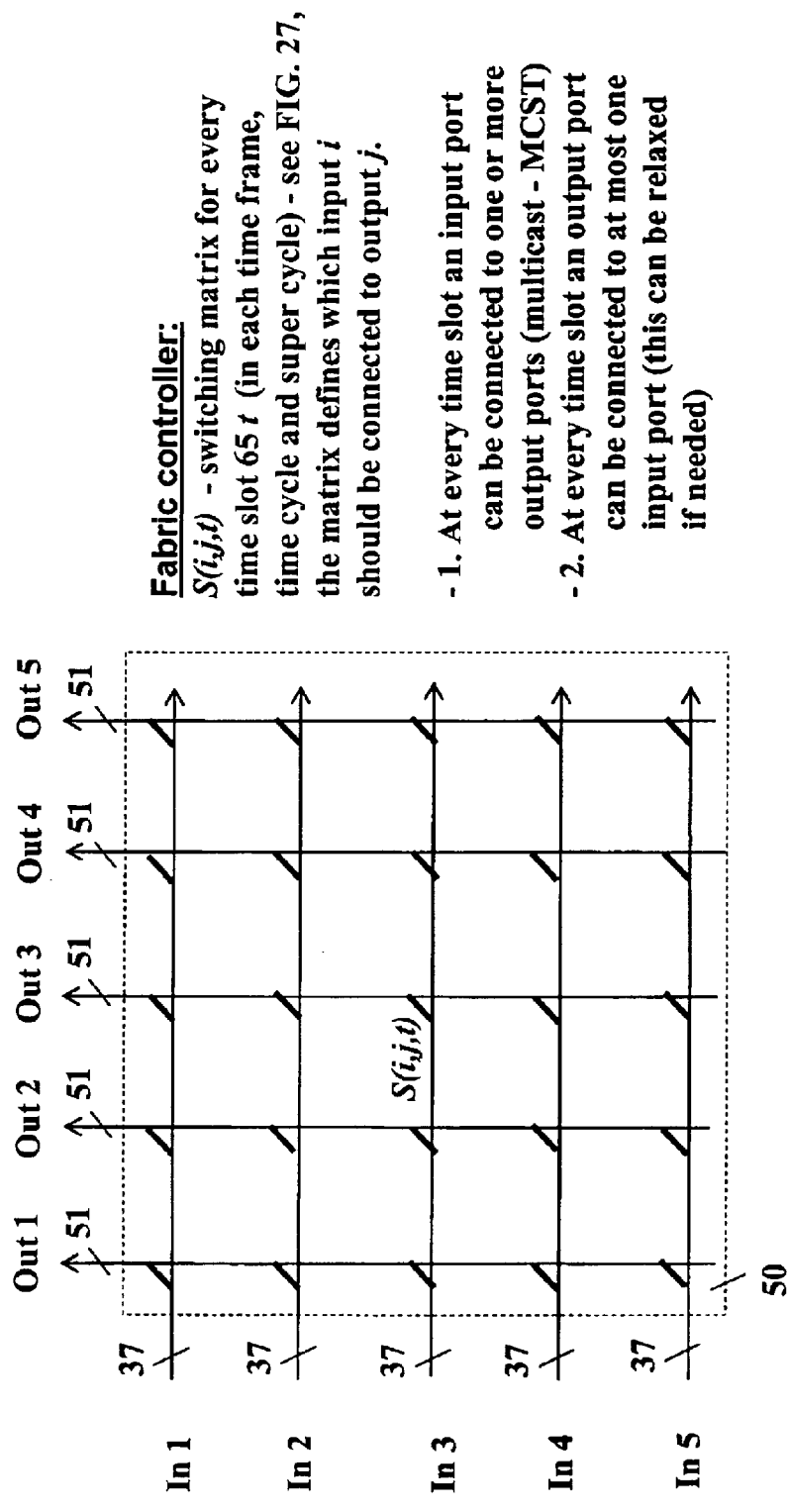
FIG. 16 is a schematic block diagram of one embodiment of the switching fabric, with its fabric controller, in accordance with the present invention.

FIG. 16 is a schematic block diagram of one embodiment of the switching fabric 50 of the present invention: a crossbar switch. There are various ways to implement a crossbar switching fabric. As shown, a 5-input-by-5-output crossbar switch comprises a plurality of inputs (e.g., In1, In2, In3, In4, In5) selectively coupled in every possible combination with a plurality of outputs (e.g., Out1, Out2, Out3, Out4, Out5). In the preferred embodiment, the number of switch fabric crossbar inputs 37 are equal to the number of input ports 30 and are connected in a one-to-one relationship, respectively. Also in the preferred embodiment, the number of switch fabric crossbar outputs 51 are equal to the number of the output ports 40 and are connected in a one-to-one relationship, respectively. More specifically, for N input ports switch there should be an N-input-by-N-output crossbar fabric.

Each selective coupling of the crossbar switch can be uniquely identified by the corresponding input port i and the output port j. The switch scheduler 60 assembles a composite union of all issued and pending input schedule messages 62 that have been issued to the SBCCs 36D, and produces a fabric schedule message 64. The fabric schedule message for a given time frame includes the set of all selective couplings of input ports i to output ports j at time slots t within the current time frame, and can thus be abbreviated as S(i,j,t). In the preferred embodiment, at every time slot t an input port i can be connected to one or more output ports j to support multicast operations. Within the time frame corresponding to phase 3, the switch fabric crossbar thus is configured in a series of connections, one (possibly non-unique) configuration for each time slot, responsive to the fabric schedule message.

FIG. 17 is a schematic block diagram of an output port in accordance with the present invention. The output port 40 comprises a scheduling controller 45, a k-to-N demultiplexer 42A, an N-to-k multiplexer 42B, and a serial transmitter 49. The scheduling controller (SC) 45 is constructed of a central processing unit (CPU), a random access memory (RAM) for storing the data packet, and read only memory (ROM) for storing the controller processing program. The SC also comprises a plurality of reassemble controllers (e.g., 43-1, 43-N, collectively as 43), one for each time slot. The SC receives the common time reference 002 and the slot clock 65 from the switch scheduler 60 (not shown).

Each time frame as specified by the common time reference 002 is considered to be one of an even tick or an odd tick. The determination of even tick vs. odd tick is made relative to the beginning of a time cycle. In the preferred embodiment, the first time frame of a time cycle is determined to be an odd tick, the second time frame of the time cycle is determined to be an even tick, the third time frame of the time cycle is determined to be an odd tick, and so forth, where the determination of even tick vs. odd tick alternates as shown for the duration of the time cycle. In an alternate embodiment, the first time frame of a time cycle is determined to be an even tick, the second time frame of the time cycle is determined to be an odd tick, the third time frame of the time cycle is determined to be an even tick, and so forth, where the determination of even tick vs. odd tick alternates as shown for the duration of the time cycle. The actual sequence of even ticks vs. odd ticks of time frames within a time cycle may be arbitrarily started with no loss in generality.

The k-to-N demultiplexer 42A accepts data units from the crossbar switch fabric 50 (not shown) and directs the accepted data to one of the plurality of reassemble controllers 43 responsive to the current time slot number.

Each respective reassemble controller (e.g., 43-1, 43-N) comprises an even queue and an odd queue, and accepts data units from the k-to-N demultiplexer 42A during a respective time slot and assembles that data units into outbound data packets in exclusively one of the even and odd queue responsive to the current time frame. As explained above, predefined ticks of the common time reference signal are defined to be even, and others are defined to be odd. The queues permit reassembly of data packets that may have been divided up into a series of data units in the process of traversing the input ports and the crossbar switch fabric.

During even ticks of the common time reference 002, the even queue of each reassemble controller 43 accepts data from the k-to-N demultiplexer for the duration of its corresponding respective time slot, and if odd packet assembly has completed, the odd queue supplies a data packet output to the N-to-k multiplexer 42B.

During odd ticks of the common time reference 002, the odd queue of each reassemble controller 43 accepts data from the k-to-N demultiplexer for the duration of its corresponding respective time slot, and if even packet assembly has completed, the even queue supplies a data packet output to the N-to-k multiplexer 42B.

The N-to-k multiplexer 42B selects among the data packets made available to it from the reassemble controllers 43 and provides an output 47C to the serial transmitter 49. The serial transmitter 49 provides an output to the communication link 41 as discussed in detail with respect to FIGS. 5A, 5B, and 5C.

Figure 18:
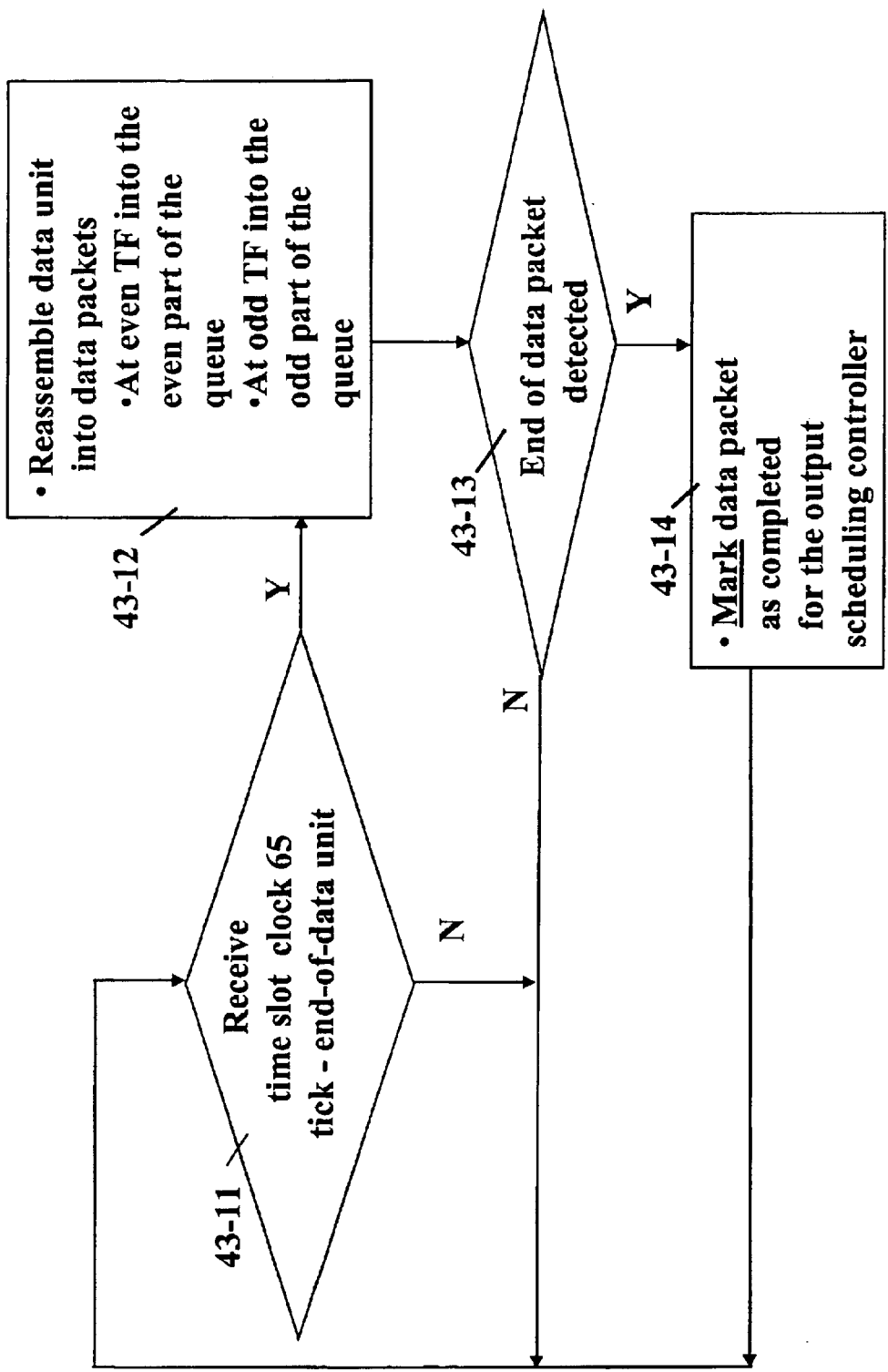
FIG. 18 is a flow diagram illustrating the operation of a pipelined forwarding phase of the output port of FIG. 17.

FIG. 18 is a flow diagram describing the operation of a pipelined forwarding phase of the output port of FIG. 17. Flow starts and holds at step 43-11 until a determination is made that a complete data unit has been received from the switching fabric. When a complete data unit has been received, flow continues at step 43-12 where the received data unit is added to the appropriate odd or even queue, as discussed in detail above. Upon adding the received data unit to the queue, flow continues to step 43-13 where a check is made to see if the received data unit completes an entire data packet. If an end-of-packet indication is detected in step 43-13, flow continues with step 43-14 where the completed data packet is marked for release to the output controller 45. If an end-of-packet indication was not detected in step 43-13, flow continues with the hold at step 43-11.

Figure 19:
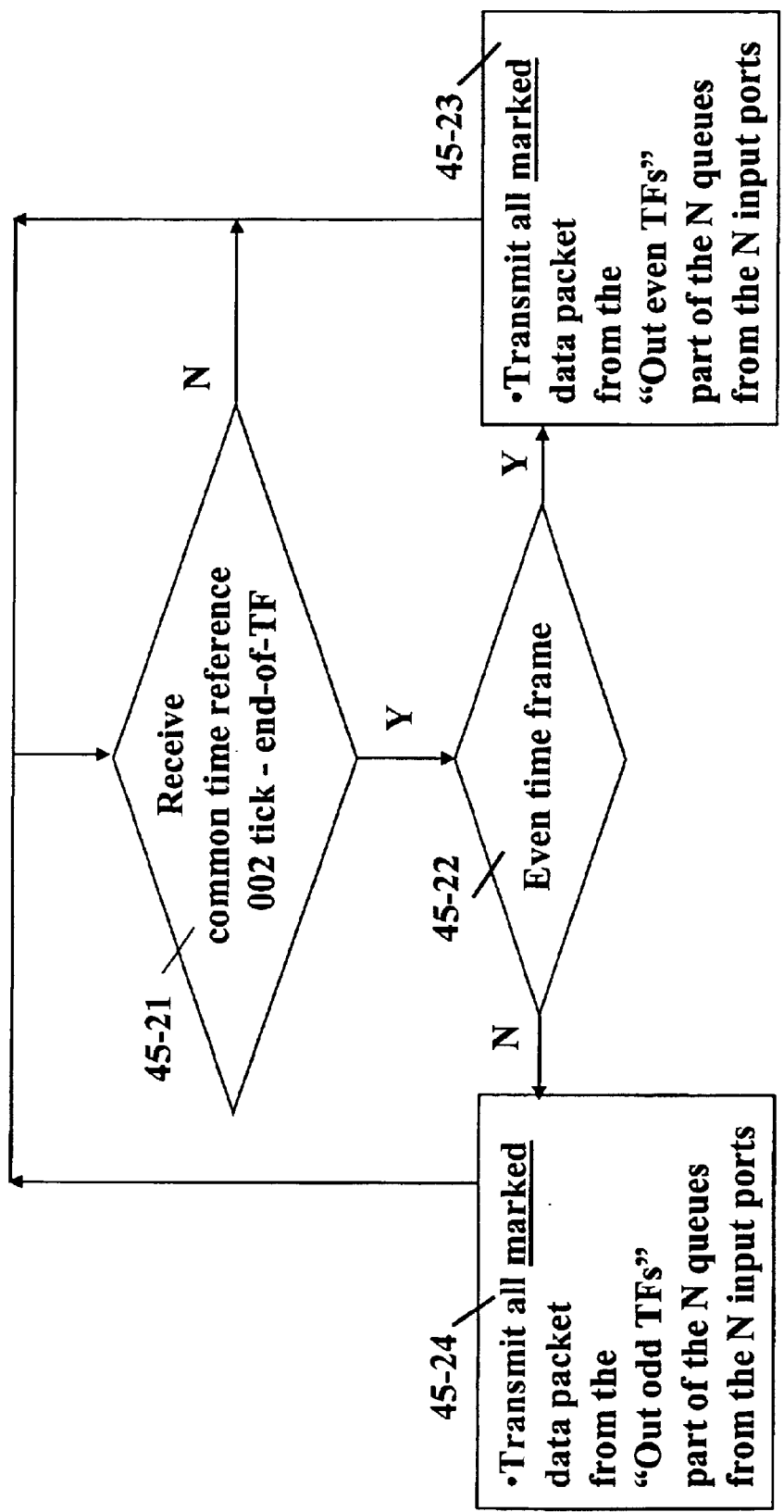
FIG. 19 is a flow diagram illustrating the operation of another pipelined forwarding phase of the output port of FIG. 17.

FIG. 19 is a flow diagram describing the operation of the other pipelined forwarding phase of the output port of FIG. 17. Flow starts and holds at step 45-21 until a common time reference tick, as discussed above, is received. Upon receiving the common time reference tick, the tick is determined to be an odd tick or an even tick in step 45-22. Upon determining the tick to be even in step 45-22, flow continues with step 45-23 in which all marked data packets in the even queues are made available for transmission via the k-to-N demultiplexer 42B and serial transmitter 49 of FIG. 17. Upon completion of transmission of all marked data packets in the even queues, flow continues at the hold of step 45-21. Upon determining the tick to be odd in step 45-22, flow continues with step 45-24 in which all marked data packets in the odd queues are made available for transmission via the N-to-k demultiplexer 42B and serial transmitter 49 of FIG. 17. Upon completion of transmission of all marked data packets in the odd queues, flow continues at the hold of step 45-21.

Figure 20:
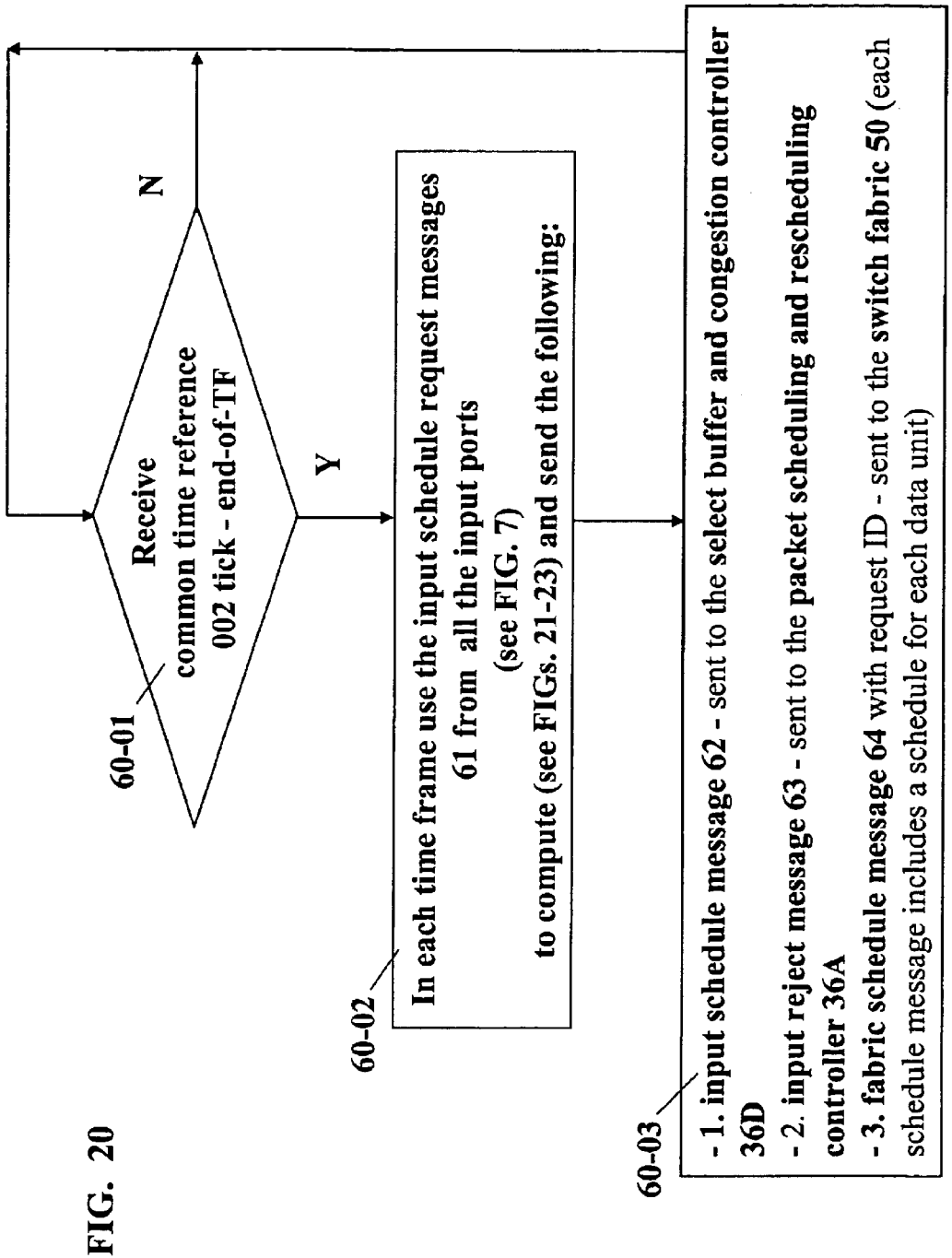
FIG. 20 is a flow diagram illustrating the operation of the switch scheduling controller of FIG. 1.

FIG. 20 is a flow diagram describing the operation of the switch scheduler 60 of FIG. 1. Flow starts and holds at step 60-01, until a tick of the common time reference 002 is detected. Flow then continues at step 60-02, in which input request messages 61 are received from any ones of the input ports 30 (see FIG. 7). Step 60-02 includes the scheduling computation of which of the input schedule requests can be serviced by the switch scheduler 60. Responsive to the scheduling computation of step 60-02, flow continues to step 60-03 where three kinds of output messages are generated by the switch scheduler 60: (1) input schedule messages 62 are relayed back to the appropriate select buffer and congestion controllers 36D in each of the input ports 30 that have been granted a schedule for data; (2) input reject messages 63 are relayed back to the appropriate packet scheduling and rescheduling controllers 36A in each of the input ports 30 that have been denied a schedule for data; and (3) a fabric schedule 64 is relayed to the crossbar switch fabric 50 to schedule data units for transit across the switch fabric.

FIG. 21 illustrates details of the scheduling computation of step 60-02 in the switch scheduler 60. As shown, the switch scheduler 60 maintains a schedule of all possible time slots for each input port i within a time frame, and also a schedule of all possible time slots for each output port j within the same time frame. For a given input schedule request to transit the switch fabric from input port i to output port j, a search is made in the corresponding time slot schedules for simultaneous availability of the same time slot in both time slot schedules for each of the time slots. If both the input port i time slot schedule and the output port j time slot schedule have availability at a given time slot t, then (1) time slot t is marked in both time slot schedules as in use;

(2) an input schedule message is issued to input port i; and (3) an entry S(i,j,t) is logged into the fabric schedule message to the crossbar switch fabric (refer to FIG. 16 and accompanying description, above).

Figure 22:
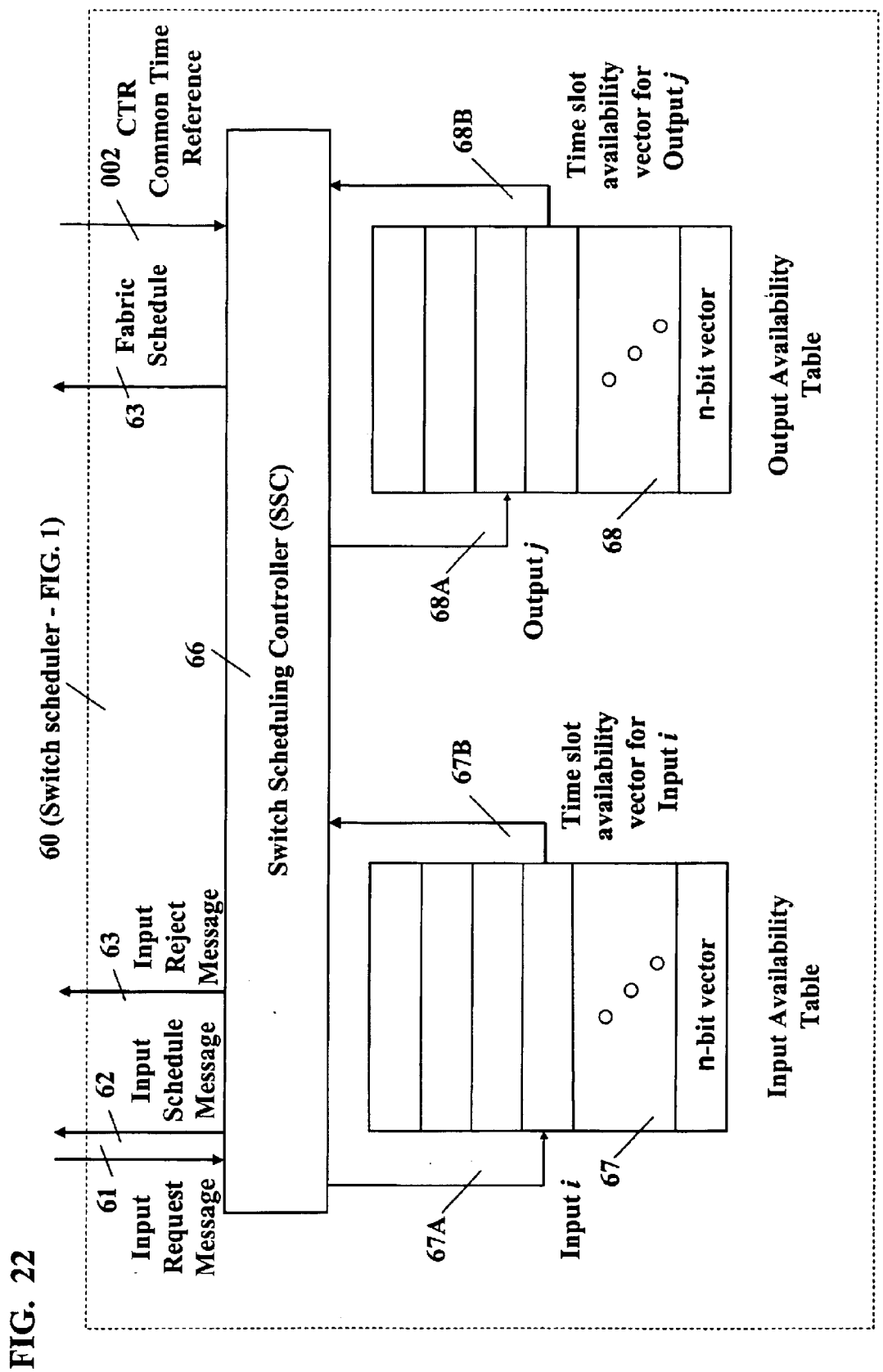
FIG. 22 illustrates additional details of the scheduling computation of the switch scheduling controller in accordance with the present invention.

FIG. 22 is a functional block diagram illustrating additional details of the scheduling computation of step 60-02 of FIG. 20. Within the switch scheduler 60 is a switch scheduling controller (SSC) 66, an input availability table 67, and an output availability table 68. The SSC 66 is constructed of a central processing unit (CPU), a random access memory (RAM) for storing the availability tables, and read only memory (ROM) for storing the controller processing program. The SSC receives the common time reference 002 and generates the slot clock 65 output (not shown). The SSC also receives input request messages 61, and generates input schedule messages 62, input reject messages 63, and the crossbar switch fabric's fabric schedule 64.

As discussed above with respect to FIGS. 1, 20, and 21, the switch scheduler 60 maintains a schedule of all possible time slots for each input port i within a time frame in the input availability table 67. The switch scheduler 60 also maintains a schedule of all possible time slots for each output port j within a time frame in the output availability table 68. For a given input schedule request to transit the switch fabric from input port i to output port j, the SSC 66 uses the input port number i to index 67A into the input availability table 67 producing an input availability vector 67B, and the SSC 66 uses the output port number j to index 68A into the output availability table 68 producing an output availability vector 68B. A search is made in the corresponding availability vectors 67B, 68B for simultaneous availability of the same time slot in both time slot schedules for each of the time slots.

Figure 23:
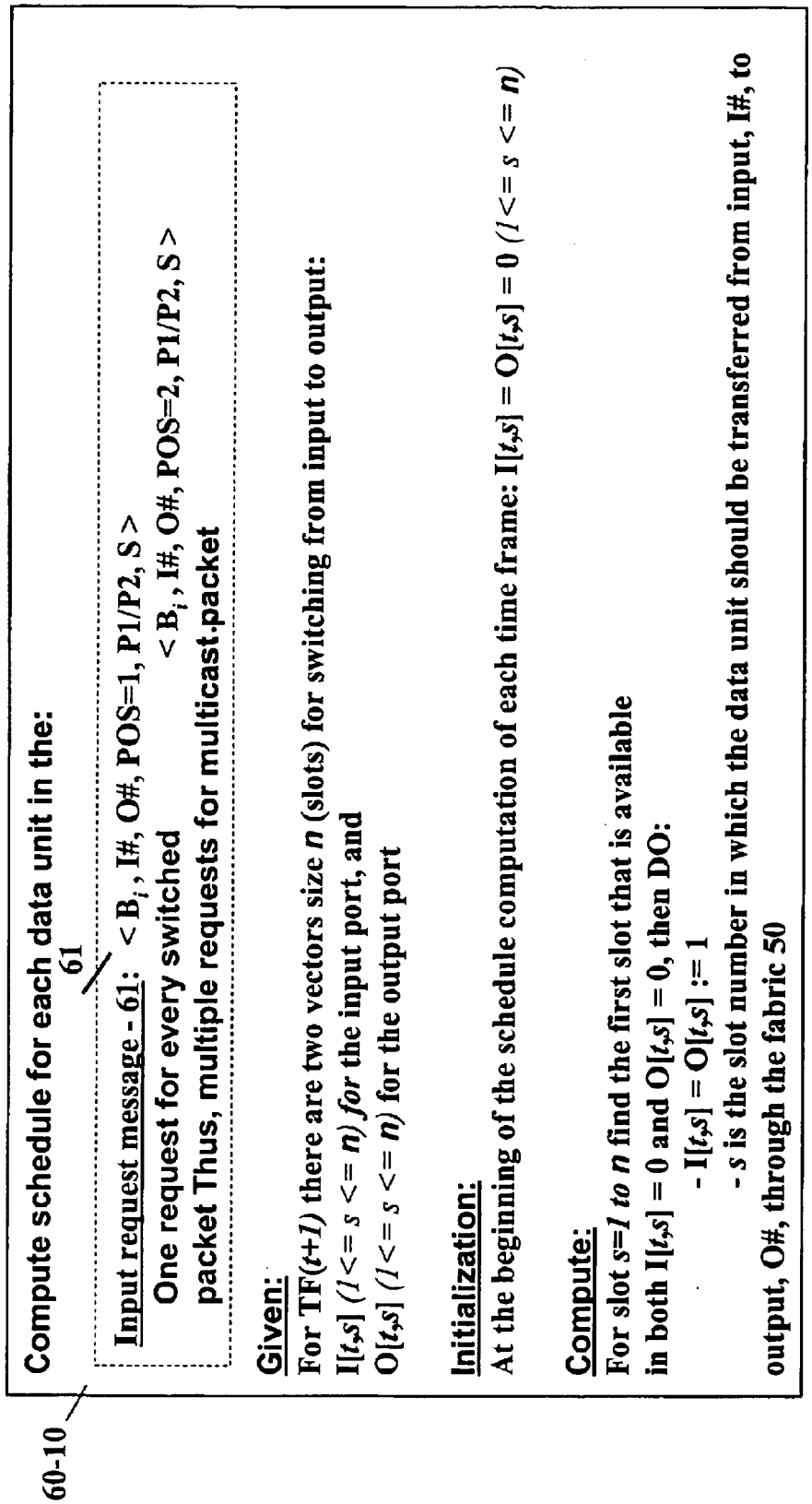
FIG. 23 illustrates further details of the scheduling computation of the switch scheduling controller in accordance with the present invention.

FIG. 23 illustrates further details of the scheduling computation of step 60-02 of FIGS. 20 and 21. As discussed above with respect to FIG. 12, an input schedule request is made for each data packet to be switched. However, the data packet may be sufficiently large as to require multiple time slots for multiple data units to transit the switch fabric 50. As a result of this multiple time slot requirement, the switch scheduling controller 66 may produce a plurality of input schedule messages, one for each of a number of data units, each data unit no larger than the amount of data that can transit the switch fabric in the duration of one time slot.

The computation 60-10, as shown in FIG. 23, describes the initialization and operation of the tables of vectors as discussed above with respect to FIG. 21. At the beginning of each time frame, the input and output availability tables are cleared to indicate all time slots are available. Then for each data unit to be scheduled, the SSC 66 examines each entry in both the input availability vector 67B and the output availability vector 68B looking for the first time slot that has availability in both vectors 67B, 68B. Finding such a time slot determines the slot number in which the data unit to be transferred should be scheduled to transit the crossbar switch fabric 50.

Switching With Wavelength Division Multiplexing (WDM)

In the following the configuration in which the communication link has multiple wavelength channels or wavelength division multiplexing (WDM) is specified. This configuration is called WDM-switching. Many aspects of WDM-switching remain the same as was specified before, and therefore, will not be specified again.

Figures 24A, 24B:
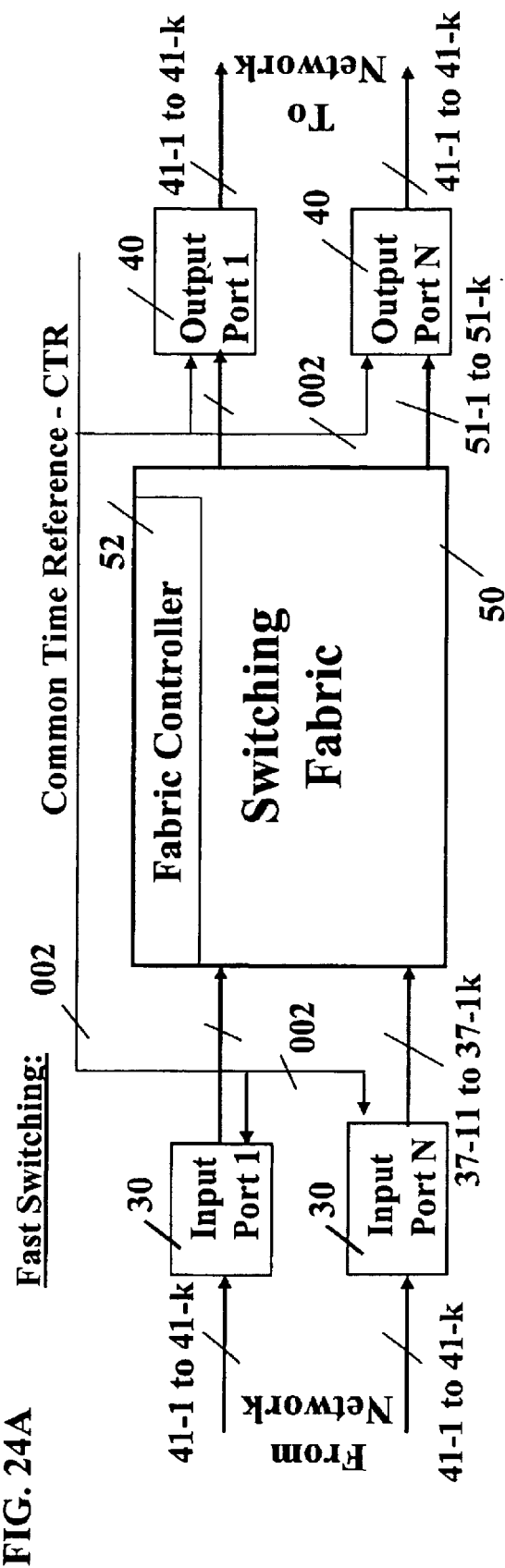
FIG. 24A is a functional diagram of a switch with the FAST Switching mode of operation, which implies that there are pre-computed schedules for transferring the incoming data packets to their respective output ports.
FIG. 24B is a timing diagram of three pipelined forwarding phases, with predefined schedules for forwarding data packets in accordance with the present invention.
Figure 26:
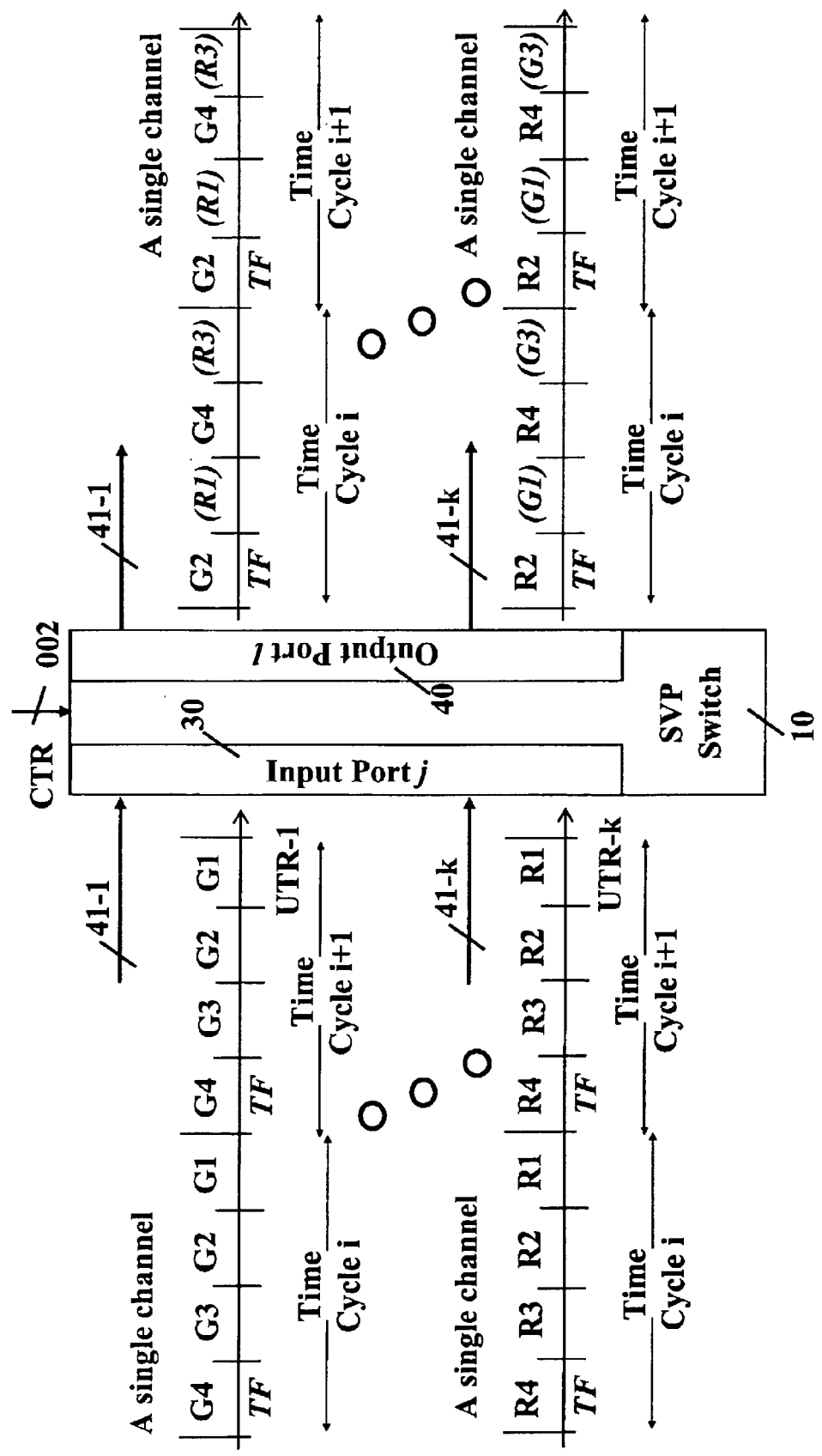
FIG. 26 illustrates a wave division multiplexing (WDM) switch that is connected to optical link with multiple wavelengths, wherein each of the wavelengths constitutes a communication channel that has a time division multiplexing (TDM) structure with time frames, time cycles and super-cycles in accordance with the present invention.

As shown in FIGS. 1, 24 and 26, the input ports and output ports of a switch are connected to a plurality of wavelength channels. FIG. 26 depicts two channels: G or green channel that is connected to 41-1, and R or red channel that is connected to 41-k. The time over each channel is partitioned in accordance to the common time reference (CTR)—as illustrated in FIG. 2. Time frames are grouped into time cycles (in FIG. 26, time frames G1–G4 are grouped into a time cycle, and time frames R1–R4 are grouped into a time cycle on another channel), and time cycles are grouped into super-cycles, wherein a super-cycle can be aligned with UTC (Coordinated Universal Time), which is globally available via, for example, GPS (Global Positioning System). In practical environments the supercycle duration is equal to one second as measured using the UTC (Coordinated Universal Time) standard. In an alternate embodiment the super-cycle duration spans multiple UTC seconds or is a fraction of one UTC second.

Note that in a different embodiment the time frame duration and time cycle duration can be different on different wavelength channels.

In WDM-switching one of the main objectives is to reduce the switching and scheduling complexities. Several methods for doing it are specified.

Method 1

Figure 25:
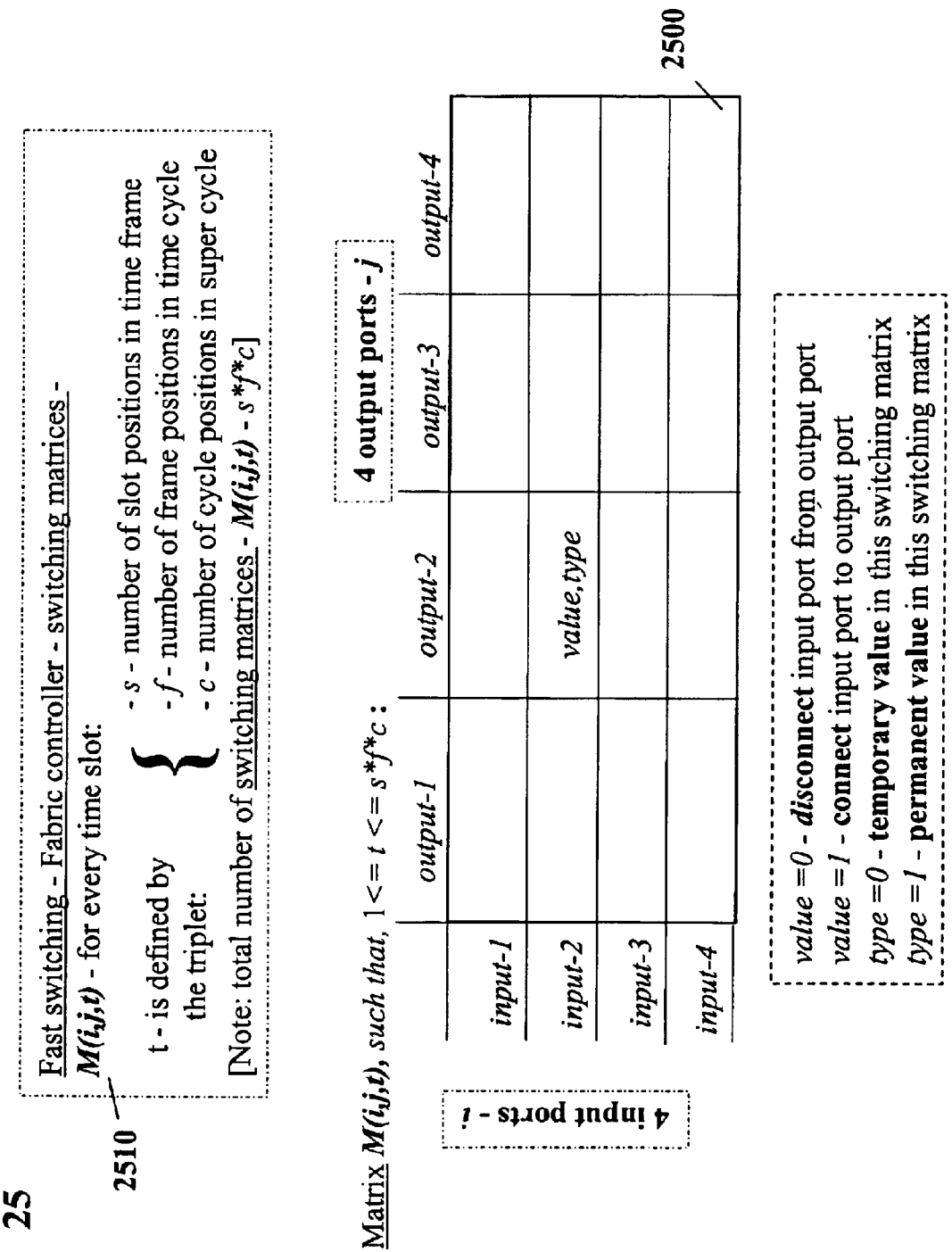
FIG. 25 provides an example of a fabric controller that uses a plurality of FAST switching matrices, where there is a different switching matrix for a subset of time slots in every time frame, for each time frame in every time cycle, and for each time cycle in every super-cycle in accordance with the present invention.

FAST switching (following FIGS. 24–25)

In FAST switching an incoming data packet is switched, by the routing controller 35B in FIG. 7, to the one or more queues, selected from 36-1 through 36-N, that are associated with the output ports the incoming data packet should be forwarded from. The data packet is stored by the packet scheduling and rescheduling controller (PSRC) in the FAST part of one of the B-1 through B-k' in FIG. 9.

Data packets that are stored in the FAST part of a queue have pre-computed schedules for being switched from input to output, and therefore, skip phase 2of scheduling and rescheduling at TF(t+1), as shown in FIG. 15. Instead as illustrated in FIG. 24, there are only three pipelined forwarding phases for forwarding data packets as in the present invention. The phases are numbered phase 1', phase 2', and phase 3'. In the preferred embodiment, each phase is accomplished over a period of time equal to one time frame.

In phase 1', shown in FIG. 24, a data packet is received by the input port serial receiver and forwarded to the routing controller 35B (shown in FIG. 7) where an attachment is made to the data packet header. This attachment includes the Time of Arrival (ToA) 35T and may include other information such as but not limited to port number and WDM channel number: one of 41-1 through 41-k. Also performed in phase 1 is a routing step by the routing controller 35B which directs the data packet to one or more of the corresponding output schedule controller(s), as determined by the multicast indication 35M in the data packet header, as was defined in FIG. 6.

In phase 2, the SBCC 36D (in FIG. 9 and FIG. 10) de-queues and forwards data units responsive to the fabric controller 52 switching matrices 2500, as shown in FIG. 25, which determines to which output port and when a data unit will be switched by the switching fabric 50. The switching fabric responsive to the switching matrices forwards the switched data units to the correct output port 40.

In phase 3, the output port 40 forwards the data packet received from the switch fabric 50 to the serial transmitter 49 and to a selected one of the WDM channels 41-1 through 41-k, as shown in FIG. 17.

Note that each data packet is comprised of one or more data units. In phase 2, data units are switched from input to output, and in phase 3, data packets are forwarded from the output port to the network.

The fast switching from the FAST queues is performed in accordance to switching information stored in a plurality of switching matrices 2500 in FIG. 25. In general, there is a different matrix for every time slot. Therefore, if there are s—slot positions in a time frame, f frame positions in a time cycle, and c cycle positions in a super-cycle, then the total number of switching matrices 2500 S(i,j,t), is s*f*c. In S(i,j,t) the variable i indicates the time slot position in the time frame, the variable j indicates the time frame position in the time cycle, the variable I indicates the time cycle position in the super-cycle.

Each switching matrix has an element for each input-output pair, consequently, if there are four input ports and four output ports the total number of elements in each matrix is sixteen, as shown, for example, in FIG. 25. The value in the elements in each matrix can be of two types: type=0—temporary value in this switching matrix, and therefore, used only once, and type=1—permanent value in this switching matrix, and therefore, used multiple times.

For switching out of the FAST queue, the permanent values are used. If the traffic pattern is fixed the switching matrices contain only permanent values.

In Method 2 below, it is shown how setting up the permanent values in the switching matrices can be done on the fly by the next data packet in the stream.

Method 2
"Train" Switching Through the FAST Queues
The objective of "train" switching is twofold:
1. To avoid the Phase 2 (the scheduling and rescheduling operations) in FIG. 15—as much as possible, and
2. To avoid the need of setting up the permanent values in the switching matrices prior to the transmission of data packets of a real time flow.

There are various ways to achieve the above two objectives. One simple way is using the first set data packets in the time frame, time cycle or super-cycle for setting up the permanent values in the switching matrices 2500 in FIG. 25. For example, if a certain PID has a transmission pattern of three data packets that are transmitted in three predefined time frames of each time cycle, then the first three data packet will use Phase 2 (the scheduling and rescheduling operations) in FIG. 15—while subsequent data packets over this PID will be switched from the FAST queues using the permanent values as specified in Phase 2' in FIG. 25.

One way to identify the first data packets in a stream or flow over a synchronous virtual pipe (SVP) with a pre-defined PID is to encode this information in the data packet header. This can be done as was specified in FIG. 6.

The data packet header in FIG. 6A comprises a 2-bit, L1/L2, field 35L, which provides information regarding this data packet location within a stream of data packets the are part of the same SVP of the same call/connection.

As shown in FIG. 6B, the meaning of this field is as follows:
Σ Setup: L1/L2=00—first set of data packets in the flow (SVP)—compute a schedule as was specified in Phase 2 (the scheduling and rescheduling operations) in FIG. 15;
Σ Run-time: L1/L2=01—subsequent data packets that are transferred via the same SVP and use previously computed schedules; and
Σ Release: L1/L2=10—last set of data packets in the flow (SVP)—use previously computed schedules and release the permanent values in the switching matrices 2500—so they can be used by other real time flow/call/connections.

Note, as shown in FIGS. 9 and 10, per time frame queuing is performed, that every phase in FIGS. 15 and 24 is one time frame, and that the order of transmission of different flows from the same FAST queue can be arbitrary. This fact simplifies the scheduling and timing requirement from the switch design and distinguishes this approach from circuit switching.

The next two methods were optimized for very high speed operation. In method 3, the switching is still done electronically, while in method 4 the switching is optical.

Method 3
Time Frame Switching and Forwarding (FIGS. 26–29)
A novel time frame switching fabric control is provided by the present invention which stores a predefined sequence of switch fabric configurations, responsive to a high level controller that coordinates multiple switching systems, and applies the stored predefined sequence of switch fabric configurations on a cyclical basis having complex periodicity. The application of the stored predefined switch fabric configurations permits the switches of the present invention to relay data over predefined, scheduled, and/or reserved data channels without the computational overhead of computing those schedules ad infinitum within each switch. This frees the switch computation unit to operate relatively autonomously to handle transient requests for local traffic reservation requests without changing the predefined switch fabric configurations at large, wherein the switch computation unit provides for finding routes for such transient requests by determining how to utilize underused switch bandwidth (i.e., "holes" in the predefined usage). The computational requirements of determining a small incremental change to a switch fabric are much less than having to re-compute the entire switch fabric configuration. Further, the bookkeeping operations associated with the incremental changes are significantly less time-consuming to track than tracking the entire state of the switch fabric as it changes over time.

Figure 28:
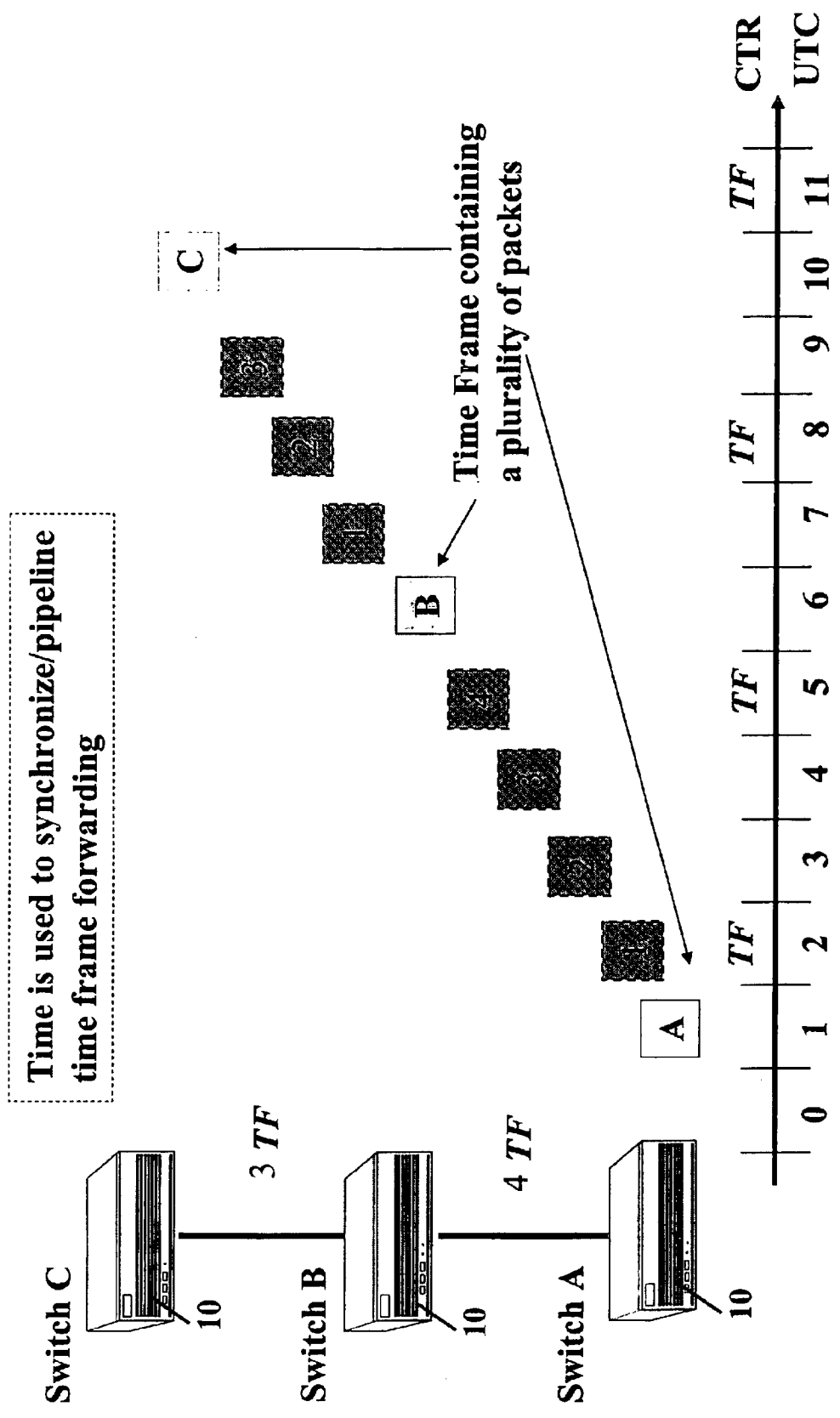
FIG. 28 illustrates an example of pipeline forwarding of time frames, in accordance with the present invention.

In this method 3, the content of the whole time frame is switched in the same way—namely, all the data packets in the time frame are switched to the same output port. Consequently, there is no need to use time slots. FIG. 28 shows an example of time frame (TF) switching and forwarding through a sequence of the switches: Switch A, Switch B, and Switch C. According to this specific example, the content of a TF that was forwarded from Switch A at time frame 2 will reach Switch B at time frame 5, then switched to the output port at time 6, then forwarded at time frame 7 and will reach Switch C at time frame 9.

The method of time frame switching is extremely useful in reducing the switching complexity of communications systems with a very high transmission rate (e.g., OC-48, OC-192, OC-768) and/or a plurality of wavelengths (i.e., WDM channels), as shown in FIG. 26. In this example (FIG. 26) there are two channels: G or green channel that is connected to 41-1 and R or red channel that is connected to 41-k. The time over each channel is partition in accordance to the common time reference (CTR)—as was depicted in FIG. 2. In this case time frames are grouped into time cycles (in FIG. 26, time frames G1–G4 are grouped into a time cycle, and time frames R1–R4 are grouped into a time cycle on another channel), and time cycles are grouped into super-cycles.

As shown in FIG. 6, the switching from input to output maps input time frames to output time frames in an arbitrary manner. In this example, FIG. 26, the following mapping is performed for the green channel: G1 to the position of R3, G2 to the position of G4, G3 to the position of R1, G4 to the position of G2, and the following mapping is performed for the red channel: R1 to the position of G3, R2 to the position of R4, R3 to the position of G1, R4 to the position of R2.

FIG. 27 depicts a general mapping format for time frame switching and forwarding over a plurality of WDM channels: (p-in, w-in, t-in, c-in) TO (p-out, w-out, t-switch, c-switch, t-out, c-out), wherein p-in—input port #, w-in—input wavelength (color), t-in-time frame # in (within a time cycle), c-in—time cycle # in (within a super-cycle) and p-out —output port #, w-out—output wavelength (color), t-switch—time frame # switch (within a time cycle), c-switch—time cycle # switch (within a super-cycle), t-out—time frame # out (within a time cycle), c-out—time cycle # out (within a super-cycle).

The table 2700 in FIG. 27 shows time frame switching for a given p-in (input port). The rows in table 2700 represent two WDM channels (red and green) with four time frames in every time cycles, which are corresponding to the description in FIG. 26. The columns in table 2700 represent 1 time cycles of one super-cycle. Each entry in table 2700 represents: p-out or the output port, w-out or the output wavelength, t-switch or the time frame switching time from input to output, c-switch or the cycle time switching time from input to output, t-out or the time frame out of the out put port, c-out or the time cycle out of the output port.

Figure 29:
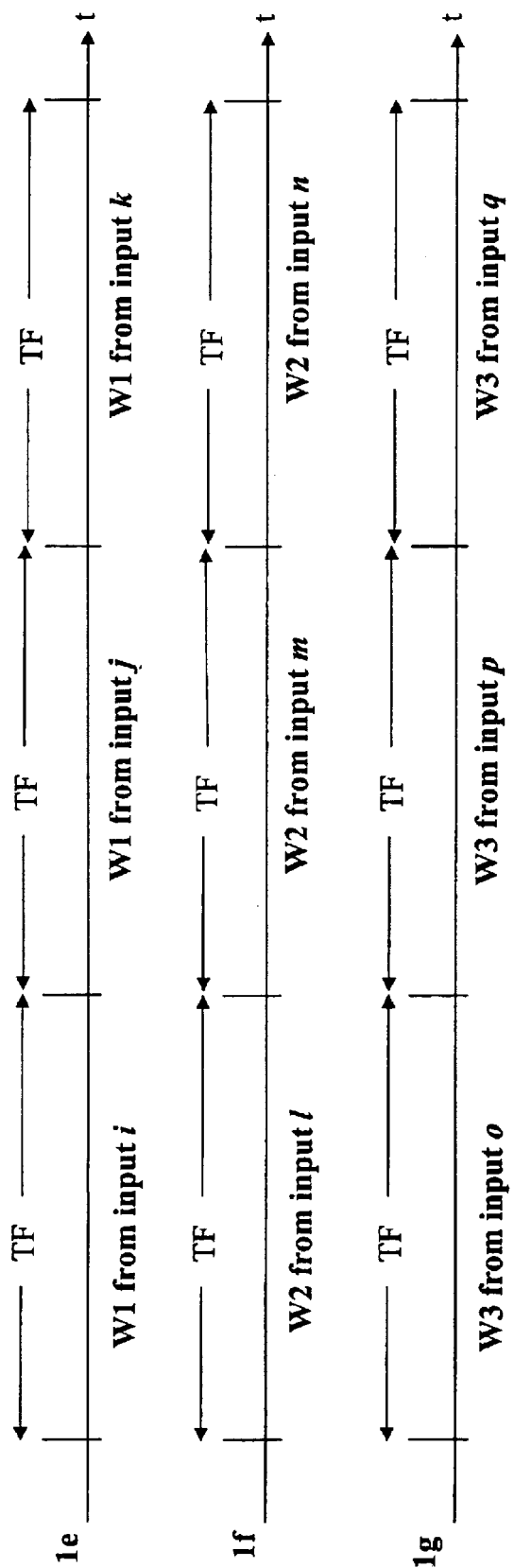
FIG. 29 illustrates an example of mapping time frames, received over the same wavelength received through multiple input ports, to one wavelength (channels) on the same output port, in accordance with the present invention.

FIG. 29 depicts the basic WDM time frame switching property: The source of any wavelength (W1, W2, and W3) in any time frame can come from any input port, 1<=i,j,k,l,m,n,o,p,q <=N, of a switch with N input ports, where i,j,k,l,m,n,o,p,q are input port indices. In the example in FIG. 29 there are three optical channels (or three distinct wavelengths) W1, W2 and W3, with the following time frame mapping: W1 from input i, W1 from input j, W1 from input k, W2 from input l, W2 from input m, W2 from input n, W3 from input o, W3 from input p, W3 from input q. In summary, the out-going content (i.e., data packets) in every time frame on any WDM channel can be the incoming content of any time frame on any WDM channel. The delay between the out-going time frame and the incoming time frame is a predefined number of 1, 2, 3 and so on time frames. Typically, this input to output delay is not longer than 3–4 time frames.

In the context of this invention each time frame can contain a plurality of format types that are scheduled and transferred while maintaining individual identity, wherein the possible format types are, but not limited to: a fixed size ATM cell, a variable sized IP data packet, a frame relay data packet, a fiber channel data packet.

Method 4
Optical Time Frame Switching (FIGS. 30 and 31)

In method 4, as in the previous method, Method 3, the content of the whole time frame is switched in the same way—namely, all the data packets in the time frame are switched to the same output port. Consequently, there is no need to use time slots. However, in this method, Method 4, the switching is done optically by an all-optical time frame switch, as shown in FIGS. 30 and 31. The all optical switching is still being controlled by digital electronic circuitry.

The control function of the all-optical time frame switch operates by the following principle (FIG. 30):

In every time frame within a time cycle and within a super-cycle, an input wavelength is switched to a selected defined subset of the out-going optical channels performing the following mapping:

(p-in,w-in,t-in,c-in) TO (p-out,w-out,t-out,c-out), wherein p-in—input port #, w-in—input wavelength (color), t-in—time frame # in (within a time cycle), and c-in—time cycle # in (within a super-cycle), are the input variables, and p-out—output port #, w-out—output wavelength (color), t-out—time frame # out (within a time cycle), and c-out time cycle # out (within a super-cycle), are the output variables.

The above mapping is defined by a switching matrix. The switching matrix is defined by a plurality of tables 3000 for w-in and p-in in FIG. 30. The rows in this table 3000 are for each of the 4 time frames in a time cycle and the columns are for each of the 4 time cycles in a super-cycle. In other words, the table 3000 has an entry for each time frame of a super-cycle. Each entry in the table 3000 defines p-out, w-out, t-out, and c-out.

A sequence of all optical switches operates as was shown in FIG. 28, which shows an example of time frame (TF) switching and forwarding through a sequence of the switches: Switch A, Switch B, and Switch C. According to this specific example the content of a TF that was forwarded from Switch A at time frame 2 will reach Switch B at time frame 5, then switched to the output port at time frame 6, then forwarded at time frame 7 and will reach Switch C at time frame 9.

Figure 31A:
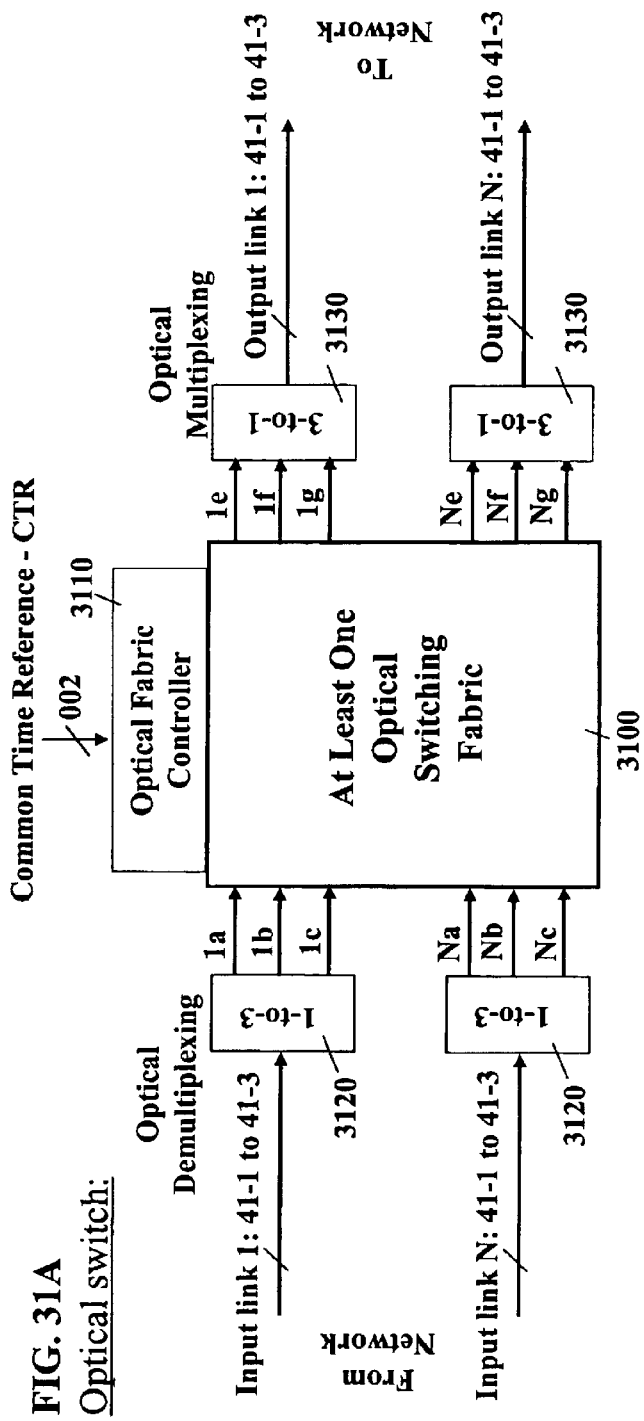
FIG. 31A is a schematic diagram of an all optical switch with at least one optical switching fabric, which switches a plurality of optical wavelengths, wherein the optical switching matrix (as in FIG. 30, for example) changes every time frame.
Figure 31B:
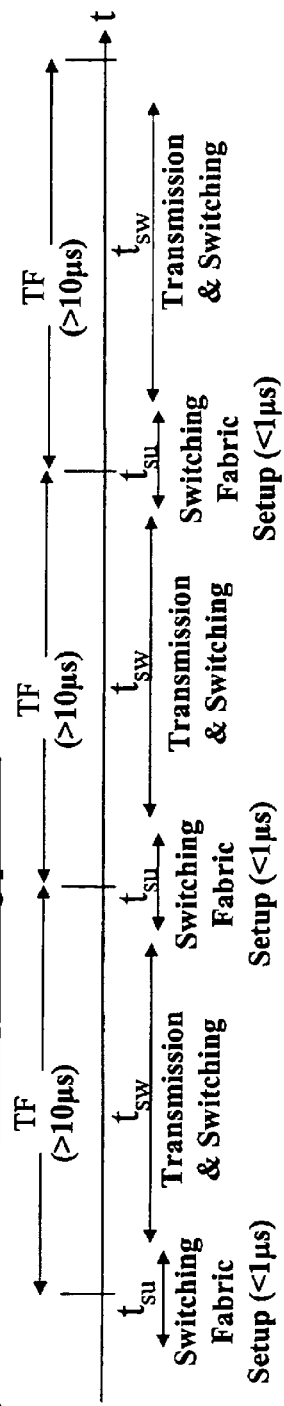
FIG. 31B is a timing diagram of the all optical switch operation with two phases: one in which the actual switching is performed and the other in which the current switching matrix is being replaced by a new switching matrix.

FIG. 31A shows an example of how an optical switch may operate. The incoming optical WDM signal gets through an optical demultiplexer 3120, which separates the multiplexed incoming optical signal, 41-1 to 41-3, into three separate optical signals, 1*a*, 1*b*, and 1*c*, which are coupled with the all optical switching fabric 3100. Note that the optical demultiplexer may consist of an optical-to-electronic conversion together with an electronic-to-optical conversion in order to restore the optical signal into its original quality. The outputs of the optical switching fabric 3100, 1*e*, 1*f*, and 1*g*, are coupled into an optical multiplexer 3130. Note again that since the optical switching fabric 3100 may degrade the optical signals the optical multiplexer may consist of an optical-to-electronic conversion together with an electronic-to-optical conversion in order to restore the optical signal into its original quality. The output of the optical multiplexer 3130 is coupled to the optical link 41-1 to 41-3.

The optical switching matrix for every time frame is extracted from the plurality of tables 3000 for w-in and p-in in FIG. 30. The optical transmission and switching have the following temporal pattern, as defined in FIG. 31B, with two alternating phases: (1) t-sw—the period of time, responsive to CTR 002, in which the optical switch is switching the optical signals: 1*a*, 1*b*, and 1*c* to 1*e*, 1*f*, and 1*g*, and (2) t-su—the period of time, responsive to CTR 002, in which the optical switching pattern is changed—during this period of time a new optical switching matrix is set-up. Typically, the time period of t-sw is much larger than t-su.

Method 5
Multiple Switching Fabrics as Shown in FIG. 32.

In this method 5, the switching is performed for every wavelength separately, as shown in FIG. 32A. The switching can be performed either electronically or optically, as it was previously discussed.

When a switching fabric is associated with a single wavelength, then the system is equivalent to having multiple independent switches. In FIG. 32A each input port 3210 receives three multiplexed optical channels, 41-1 to 41-3, which after demultiplexing are coupled to three switching fabrics in the following manner: the first channel, 37-11, from every input port is coupled to the first switching fabric 50-1, the second channel, 37-12, from every input port is coupled to the second switching fabric 50-2, and the third channel, 37-13, from every input port is coupled to the third switching fabric 50-3. The outputs of the three switching fabrics are coupled to the output ports in the following manner: the first output 51-1 to 51-3 from every switching fabric is coupled to output port 1 3220, the second output 51-1 to 51-3 is coupled to output port 2 3220, and so forth.

Each of the switching fabrics has its own fabric controller: switching fabric 50-1 has fabric controller 52-1, switching fabric 50-2 has fabric controller 52-2, and switching fabric 50-3 has fabric controller 52-3.

FIG. 32B shows a three phase operation of the method that is based on the FAST Queues (as were shown in FIGS. 9 and 10) in which there are pre-computed switching schedules for the incoming data packets.

In phase 1, shown in FIG. 32B, a data packet is received by the input port serial receiver and forwarded to the routing controller 35B (shown in FIG. 7) where an attachment is made to the data packet header. This attachment includes the Time of Arrival (ToA) 35T and may include other information such as but not limited to port number and WDM channel number: one of 41-1 through 41-3. In phase 1, a routing step is also performed by the routing controller 35B which directs the data packet to one or more of the corresponding output schedule controller(s), as determined by the multicast indication 35M in the data packet header, as was defined in FIG. 6.

In phase 2, the SBCC 36D (in FIG. 9 and FIG. 10) de-queues and forwards data units responsive to one of the fabric controllers 52-1, 52-2 or 52-3, that determines to which output port the data unit will be switched by the corresponding switching fabric 52-1, 52-2 or 52-3.

In phase 3, the output port 3220 forwards the data packet received from one of the switch fabric 52-1, 52-2 or 52-3, on one of the WDM channels 41-1 through 41-3, as was shown in FIG. 32A.

Method 6 utilizes alignment of time frame switching as shown in FIGS. 33–38.

Figure 33A:
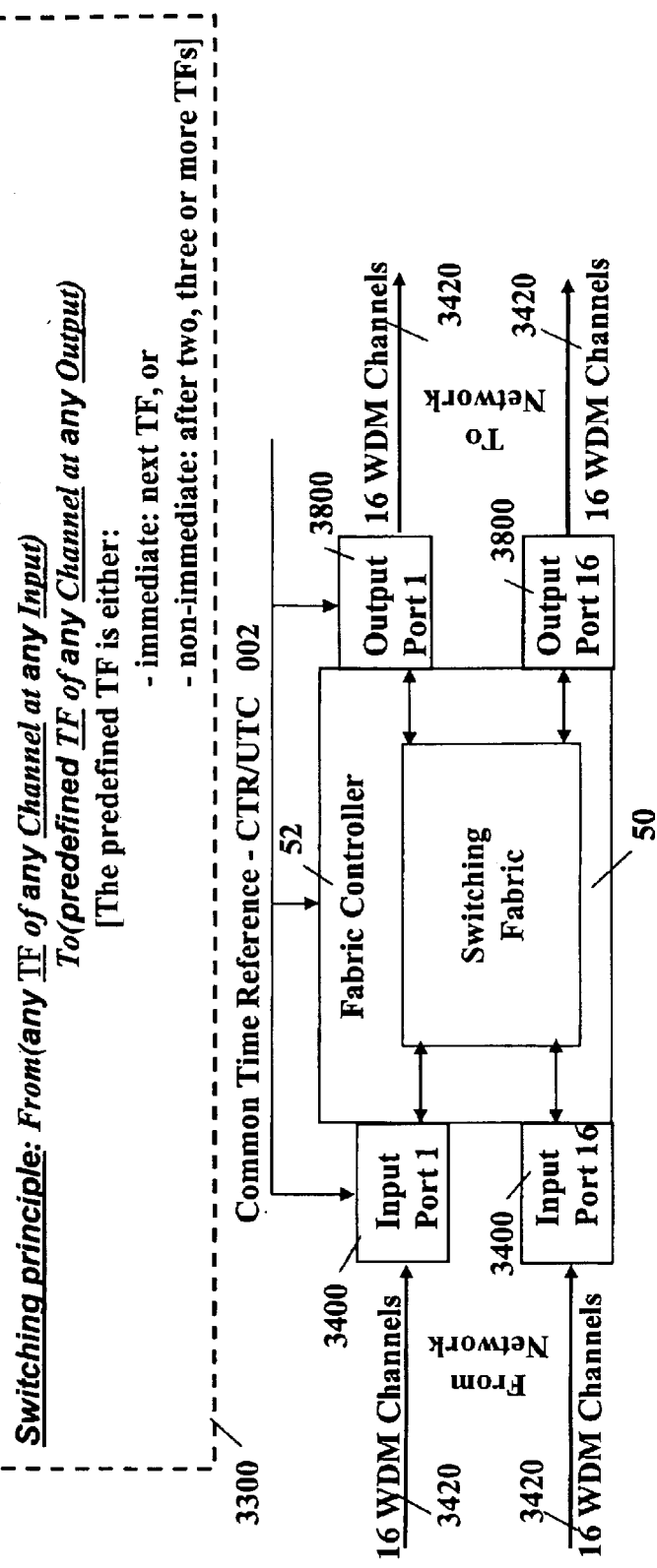
FIG. 33A is a functional description of a switch with 16 ports—each with 16-wavelength division multiplexing optical channels, such that it is possible to transfer: From (any time frame (TF) of any Channel at any Input) To (a pre-defined time frame (TF) of any Channel at any Output)

The switch that is described in FIG. 33A operates according to the following switching principle:

From (any TF of any Channel at any Input)

To (predefined TF of any Channel at any Output)

Note that the predefined TF is either an immediate TF—next TF—or a non-immediate TF—after two, three or more TFs.

The switch in FIG. 33A has 16 input ports 3400 and 16 output ports 3800, wherein each port is connected to 16 WDM optical channels 3420. The input ports and output ports are coupled by a switching fabric 50 and the switching operation is controlled by a fabric controller 52. The fabric controller determines the switching pattern through the switching fabric from the plurality of input optical channels 3420 to the plurality of output optical channels 3420.

Figure 33B:
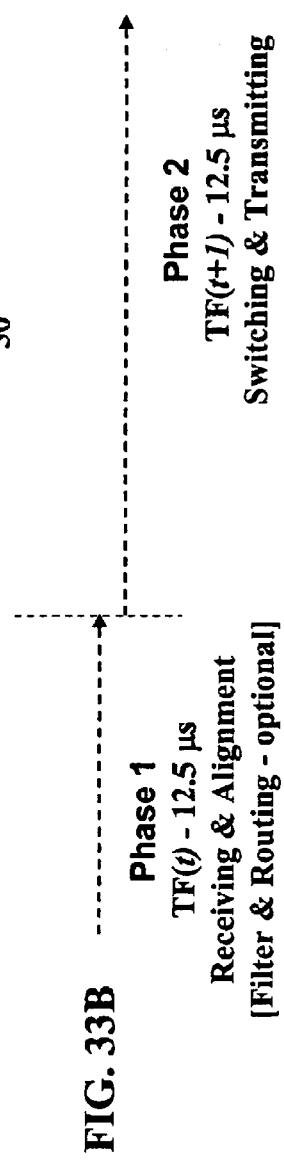
FIG. 33B is a timing diagram of a switching operation that is responsive to the common time reference 002 with two pipeline forwarding phases.

FIG. 33B presents an example of two-phase switch operation: Phase 1—Receiving & Alignment—in this phase the data packets are received via the optical channels, and stored in the alignment subsystem 3500 in FIG. 34 and aligned with the CTR 002, which is discussed below.

Phase 2—Switching & Transmitting—in this phase the content of a whole time frame is switched and then transmitted to the optical channel responsive to the CTR, which means that the transmission of the content of a time frame starts at the beginning of a time frame as determined by the CTR.

The input from the optical channel can come either from an output port 3800 of another switch or from an SVP interface 4500 that performs synchronizer/shaper functions, which consist in mapping of asynchronous data packets into time frames. This kind of mapping is typically needed at the network ingress, as shown in FIG. 34.

Figure 34:
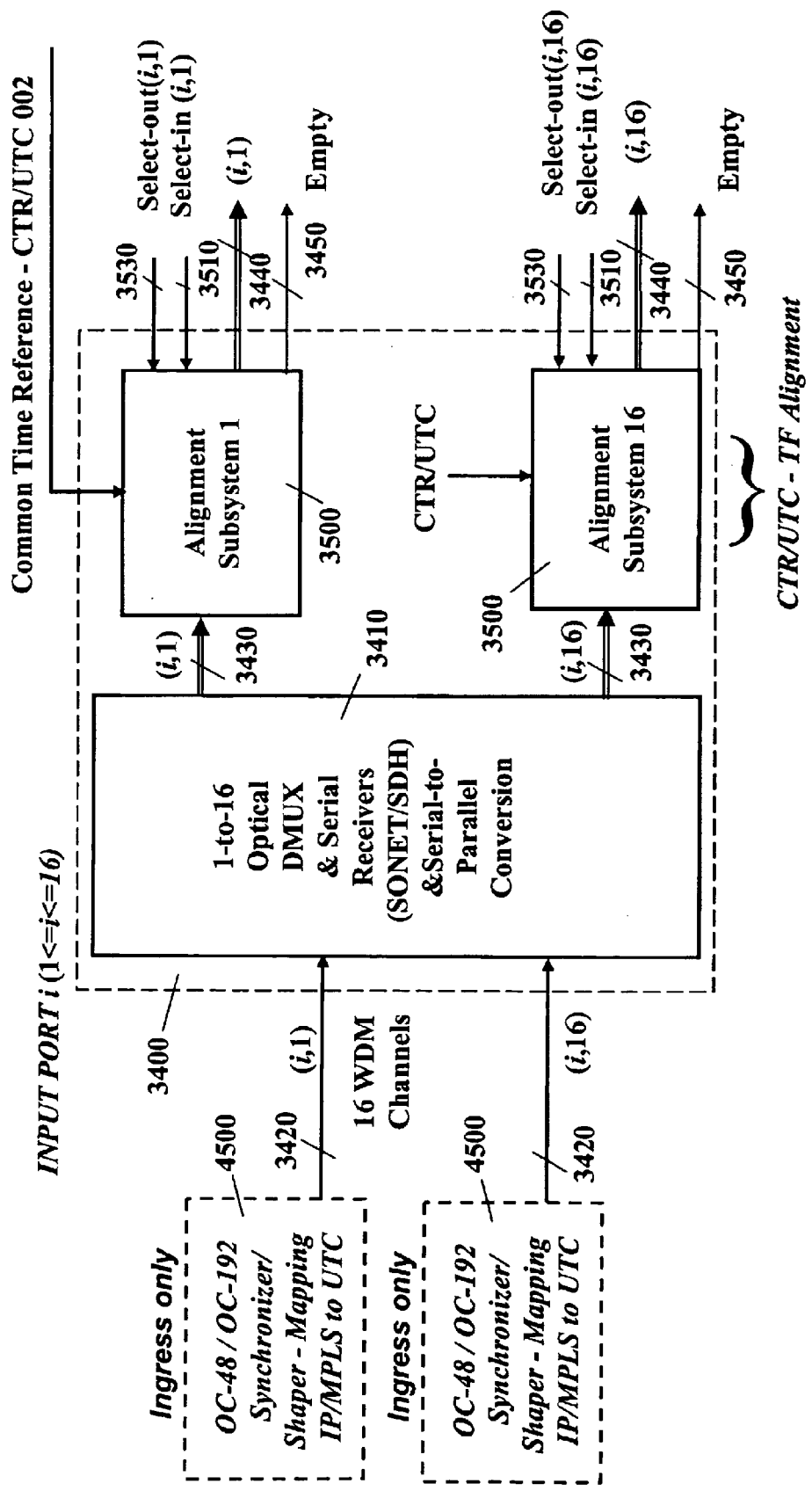
FIG. 34 is a functional block diagram illustrating a wavelength division multiplexing input port with a plurality of serial receivers, serial-to-parallel conversion and a plurality of alignment subsystems.
Figure 35:
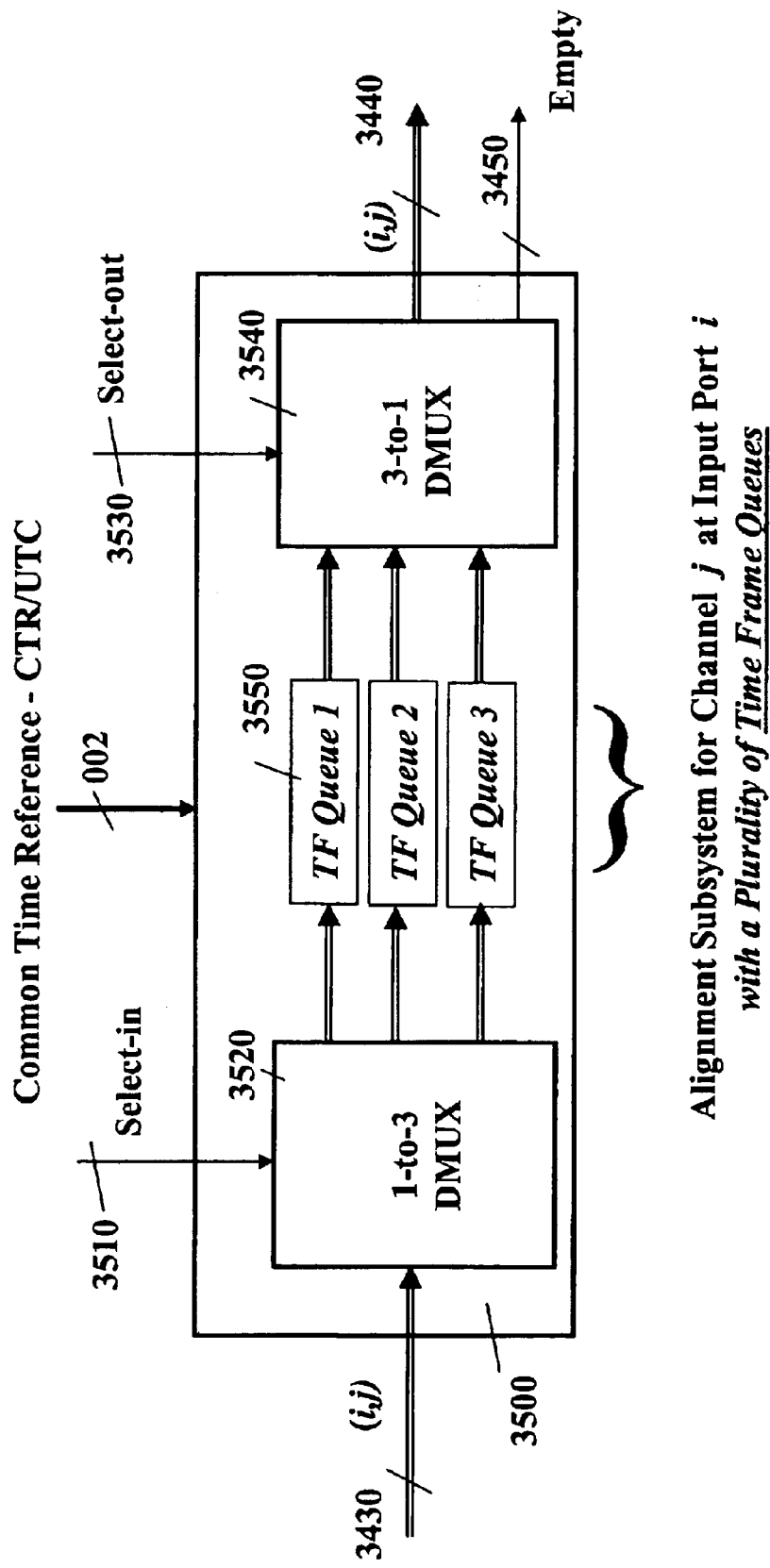
FIG. 35 is a functional block diagram of the alignment subsystem that operates responsive to CTR and the serial link relative timing.

The alignment subsystem 3500, in FIG. 35, receives its data packet input from the 1-to-16 Optical DMUX & Serial Receivers (SONET/SDH) &Serial-to-Parallel Conversion 3410 via the 3430 connection, as shown in FIG. 34. The 3430 connection can be either a serial link or a parallel bus. For each WDM optical channel (j) there is one alignment subsystem 3500. The data packets that output from the alignment subsystem 3500 are transferred to out-going optical channels via the switching fabric 50.

Figure 36:
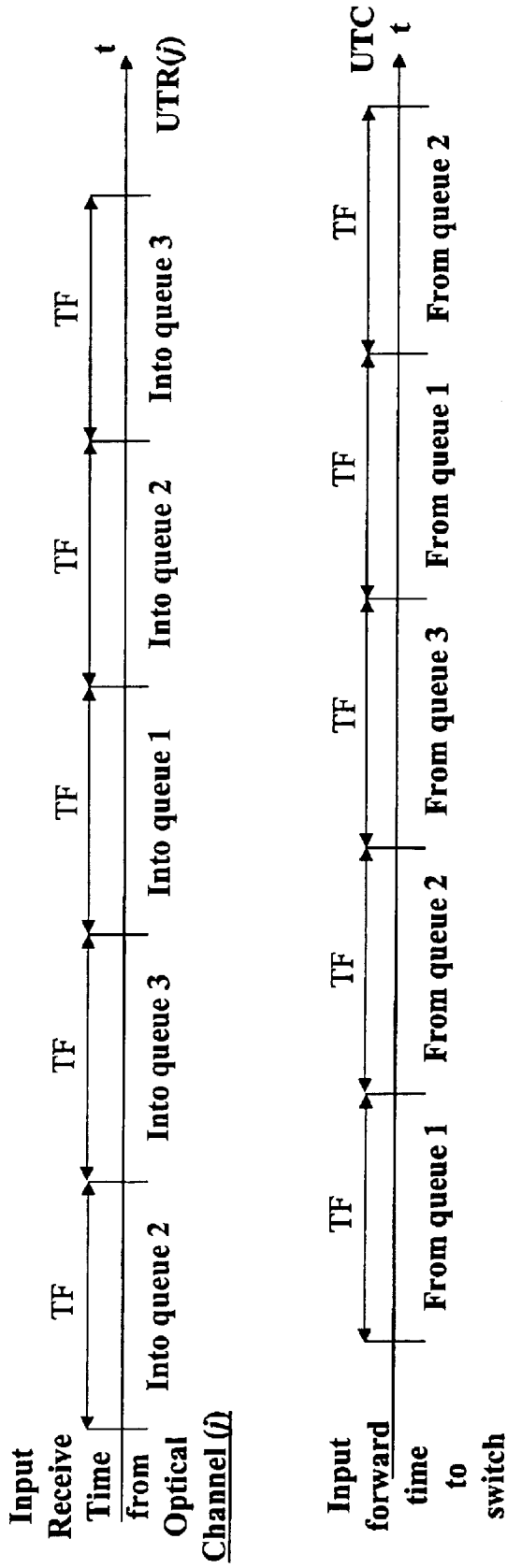
FIG. 36 is a timing diagram of the alignment subsystem operation responsive to CTR and the serial link relative timing.

There is a plurality of selectable input ports (i) 3400 each receiving data packets over a plurality of incoming optical channels (j) and a plurality of output ports (k) 3800 each sending data packets over a plurality of outgoing optical channels (l). Each of the incoming optical channels (j) has a unique time reference (UTR-j), as shown in FIG. 36, that is independent of the CTR 002, also shown in FIG. 36.

The (UTR-j) is divided into SCs (super-cycles), TCs (time cycles), and TFs (time frames) of the same durations as the SCs, TCs, and TFs of the CTR used on optical channel (j), as it was shown in FIG. 2. Each of the SCs, TCs, and TFs of the (UTR-j) starts and ends at a time different than the respective start and end in time of the SCs, TCs, and TFs of the CTR. A plurality of buffer queues 3550 are part of each alignment subsystem 3500, wherein each of the respective buffer queues is associated, for each of the TFs, with a unique combination of one of the incoming optical channels and one of the outgoing optical channels.

Between successive SCs, TCs, and TFs of the UTR-j can be explicit or implicit delimiters. The explicit delimiters can be realized by one of the control codewords from FIG. 5C. There can be a different delimiter control word to signal the beginning of a new TF (i.e., a time frame delimiter—TFD), TC (i.e., a time cycle delimiter—TCD) and SC (i.e., a super-cycle delimiter—SCD). The explicit delimiter signaling can be realized by the SONET/SDH path overhead field that was design to carry control, signaling and management information. An implicit delimiter can be realized by measuring the UTR-j time with respect to the CTR.

A mapping controller within the fabric controller 52 system for logically mapping, for each of the (UTRj) TFs, selected incoming optical channels (j) to selected buffer queues, and for logically mapping, for each of the CTR TFs, selected ones of the plurality of buffer queues to selected outgoing channels (l).

Each alignment subsystem 3500 selects which of the buffers 3550 will receive data packets from the optical channel (j) at every time frame as it is defined by the (UTR-j). The selection process by the alignment subsystem 3500 is responsive to the Select-in signal 3510 received from the fabric controller 52. The Select-in signal 3510 is fed into a 1-to-3 DMUX (demultiplexer) 3520 that selects one of 3 queue buffers in 3550: TF Queue1, TF Queue2, TF Queue3. The buffer queues in the alignment subsystem for each time frame can be filled with data packets in arbitrary order to an arbitrary level, prior to output.

The alignment subsystem 3500 comprised of a plurality of TF queues, wherein each of the time frame queues comprises means to determine that the respective time frame queue is empty, wherein each of the time frame queues further comprises means to determine that the respective time frame queue is not empty. The empty (and not empty) signal 3450 is provided to the fabric controller 52.

The mapping controller further provides for coupling of selected ones of the time frame queues 3550 to respective ones of the outgoing channels (l), for transfer of the respective stored data packets during the respective associated CTR time frames. This operation is performed responsive to the Select-out signal 3530, as shown in FIG. 35.

A timing diagram description of the alignment operation is provided in FIG. 36.

The operation follows this principle of operations:

TF Alignment of UTR(j) to UTC—with three input queues—principle of operation: The same queue is not used simultaneously for:

1. Receiving data packets from the serial link—responsive to Select-in signal 3510 received from the fabric controller 52, and
2. Forwarding data packets to the switch—responsive to Select-out signal 3530 received from the fabric controller 52.

In the timing diagram example of FIG. 36 it is shown than a TF queue (TF Queue1, TF Queue2, TF Queue3—3550) is not written into and read from at the same time. In other words, the Select-in signal 3510 and the Select-out signal 3530 will not select the same TF queue at the same time.

The alignment s ubsystem 3500 can have more than three TF queues 3550—this can be used for Non-immediate forwarding method: in this method a data packet is delayed in the input port until there is an available time frame to be switched to the selected one of the outgoing optical channels (l). In this method the delay is increased, i.e., more time frames may be needed to get from input to output. The non-immediate forwarding add flexibility to the scheduling process of SVPs.

In an alternative embodiment, the alignment subsystem 3500 comprises only two buffers and an optical delay line. One buffer receives data from the corresponding input link, while data to be transferred through the switching fabric are retrieved from the other buffer. The delay line between the input link and the alignment subsystem ensures that the UTR of the corresponding link is aligned with the CTR. In other words, the time a packet takes to travel from the alignment subsystem of the upstream time driven switch 10 to the alignment subsystem of the considered switch (including the propagation delay through the switching fabric, the fiber channel link connecting the two switches, and the optical delay line) is an integer multiple of a TF. In order to achieve this the delay element adds a link delay equal to the difference between a beginning of the CTR time frame and a beginning of the UTR-j time frame.

The optical delay line can have programmable tap points possibly comprised of optical switches. The optical delay line can be external to the switch, internal, or integrated in the optical receiver.

Figure 38:
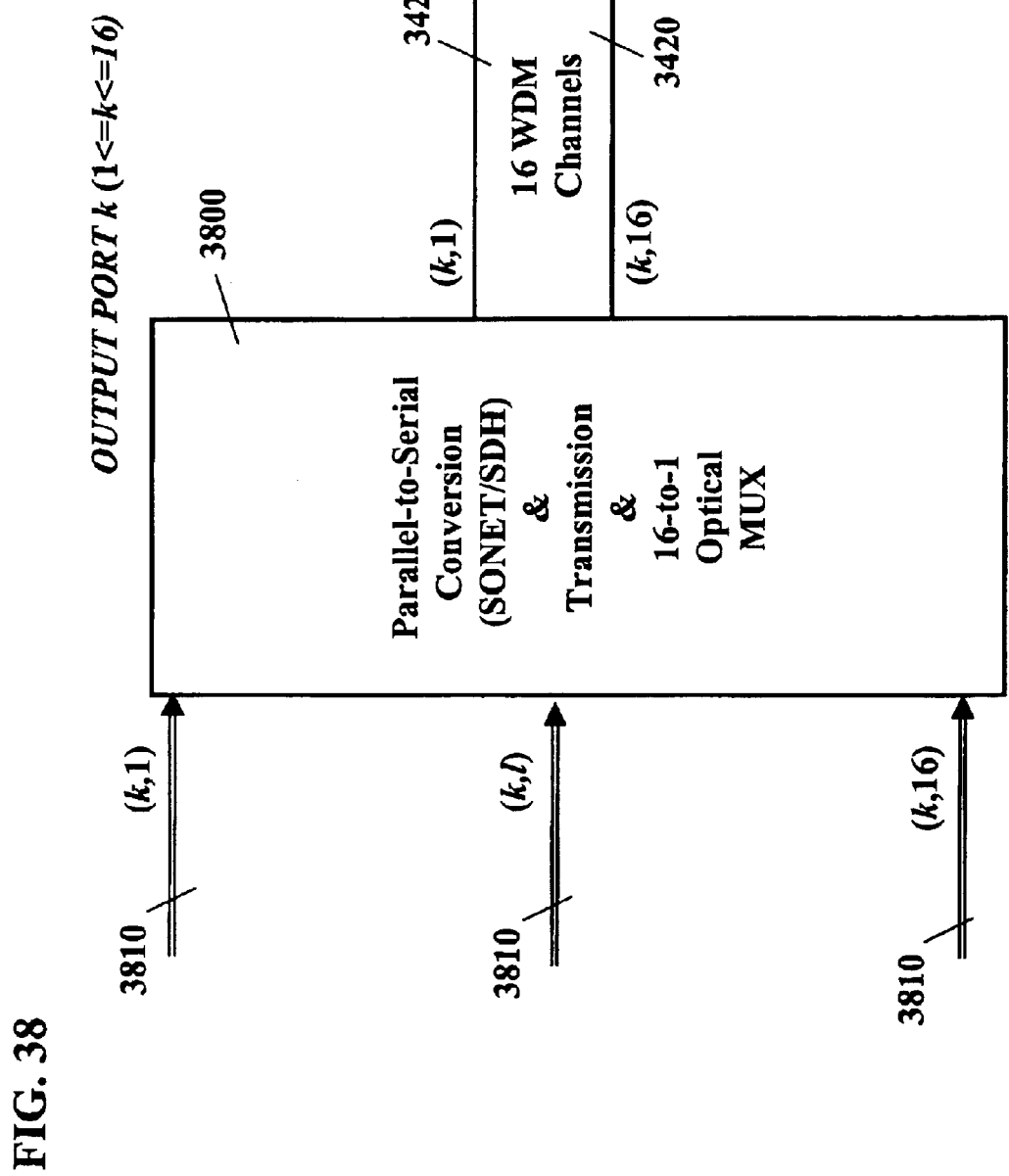
FIG. 38 illustrates a wavelength division multiplexing output port.

FIG. 38 shows the output port 3800 for 16 optical channels 3420. The output port performs the Parallel-to-Serial Conversion, the SONET/SDH Transmission, and the 16-to-1 Optical MUX into an optical fiber.

The output port shown in FIG. 38 has no buffers, and consequently, data packets are forwarded from the switching fabric to the network with minimum delay.

Figure 37:
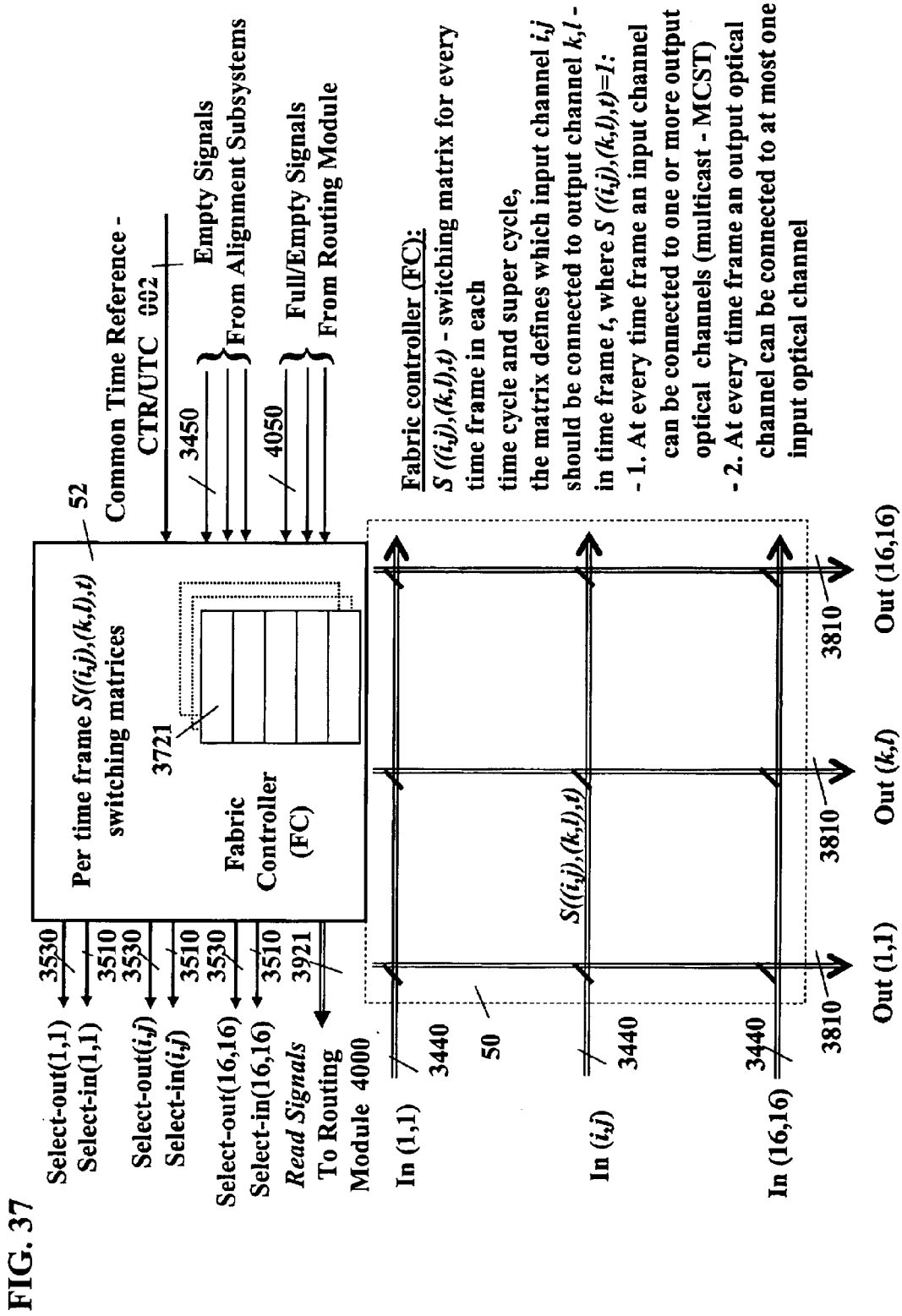
FIG. 37 is a block daigram and schematic of the structure of a switch and a fabric controller with memory for a plurality of switching matrices.

FIG. 37 shows a switching fabric 50 with a fabric controller (FC) 52. The fabric controller operates in the following way:

S((i,j),(k,l),t)—is a switching matrix 3721 for every time frame in each time cycle and super-cycle, the switching matrix defines which input i,j should be connected to output k,l—in time frame t, where when S((i,j),(k,l),t)=1 there is a connection, when S((i,j),(k,l),t)=0 there is no connection.

The switching matrices 3721 follow the following restrictions:

1. At every time frame an input optical channel can be connected to one or more output optical channels (multicast—MCST operation of 1-to-many is possible)
2. At every time frame an output optical channel can be connected to at most one input optical channel The information required for the switching matrices 3721 is defined in a plurality of examples, which were presented in FIG. 25, FIG. 27 and FIG. 30.

The fabric controller 52 is responsive to UTC 002 and provides the following control signals: (1) Select-in signal 3510 and the Select-out signal 3530 to the alignment subsystem 3500, and (2) Read signals 3921 to the Routing Module 4000.

Figure 41:
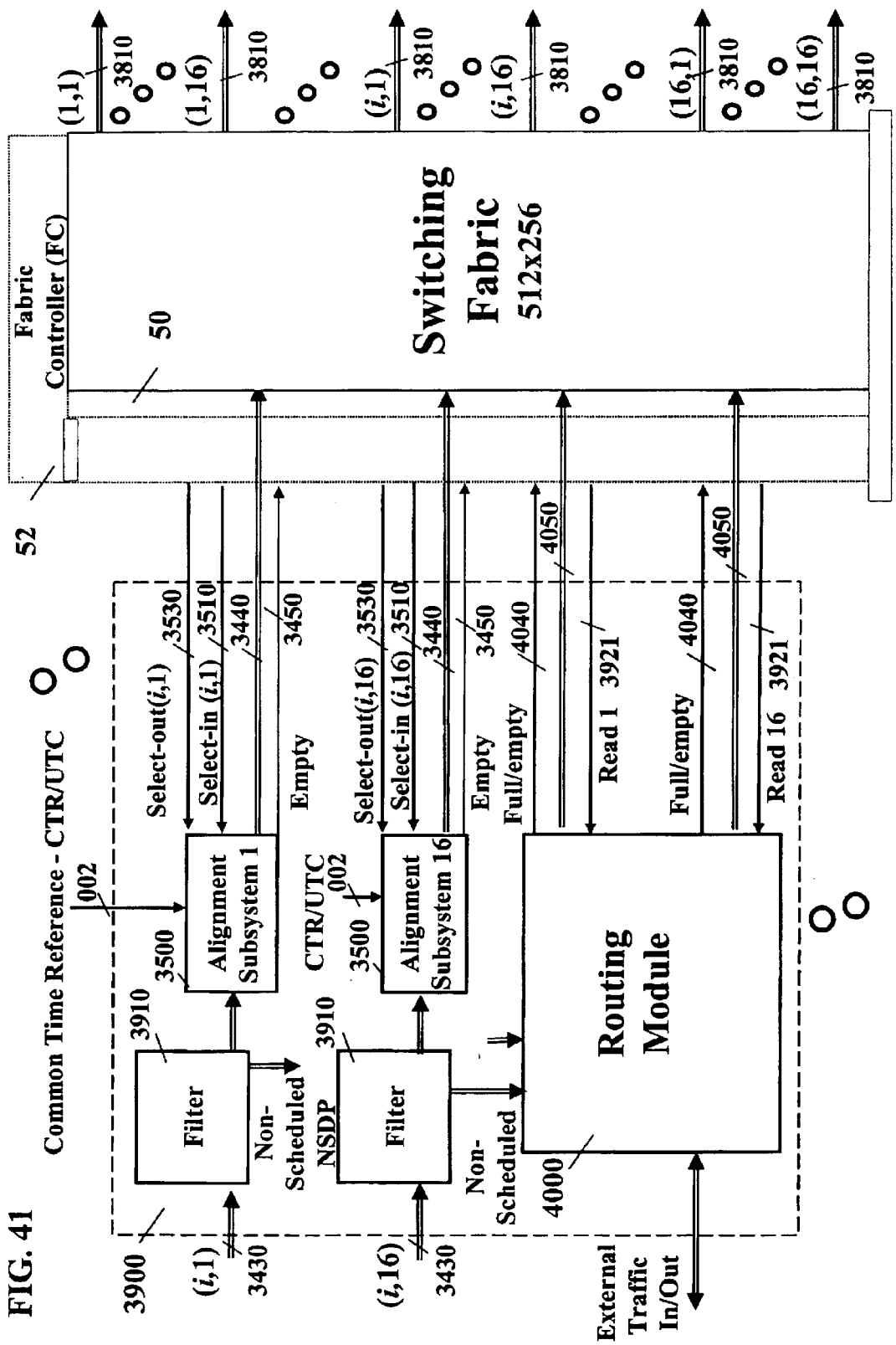
FIG. 41 is a block diagram of a data packet filter connected to an alignment subsystem that is connected to a switch fabric and a fabric controller.
Figure 42:
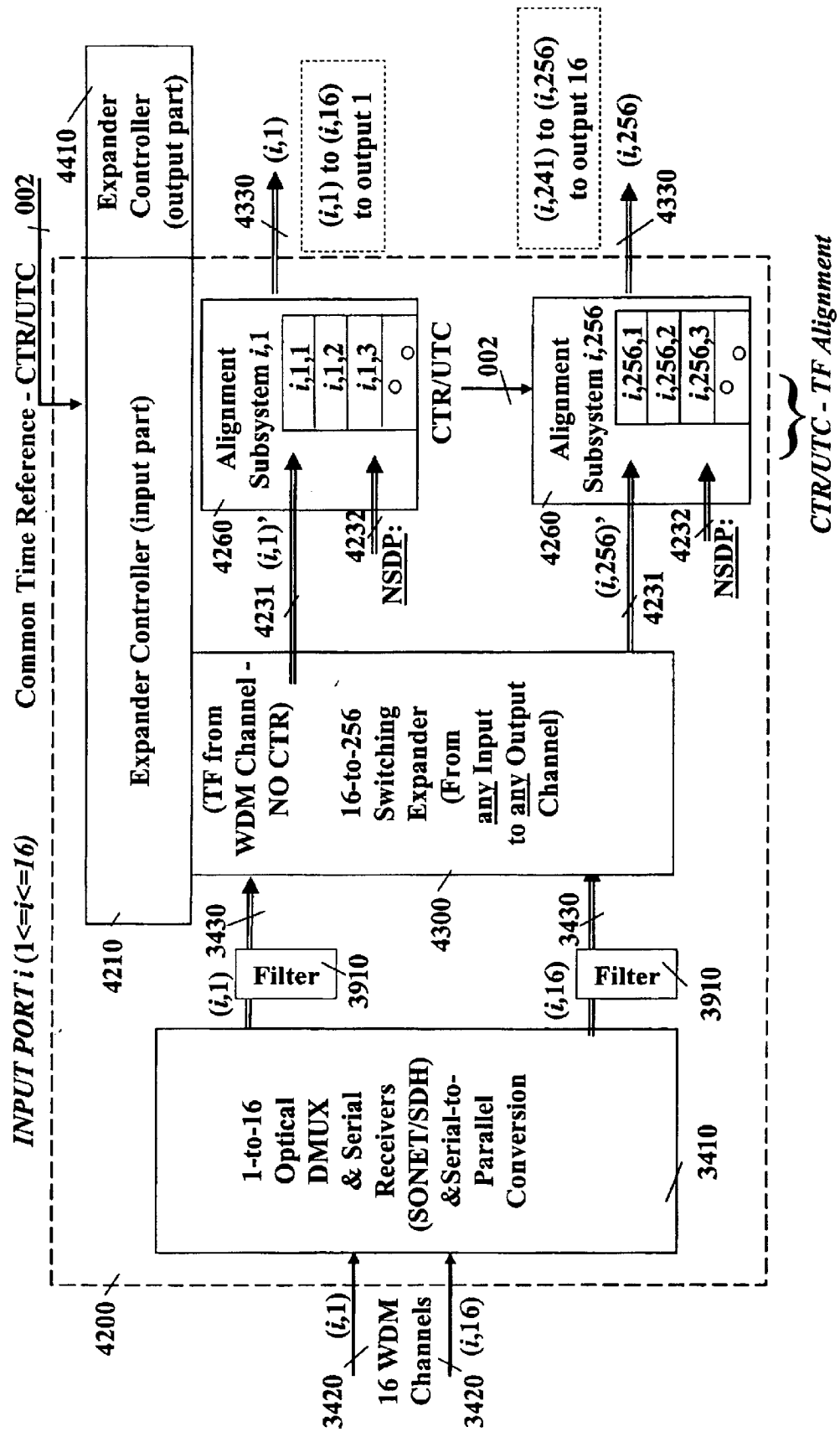
FIG. 42 is a block diagram of a switch design with a 16-to-256 expander, wherein the expander output lines are connected to alignment subsystems.
Figure 43:
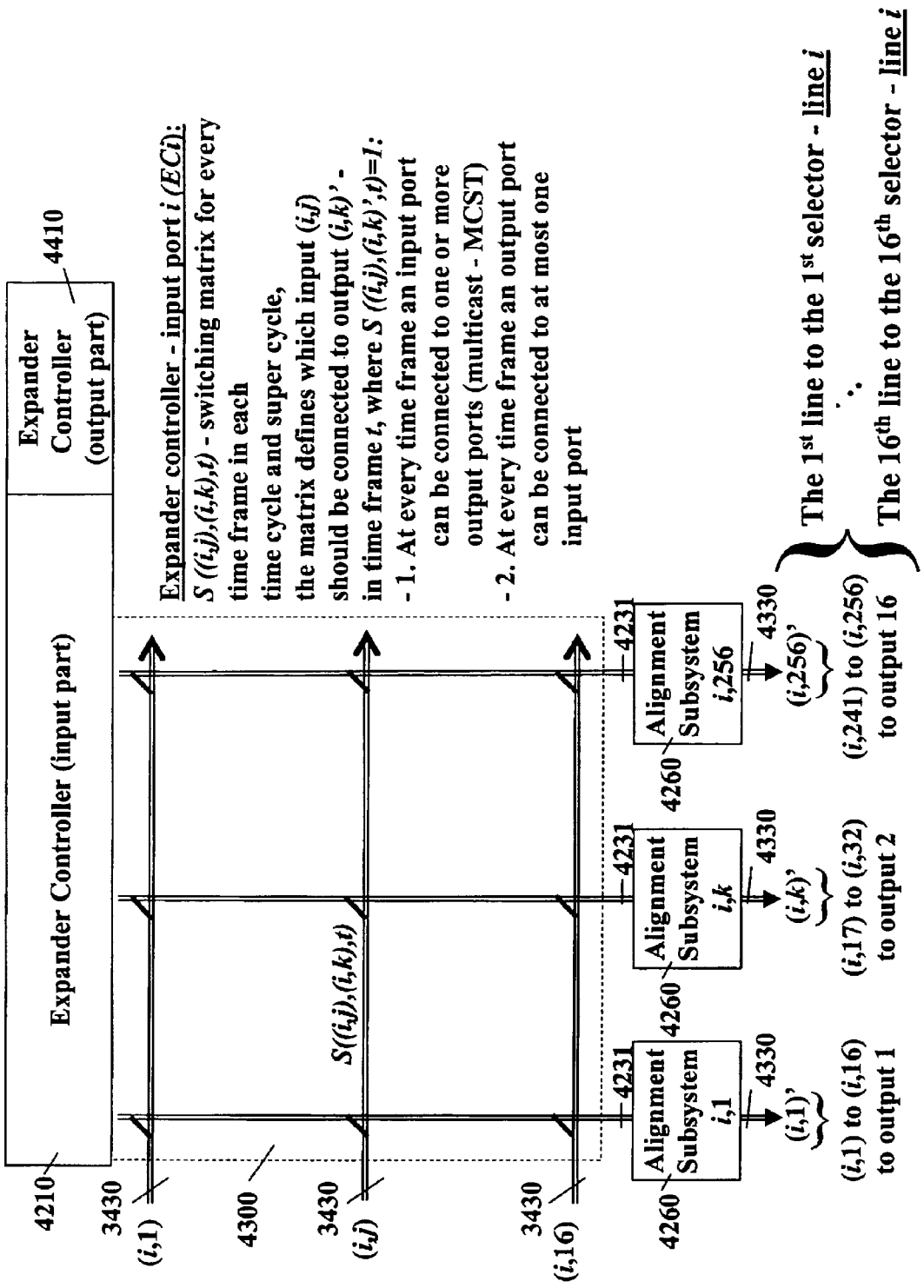
FIG. 43 is a more detailed description of the 16-to-256 expander of FIG. 42.

The switching fabric 50 in FIGS. 1, 15, 16, 24, 33, 37 and 41, as well as the switching expander 4300 in FIGS. 42–43, can be realized in many ways. A well known but complex method is a crossbar, shown in FIG. 16. The crossbar has a switching element between every input and every output. Consequently, the total number of switching elements required to realize the crossbar is the number of inputs (N) times the number of outputs (M). In the example of FIG. 16 there are N=5 inputs and M=5 outputs, and therefore, the total number of switching elements is 25. If there are N=1,000 inputs and M=1,000 outputs, the total number of switching elements is 1,000,000, which is a very large number.

However, there many other ways to realize the switching fabric 50 and switching expander 4300 with fewer switching elements, such as, a generalized multi-stage cube network, a Clos network, a Benes network, an Omega network, a Delta network, a multi-stage shuffle exchange network, a perfect shuffle, a Banyan network, a combination of demultiplexers and multiplexers.

Figure 49A:
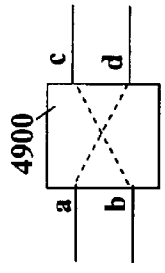
FIG. 49 is a diagram of an 8-by-8 multi-stage interconnection switch that is constructed of 2-by-2 switching elements.
Figure 49B:
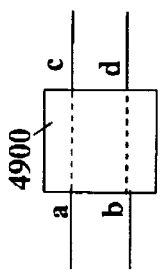
Figure 49C:
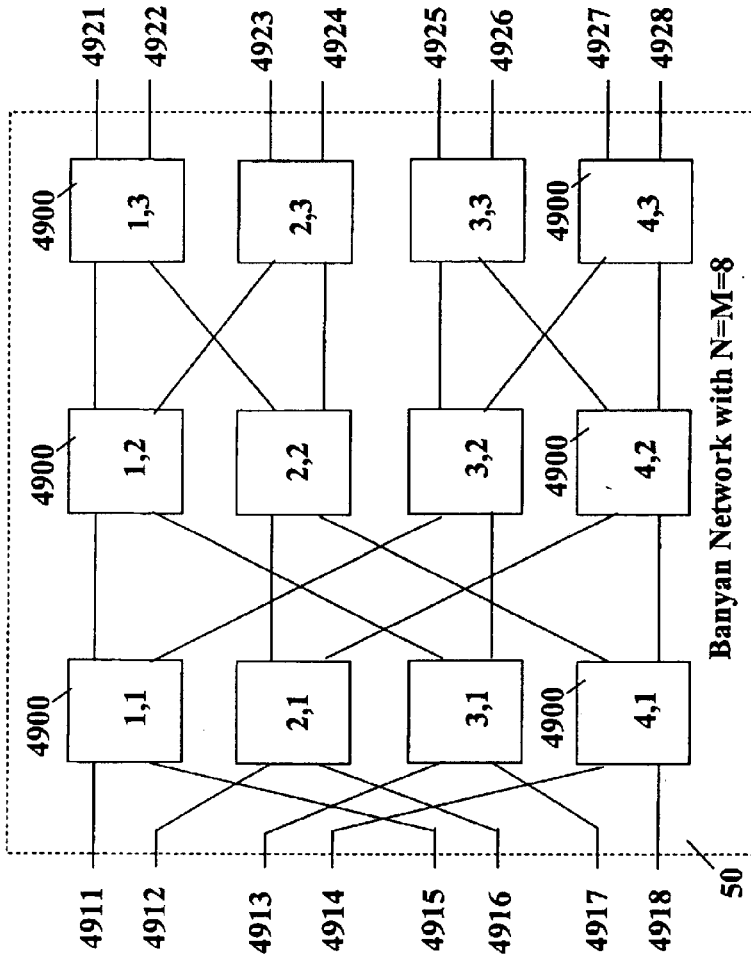

FIGS. 49–50 are examples of multi-stage shuffle exchange networks or generalized-cube networks that can be used to realized the switching fabric 50 and switching expander 4300 in the context of this invention. The shuffle exchange network requires only $a*N*lg_a N$ switching elements, where N is the number on inputs and outputs, and a is the number of inputs and outputs of each switching block 4900. In FIGS. 49A–49C the switching block size is 2 (i.e., a=2), such that each switching block can be configured either as Straight Connection (FIG. 49A) or as a Cross Connection (FIG. 49B). The number on inputs and outputs of the switching fabric 50 in FIG. 49C is 8 (i.e., N=M=8); consequently, the number of switching blocks 4900 is 12 and the number of switching elements is 48. Note that the number of switching elements in each switching block 4900 is a*a.

Figures 50A, 50B:
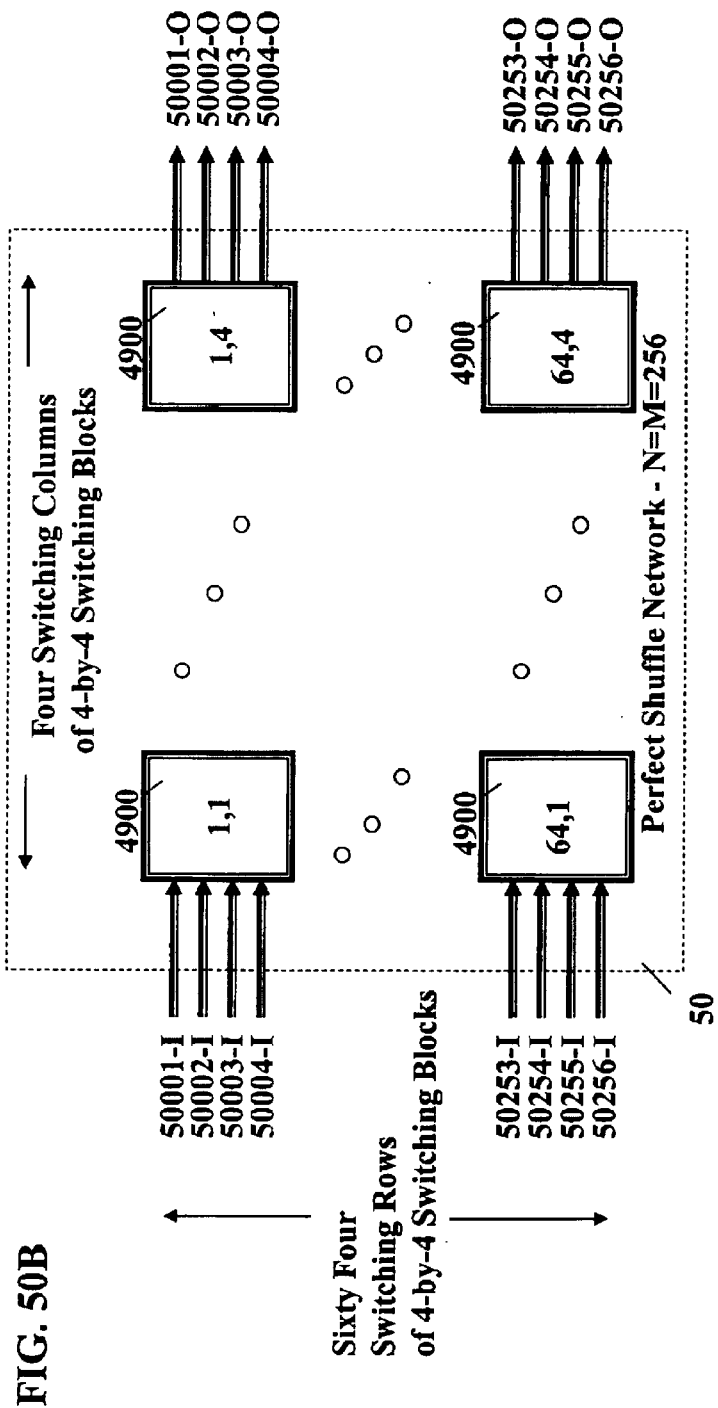
FIG. 50A is a comparison table of a multi-stage interconnection switch with a crossbar switch.
FIG. 50B is a block diagram of a 256-by-256 multi-stage interconnection switch that is constructed of 4-by-4 switching elements.

FIG. 50B shows a larger shuffle network with N=M=256 inputs and outputs. Each switching block has 4 inputs and 4 output, and therefore, it has 16 switching elements. The total number of switching elements in the example in FIG. 50B is 4,096, as shown in FIG. 50A. Note that a crossbar with N=M=256 requires 65,536 switching elements.

Method 7 utilizes combined time frame switching with asynchronous packet switching as shown in FIGS. 39–44.

In the following Method 7, part of the content of a time frame is routed according to time and part according to information contained in the data packet header. Data packets routed according to time have reserved transmission capacity and are forwarded according to a predefined schedule. Packets that are routed according to header information do not have reserved capacity and a predefined schedule (non-scheduled data packets or NSDPs). NSDP are forwarded during time frames presenting some spared capacity.

Figure 39:
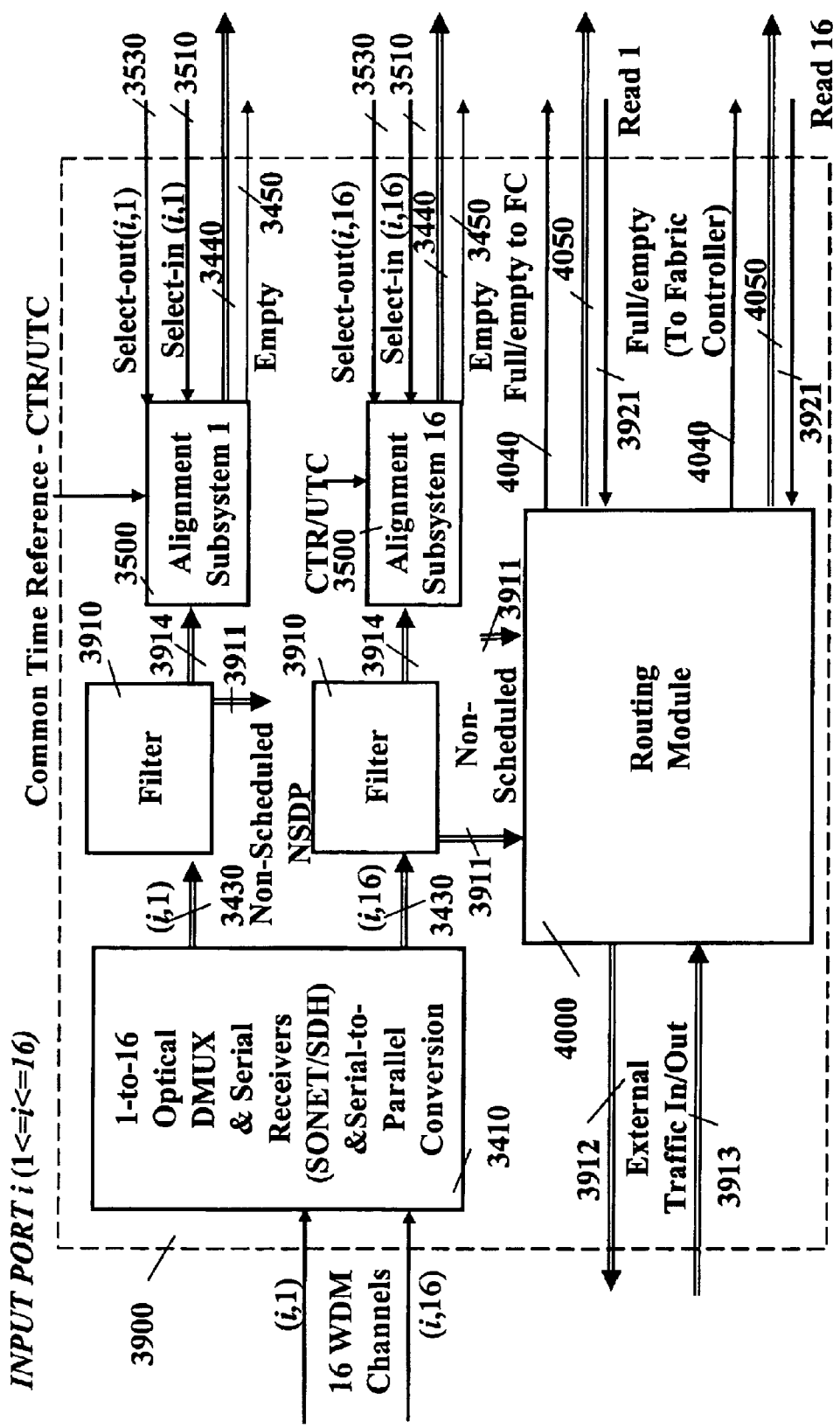
FIG. 39 is a functional block diagram of a wavelength division multiplexing input port with data packet filters for detecting non-scheduled data packets, which are forwarded to a routing module.

FIG. 39 is the functional architecture of an input port 3900. The DWDM optical channels are demultiplexed and each stream of bits converted in an equivalent parallel stream 3430 by an optical demultiplexer module 3410.

A Filter module 3910 separates data packets that are to be routed according to header information from those that are to be routed according to time information, i.e., based on the time frame in which they have been received. The Filter module 3910 sorts out packets based on information contained in their header. FIG. 6A shows a sample data packet header; the Filter 3910 sorts data packets based on the content of the priority field 35P. Other examples of information that can be used for filtering are the Differentiated Services (DS) Field in the header of an IP packet or the MPLS label of an Multi-Protocol Label Switching frame. The Filter module 3910 can operate also based on a single bit contained in the header that differentiates NSDPs from scheduled data packets.

In an alternative embodiment of this invention, a control codeword (see FIG. 5) is inserted into the time frame for separating the non-scheduled type of service data packets from the scheduled type of service data packets. The Filter module 3910 sorts separates scheduled data packets from NSDP by using the aforementioned control codeword. For example, the Filter module 3910 could take out the data packets that are after the control codeword (or between a pair of control codewords) as non-scheduled type of service.

The Filter module 3910 features 2 output lines. Scheduled packets are moved through one output line 3914 to the alignment subsystem 3500 of the channel on which they have been received. NSDPs are delivered through another output line 3911 to a Routing Module 4000.

The block diagram of the alignment subsystems 3500 is shown in FIG. 35; the purpose, the working principles, and the control signals of the alignment subsystems 3500 have been explained previously.

Figure 40:
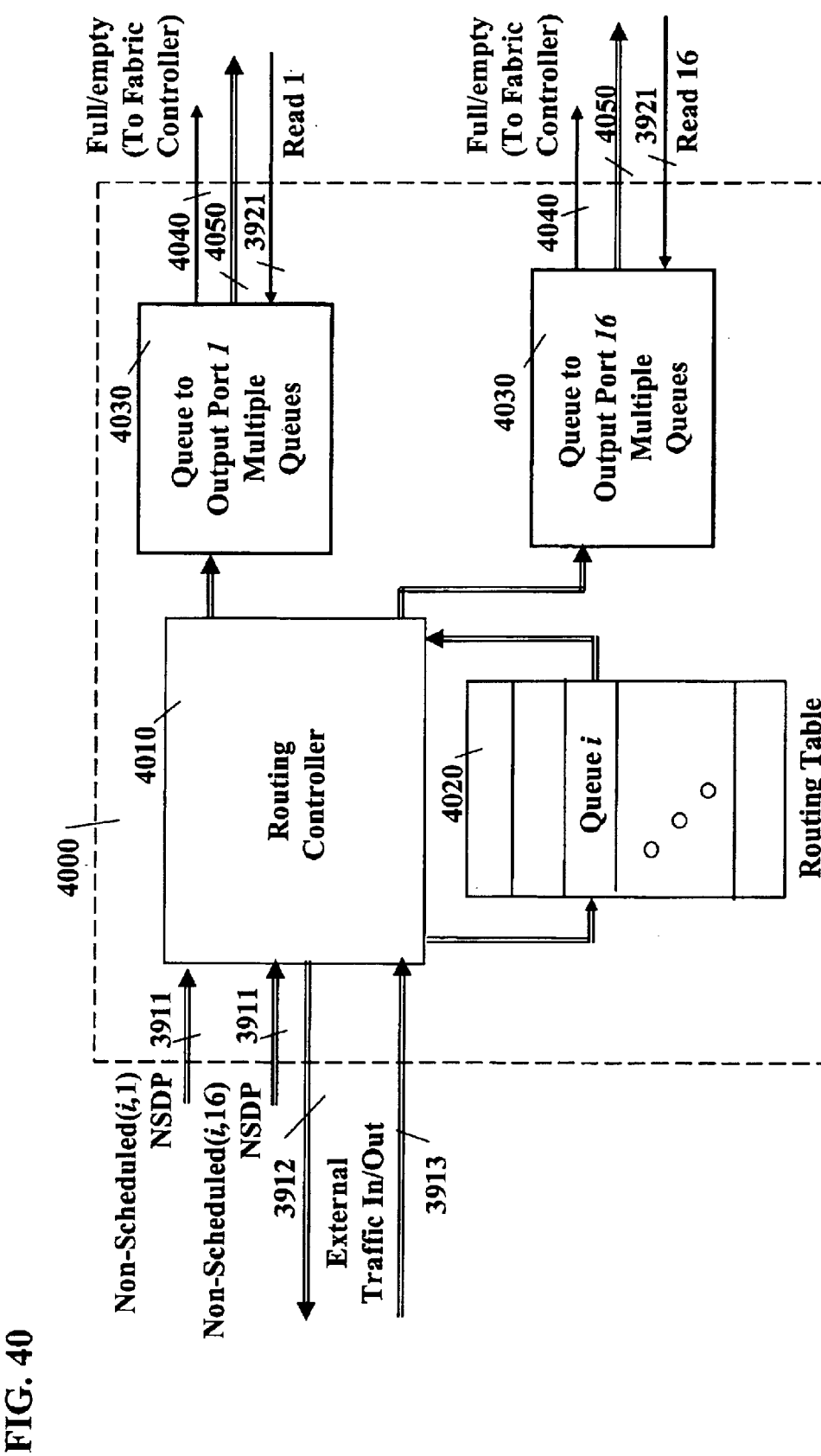
FIG. 40 is a block diagram of a routing module.

The Routing Module 4000 whose block diagram is depicted in FIG. 40 sorts NSDPs in 16 queues 4030, one for each output port. Packets are sorted according to the output port 3800 form which they have to be forwarded in order to reach their final destination. The output port 3800 to which a packet is directed is determined by the Routing Controller 4010 based on the pipe identifier (PID) 35C shown in FIG. 6A. Other examples of information on which the choice of the output port can be based include, but are not limited to, the IP destination address, the MPLS label, the MAC address.

The Routing Controller 4010 devises the queue 4030 the packet should be stored in from information contained in a routing table 4020. For example, the Routing Controller 4010 can use the PID 35C as an index to the routing table 4020. The row corresponding to the PID value contains the number of the output port the packet should be forwarded from, i.e., the queue 4030 the packet should be stored in.

Part of the NSDPs can be directed outside the sub-network in which the technology disclosed in this invention is deployed; the Routing Controller 4010 transmits them over the output port 3912. Analogously, NSDPs can enter the sub-network through input 3913.

FIG. 41 shows the connections 3440/4050 between the input port 3900 and the switching fabric 50. The switching fabric 50 can connect any one of the alignment subsystem outputs 3440 and of the routing module outputs 4050 to any of the input lines 3810 of any of the output ports 3800. Thus, the switching fabric 50 has 512 inputs 3440/4050 and 256 outputs 3810.

A fabric controller 52 establishes the input/output connections through the switching fabric 50. At each time frame the fabric controller 52 connects each line 3440 from the alignment subsystems 3500 to one of the output lines 3810 according to a predefined pattern which repeats itself periodically. The period can be one time cycle, one super-cycle, or any other duration. Thus, in each time frame the content of the alignment system's queue 3550 (either TF Queue1, or TF Queue2, or TF Queue3) selected by the fabric controller 52 through the select-out control signal 3530 is switched to a given output channel 3810.

In each time frame, the fabric controller 52 also determines through the select-in control signal 3510 the queue 3550 in which all the scheduled data packets received on an optical channel 3430 should be stored. The queue 3550 in which incoming packets are stored is selected according to a predefined pattern that repeats itself periodically. The period can be one time cycle, one super-cycle, or any other duration. In a subsequent time frame that one queue 3550 is going to be selected through the select-out 3530 control signal for switching to an output channel 3810. Thus, the time frame in which scheduled packets are received determines the path of such packets through the network.

The alignment subsystem 3500 uses the empty control signal 3450 to notify the fabric controller 52 when the queue 3550 selected through the select-out 3530 signal is empty. When a queue 3550 is empty, the output channel 3810 to which the queue is supposed to be connected would be idle during the corresponding (preset) time frame. Thus, the fabric controller 52 programs the switching fabric 50 to connect the idle output channel 3810 to the proper output 4050 of the Routing Module 4000. Such proper output 4050 is the one corresponding to the queue 4030 to the output port 3800 to which the idle channel 3810 belongs.

The NSDP queue 4030 that is connected to the idle channel 3810 can be in either the same input port 3900 as the empty scheduled data packet queue 3550, or another input port 3900. The fabric controller 52 knows which NSDP queues 4030 are empty thanks to the full/empty control signals 4040. The fabric controller 52 selects an NSDP queue from which NSDPs are to be retrieved through the read 3921 control signal.

In one implementation of the switch, the fabric controller 52 is centralized; however different implementations are possible, consistent with the presnt invention, that distribute the fabric controller 52 functionality.

The switching fabric 50 can be implemented, not excluding other ways, as a crossbar or as a multi-stage network of 2-by-2 or 4-by-4 switching elements, which has lower complexity than a crossbar.

All the control signals generated or received by the fabric controller 52 (to control the switching fabric 50, to select the alignment system's queue 3550 for input 3510 and for output 3530, to know whether the queues are empty 3450/4040, etc.) need to be varied with a time scale comparable with the time frame duration. Moreover, all the control signals are either predetermined according to a repetitive pattern, or can be devised in advance from the state of the system during the preceding time frame. Thus, the control signals can be given in the time frame prior the one in which the components are supposed to react to them. This is beneficial when the switch is operated at very high speed and the delay introduced by the control logic and by signal propagation can be limiting.

Figure 44:
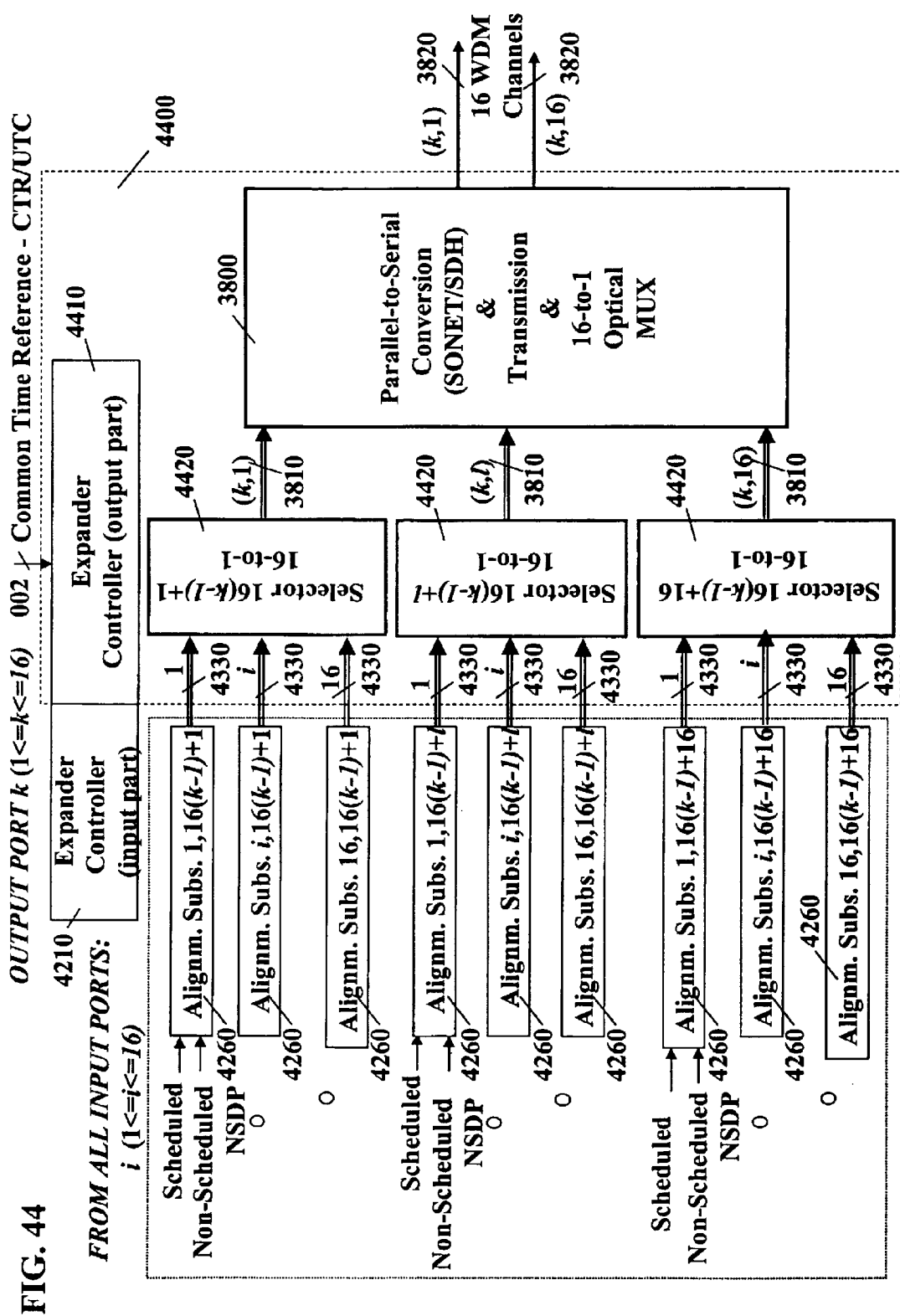
FIG. 44 is a functional block diagram of the connection from the alignment subsystems to an output port via a plurality of selectors.

FIGS. 42, 43 and 44 show an alternative implementation of a switch that can route scheduled data packets according to time and NSDPs according to information contained in their header.

As shown in FIG. 42, the input port 4200 comprises an optical demultiplexer 3410 that separates the 16 WDM optical channels 3420 over 16 separate lines 3430 connected to a switching expander module 4300. The purpose of the switching expander module 4300 is to enable the connection of each input channel 3420 to any optical channel 3820 on any output port 4400.

A filter 3910 inserted on the outputs 3430 of the demultiplexer 3410 separates NSDPs from the scheduled data packets that are the only ones entering the switching expander module 4300. The filter 3910 (not shown in FIG. 42) directs NSDPs to a Routing Module 4000 that routes them according to information contained in the data packet header, as previously described.

Both scheduled data packets and NSDPs enter the alignment subsystems 4260. Scheduled data packets enter the alignment subsystems 4260 through lines 4231 from the switching expander module 4300; NSDPs enter the alignment subsystems 4260 through lines 4232 from the Routing Module 4000.

The alignment subsystem 4260 comprises a multiplicity of queues that are managed as described for the alignment subsystem 3500 shown in FIG. 35. However, the alignment subsystem 4260 handles also NSDPs (not only scheduled data packets). Upon exhaustion of the queue from which data packets are being retrieved for transmission over the line 4330 towards the corresponding output channel 3820, the alignment subsystem 4260 can transmit on line 4330 the NSDPs incoming on line 4232. The alignment subsystem 4260 could store NSDPs incoming from line 4232 in the same queues as scheduled data packets, or the alignment subsystem 4260 could comprise a separate queue for storing NSDPs, or the Routing Module 4000 could comprise such a queue.

The switch comprises a distributed Expander Controller that consists of an input part 4210 in each input port 4200 and an output part 4410 in each output port 4400. For each time frame, the distributed Expander Controller determines the output channel 3820 on which packets received from each input channel 3420 are being forwarded. This is achieved by (1) the input part 4210 of the Expander Controller (1a) configuring the input/output connections of the switching expander 4300 and (1b) enabling the output 4330 of the proper alignment subsystem 4260, and (2) the output part 4410 controlling the selectors 4420 of each channel on every output port 4400.

At each time frame each input 3430 of the switching expander 4300 is connected with one or more (for multicast support) outputs 4231. At each time frame a subset of the alignment subsystems 4260 is enabled to transmit packets on the lines 4330 towards their correspondent output channel 3820.

At each time frame, the output part 4410 of the Expander Controller determines from which input port 4200 packets should be retrieved for forwarding on each output channel 3820. This is achieved by the output part 4410 of the Expander Controller selecting one of the inputs 4330 of the 16 selectors 4420 contained in the output port 4400, as shown in FIG. 44. The output 3810 of the selectors 4420 are multiplexed by an Optical Multiplexer 3800 and transmitted on the outgoing fiber as separate WDM channels 3820.

The control signals generated by the input parts 4210 and the output parts 4410 of the distributed Expander Controller change with a period comparable to the duration of the time frame. The sequence of control signals is predetermined when SVPs are set up and repeats with a period of one time cycle, or one super-cycle, or any other duration. As a consequence, no communication is required among the different parts of the distributed expander controller in order to devise the control signals they generate.

FIG. 43 shows one realization of the switching expander 4300 as a 16 by 256 crossbar. Other topologies, including but not limited to, multistage networks of 2-by-2 or 4-by-4 switching elements can be deployed in the realization of the switching expander 4300.

Method 8 utilizes an SVP interface to time frame switching from asynchronous packet switching as shown in FIGS. 45–48.

Figure 48:
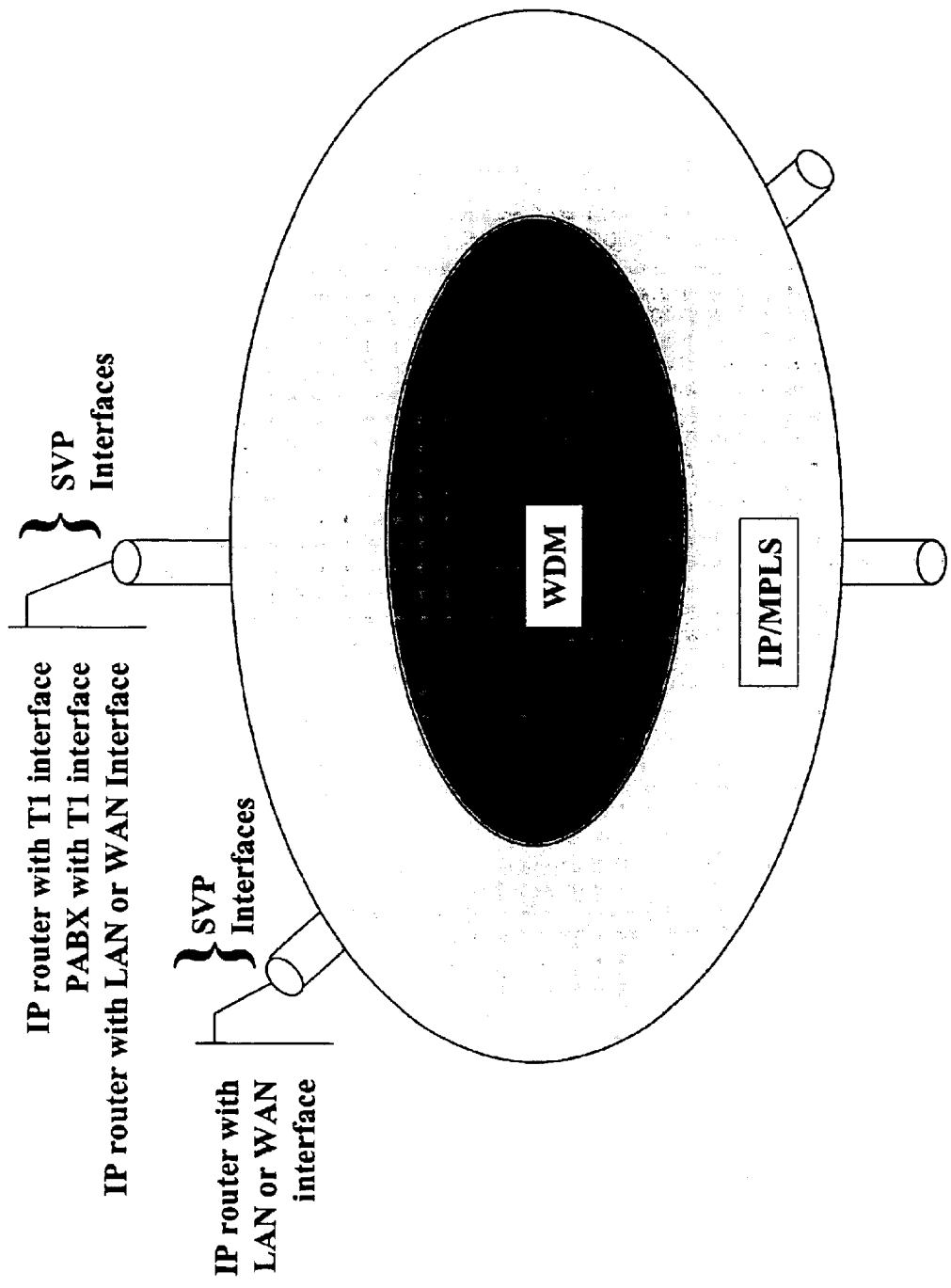
FIG. 48 is a high level diagram of communications layering and a description of a two layer system, wherein the low/inside layer is dense wavelength division multiplexing (DWDM) and the outer layer is IP/MPLS.

An overall view of a WDM network that combines asynchronous IP/MPLS (Internet protocol/multi-protocol label switching) data packet switching with time frame switching and forwarding is shown in FIG. 48. Such network has two basic layers, the inner one is the optical switching and forwarding and the outer one is the IP/MPLS access interfaces. The IP/MPLS interfaces transform the asynchronous data packet flows into Synchronous Virtual Pipe (SVP) flows.

Figure 46B:
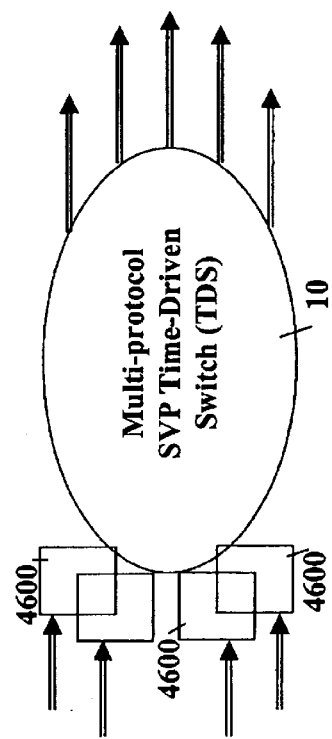
FIG. 46B is a functional block diagram of multiple SVP interfaces to a multi-protocol time driven SVP switch.
Figure 47:
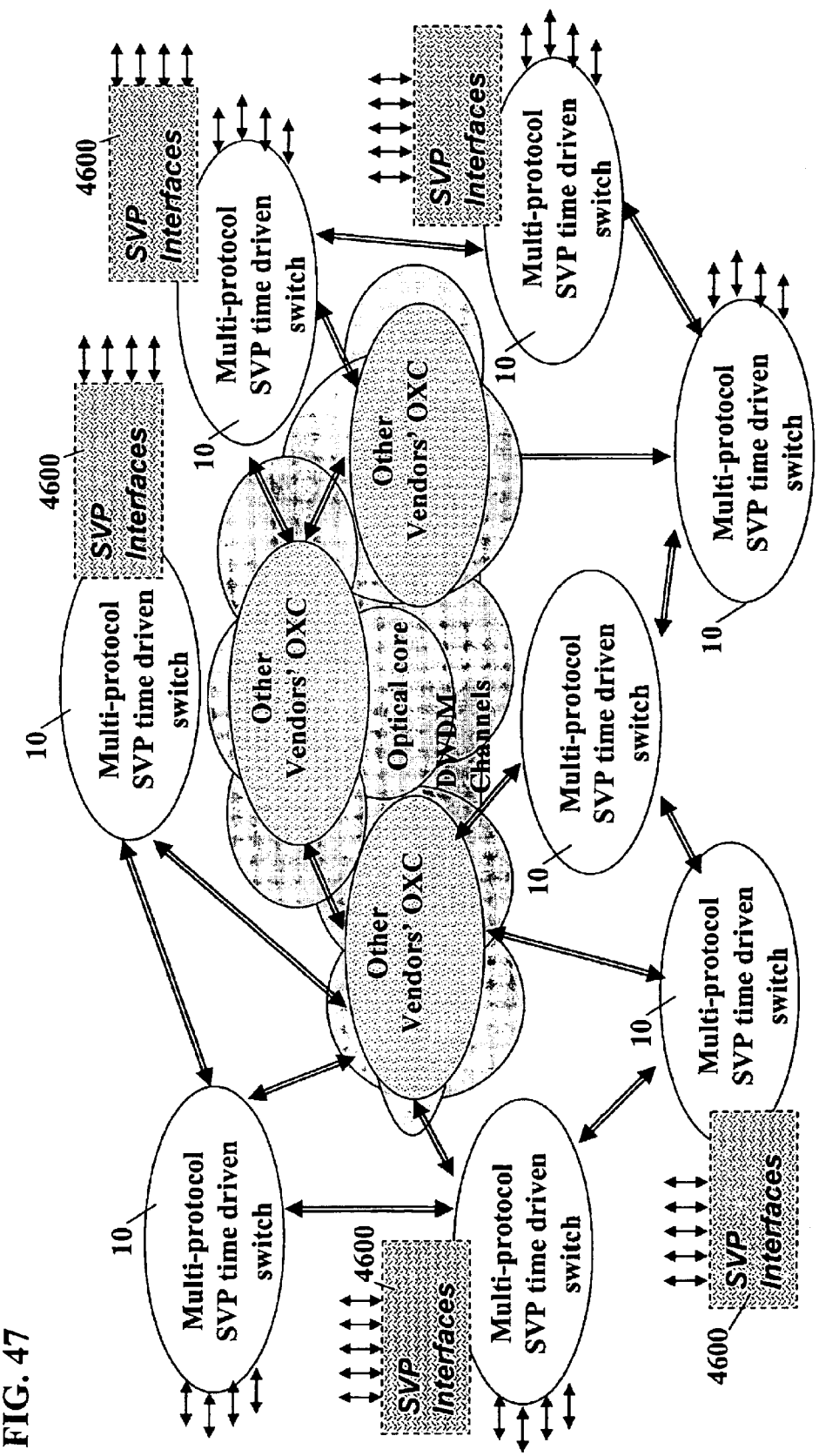
FIG. 47 is a system block diagram of a network with a plurality of multi-protocol time driven SVP switches that are connected to SVP interfaces and other vendors' optical cross connects (OXCs), showing channels, interfaces, and so forth.

An SVP interface module is required to forward over an SVP packets that have traveled over an asynchronous packet network. As shown in FIG. 47, the SVP interface module is required only for the input links connecting multi-protocol SVP time driven switches to asynchronous packet switches; the SVP interface module is not required on links connecting multi-protocol SVP time driven switches, i.e., switches that use the technology disclosed in this invention. Moreover, as shown in FIG. 46B, the SVP interface module 4600 is required only in the inbound direction of the interface of the multi-protocol SVP time driven switch 10, not in the outbound direction.

Figure 45:
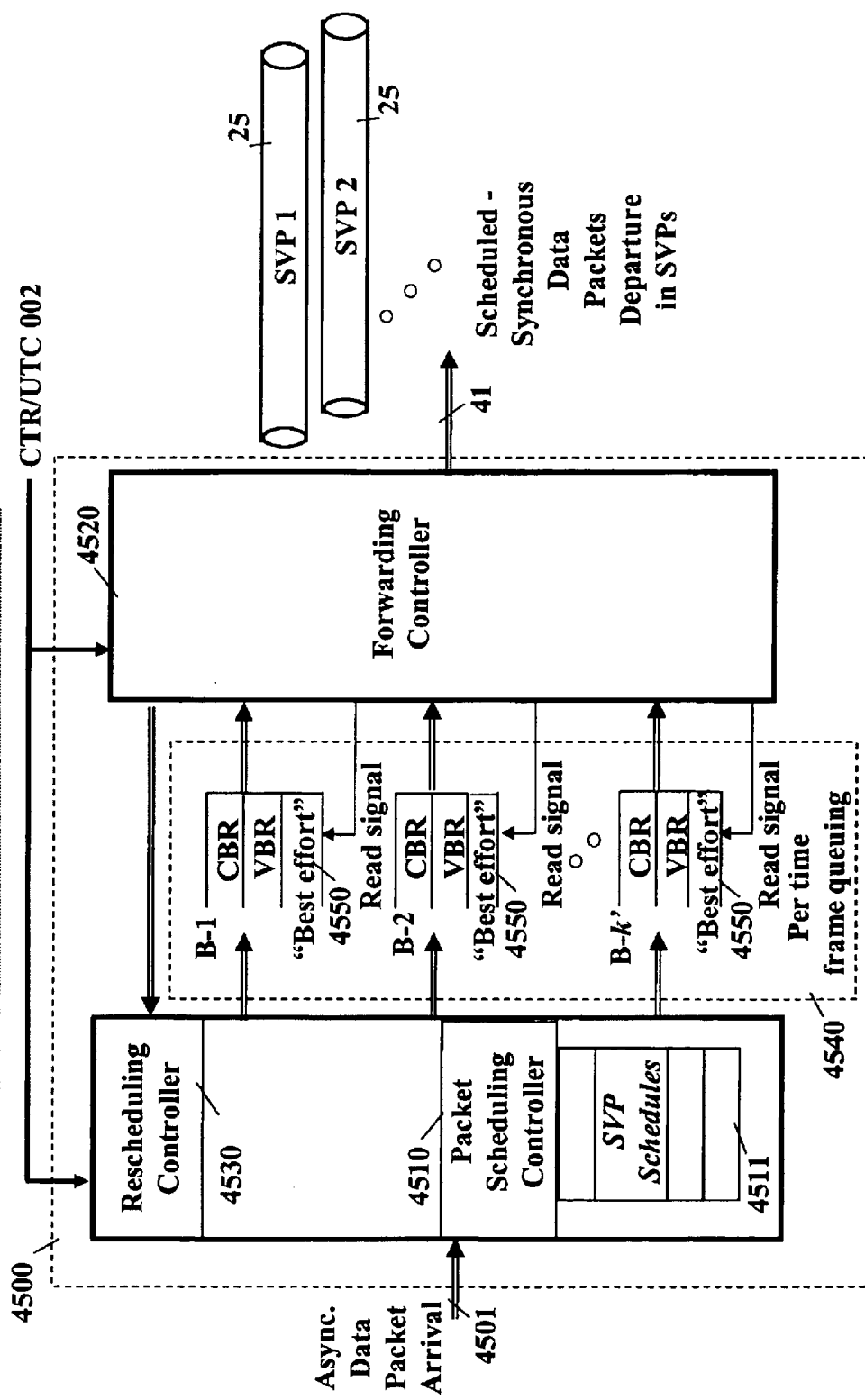
FIG. 45 is a functional block diagram of an SVP interface with per time frame queues.

Two alternatives for realizing the SVP interface module will be presented in the following. FIG. 45 shows the block diagram of the SVP interface 4500 according to the first alternative. A Packet Scheduling Controller 4510 processes asynchronous data packets arriving from an input link 4501. Based on information contained in the packet header—such as the PID field 35C (see FIG. 6), or an MPLS label, or the destination address in an IP packet, or the VCI/VPI in an ATM cell, or other header fields—the Packet Scheduling Controller 4510 identifies the SVP to which the asynchronous data packet belongs. The relevant header information is used, for example as a lookup key, to retrieve SVP schedule information from a pre-computed table 4511. Typical schedule information include, but are not limited to, the time frames in which packets belonging to each SVP should be forwarded on the link 41 towards a multi-protocol SVP time-driven switch 10.

Once processed by the Packet Scheduling Controller 4510, data packets are stored in a per time frame queuing system 4540. The per time frame queuing system 4540 comprises a multiplicity of queues 4550. Each queue is associated with one time frame. The Forwarding Controller 4520 retrieves the packets contained in a specific queue 4550 during the time frame associated to that queue. The Packet Scheduling Controller 4510 stores an incoming packet in the queue 4550 currently associated to one of the time frames reserved for the SVP to which the packet belongs.

For example, an SVP interface implementation could feature a per time frame queuing system 4540 that contains one queue for each time frame in the time cycle. For each data packet, the Packet Scheduling Controller 4510 devises the PID 35C from the data packet header and uses it as a key to the SVP Schedules table 4511 to retrieve the pointers to the queues 4550 in which the data packet should be stored. The Packet Scheduling Controller 4510 moves the packets to one of the selected queues 4550.

Multiple ways exist according to which the Packet Scheduling Controller 4510 can choose the specific queue 4550 in which to store the packet. One possible implementation consists in choosing the first queue 4550 that will be served, i.e., the one associated to the next time frame to come.

Each queue 4550 can be organized in 3 sub-queues: CBR (Constant Bit Rate), VBR (Variable Bit Rate) and "Best Effort" traffic. The Packet Scheduling Controller 4510 determines the type of traffic to which incoming data packets belong based on information contained in the header, such as the PID 35C, the Differentiated Services (DS) Field in IP packets, the VPI/VCI fields in ATM cells, or any other (combination of) header fields.

At each time frame, the Forwarding Controller 4520 retrieves and forwards on the line 41 towards a multi-protocol SVP time-driven switch data packets stored in the queues 4550 associated to the given time frame. In the following a preferred policy for data packets retrieval is presented; other policies can be applied.

Data packets contained in the CBR sub-queue are retrieved first, starting at the beginning of the time frame associated to the queue 4550. If the CBR sub-queue becomes empty before the end of the time frame associated to the selected queue 4550, data packets in the VBR sub-queue are retrieved and forwarded. If the VBR sub-queue becomes empty before the end of the time frame associated to the queue 4550, data packets in the "Best effort" sub-queue are retrieved and forwarded.

The sub-queues can be ordered in various ways and even logically organized in multiple sub-queues. When retrieving packets from each the queues 4550 the Forwarding Controller 4520 can apply a variety of packet scheduling algorithms, such as, FIFO, simple priority, round robin, weighted fair queuing. Also the order in which packets are retrieved from the various sub-queues (i.e., the relative priority of the sub-queues) depends on the adopted queue management policy.

All the data packets that happen to be remaining in a queue 4550 by the end of the associated time frame are transferred to the Rescheduling Controller 4530. The Rescheduling Controller 4530 sorts packets in the different queues 4550 of the per time frame queuing system 4540 similarly to the Packet Scheduling Controller 4510. The operation of the Rescheduling Controller 4530 is based (i) on information retrieved from the SVP Schedules table 4511 (for example, using data packet header fields as access key), and/or (ii) on the queue in which the packets had been previously stored.

The SVP interface can have multiple lower capacity input lines 4501 that are aggregated on the same higher speed output line 41. In other words, data packets are received from multiple input lines 4501, sorted in the queues 4550 of the same per time frame queuing system 4540 from which the Forwarding Controller 4520 retrieves data packets for transmission on the output line 41.

The Forwarding Controller 4520 can be comprised of a plurality of Forwarding Controllers, each one associated with at least one of the channels 41. There can be a plurality of sets of queues 4540, each set comprising at least one queue 4550, wherein each set 4540 is associated with one of the Forwarding Controllers 4520.

Figure 46A:
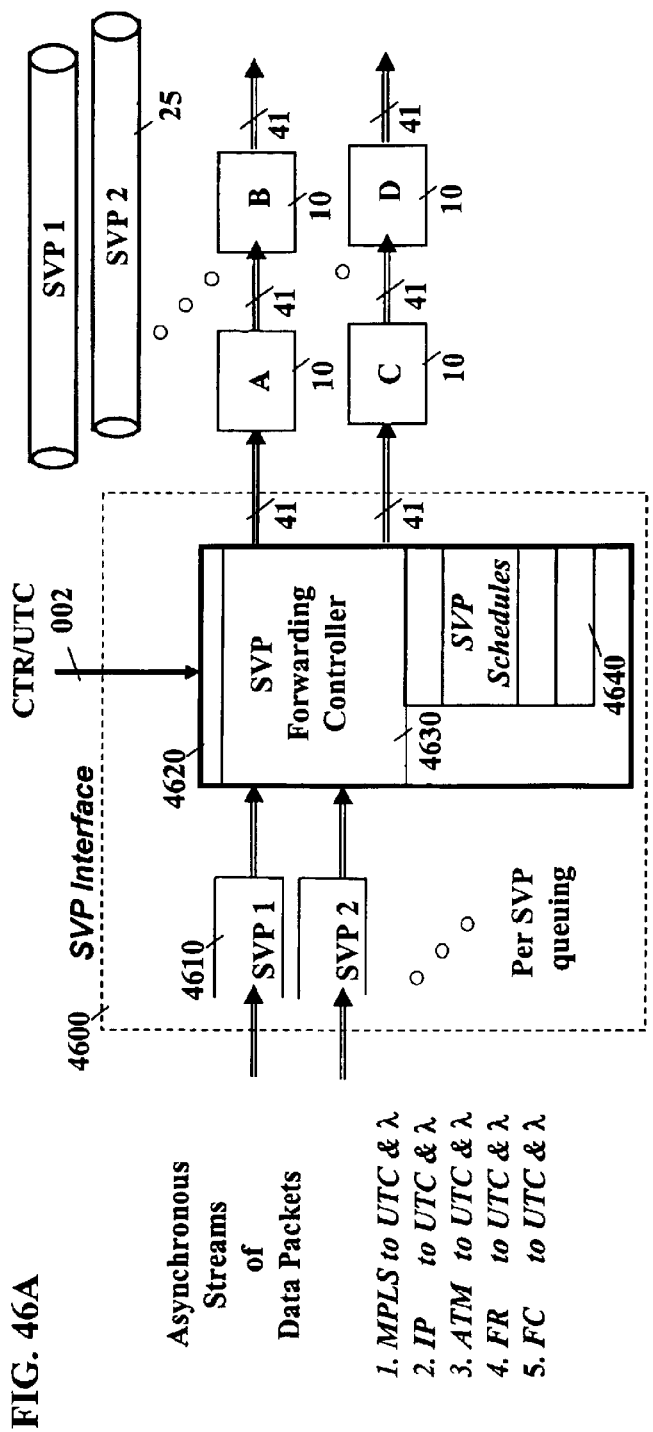
FIG. 46A is a functional block diagram of an SVP interface with per SVP queues.

FIG. 46 shows the block diagram of the SVP interface 4600 implemented according to the second alternative. Incoming packets are stored in a queuing system that comprises multiple queues 4610. Each queue 4610 is associated to a specific SVP 25; data packets are stored in the queue 4610 corresponding to the SVP 25 they belong to. The SVP to which data packets belong (i.e., the identity of the queue in which they should be stored) is devised through information contained in their header, such as the PID field 35C, the destination address or the DS field in an IP packet or a combination of the two, the MPLS label, the VPI/VCI of an ATM cell, or any other (combination of) header fields.

An SVP Forwarding Controller 4630 retrieves data packets from the queue associated to the SVP 25 for which the current time frame had been reserved. The current time frame is identified in accordance to the Common Time Reference 002. Retrieved packets are transmitted on an output line 41 towards a Multi-protocol SVP Time-driven Switch 10.

At the beginning of a new time frame the SVP Forwarding Controller 4630 possibly changes the queue 4610 from which to retrieve packets. The new queue 4610 is identified by consulting the SVP Schedules database 4640 which contains, among other information, the SVP to which each time frame had been reserved.

The SVP Forwarding Controller 4630 can retrieve packets from more than one queue 4610 and forward them on more than one output line 41. In this case the SVP Schedules database 4640 provides for each time frame, the SVP 25 for which it has been reserved on each of the output lines 41. Thus, each time frame can be reserved for zero (not reserved) to as many SVPs 25 as the number of output lines 41.

The SVP Interface 4600 can comprise a plurality of SVP Forwarding Controller Modules 4620 each associated with at least one of a plurality of asynchronous data streams.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims. From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A switching system having an input and an output, the switching system further comprising:

a first communications switch and a second communications switch connected by at least one communications link, comprising at least one channel, for transmitting a plurality of data units from said communications link to the output of the switching system;

a Common Time Reference (CTR), divided into a plurality of contiguous periodic super cycles (SCs) each comprised of at least one contiguous time cycle (TC) each comprised of at least one contiguous time frame (TF);

wherein each of the communications switches is further comprised of a plurality of input ports and a plurality of output ports, each of the input ports connected to and receiving data units from the communications link from at least one said channel, and each of the output ports connected and transmitting data units to the communications link over at least one said channel;

wherein each of the communications links is connected between one of the output ports on the first communications switch and one of the input ports on the second communications switch;

wherein each of the communications switches has a switch controller, coupled to the CTR, the respective input ports, and the respective output ports;

wherein each of the communications switches has a switch fabric coupled to the respective switch controller, the respective input ports, and the respective output ports;

wherein each of the switch controllers is responsive to the CTR for scheduling connection to the switch fabric from a respective one of the input ports, on a respective one of the input channels during a respective one of the time frames;

wherein each of the switch controllers defines the coupling from each one of the respective input ports for data units received during any one of the time frames, on a respective one of the channels, for output during a predefined time frame to at least one selected one of the respective output ports on at least one selected respective one of the channels; and wherein the data units that are output during a first predefined time frame on a selected respective one of the channels from the respective output port on the first communications switch are forwarded from the respective output port of the second communications switch during a second predefined time frame on a selected respective one of the channels responsive to the CTR.

2. The system as in claim 1, wherein the plurality of input ports each receives data units over at least one of a plurality of incoming channels (j), and wherein the plurality of output ports each sends data units over at least one of a plurality of outgoing channels (l);

wherein each of the incoming channels (j) has a unique time reference (UTR-j) that is independent of the CTR; and wherein the (UTR-j) is divided into super cycles, time cycles, and time frames of the same durations as the super cycles, time cycles, and time frames of the CTR.

3. The system as in claim 2, further comprising:

a plurality of buffer queues, wherein each of the respective buffer queues is associated, for each of the time frames, with a combination of one of the incoming channels and one of the outgoing channels; and a mapping controller within the switch controller system for logically mapping, for each of the (UTR-j) time frames, selected incoming channels (j) to selected buffer queues, and for logically mapping, for each of the CTR time frames, selected ones of the plurality of buffer queues to selected outgoing channels (l);

wherein each of the buffer queues is further comprised of an alignment subsystem comprised of a plurality of time frame queues, wherein each of the time frame queues comprises means to determine that the respective time frame queue is empty, wherein each of the time frame queues further comprises means to determine the respective time frame queue is not empty;

wherein the data units that arrive via the incoming channel (j) are stored in the respective time frame queue of the alignment subsystem responsive to the mapping controller; and wherein the mapping controller further provides for coupling of selected ones of the time frame queues to respective ones of the outgoing channels (l), for transfer of the respective stored data units during the respective associated CTR time frames.

4. The system as in claim 3, wherein the alignment subsystem, responsive to the mapping controller, transfers all of the data units associated with a respective first time frame as defined by the UTR-j into an empty first time frame queue from incoming channel (j), during the respective selected first time frame of the time frames (TFs) as defined by UTR-j, wherein the respective time frame queue is designated as full;

wherein the alignment subsystem, responsive to the mapping controller, transfer, data units out of a full second time frame queue to outgoing channel (l), during a selected one of the time frames (TFs) as defined by UTC, wherein the second time frame queue is designated as empty; and wherein the first time frame queue and the second time frame queue are mutually exclusive at all times.

5. The switch controller system as in claim 4, wherein the time frame queues are comprised of at least two, three, and more than three time frame queues.

6. The system as in claim 2, wherein the communications link is an optical link with a plurality of optical channels, the system further comprising:

means for adding a delay element to a selected one of the input ports.

7. The system as in claim 6, further comprising:

wherein the delay element provides for phase aligning the UTR-j with the CTR by adding a link delay equal to the difference between a beginning of the respective CTR time frame and a beginning of the respective UTR-j time frame.

8. The system as in claim 6, wherein the delay element provides phase alignment of a start of a respective one of the CTR time cycles relative to a start of a respective one of the UTR-j time cycles.

9. The system as in claim 6, wherein the delay element provides phase alignment of a defined point in a respective one of the CTR time cycles to a defined point in a respective one of the UTR-j time cycles.

10. The system as in claim 6, wherein the delay element is further comprised of a passive optical fiber.

11. The system as in claim 6, wherein the delay element is further comprised of an optical fiber having programmable tap points.

12. The system as in claim 11, wherein the programmable tap points are further comprised of optical switches.

13. The system as in claim 6, wherein each of the input ports is further comprised of an optical receiver, wherein the delay element is a part of the optical receiver.

14. The system as in claim 1, further comprising a switching fabric for coupling the switching system input to the switching system output.

15. The system as in claim 14, wherein the switching fabric is at least one of the following: a crossbar, a generalized multi-stage cube network, a Clos network, a Benes network, an Omega network, a Delta network, a multi-stage shuffle exchange network, a Banyan network, a combination of demultiplexers and multiplexers, and an optical switch.

16. The system as in claim 1, wherein there are a plurality of the first communication switches;

wherein there are a plurality of the communications links; where each of the communications links has a plurality of channels, each associated with a respective wavelength.

17. The system as in claim 16, further comprising:

means for coupling a first predefined subset of the channels for each respective one of the communications links from the respective communications link to a second defined one of the communications links.

18. The system as in claim 17, wherein the respective communications link is the same as the second defined one of the communications links.

19. The system as in claim 17, wherein the means for coupling is an optical switch.

20. The system as in claim 19, wherein the optical switch demultiplexes the first predefined subset into a predefined respective second predefined subset of the respective channels.

21. A method for switching a plurality of data units from an input to an output, via a switching system comprising at least a first communications switch and a second communications switch connected by at least one communications link comprising at least one channel,
- wherein each of the communications switches is further comprised of a plurality of input ports each connected and receiving data units from the communications link from at least one said channel, and a plurality of output ports each connected and transmitting data units to the communications link over at least one said channel,
- wherein each of the communications switches has a switch controller coupled to the input ports and the output ports, wherein each of the communications switches has a switch fabric coupled to the switch controller, the input ports, and the output ports, the method further comprising:
  - transmitting a plurality of data units from the link to the output of said switching system;
  - providing a Common Time Reference (CTR), divided into a plurality of contiguous periodic super cycles each comprised of at least one contiguous time cycle each comprised of at least one contiguous time frame (TF);
  - coupling the CTR to the switch controller, wherein the switch controller is in part responsive to the CTR;
  - connecting each of the communications links between one of the output ports on the first communications switch and one of the input ports on the second communications switch;
  - scheduling connection to the switch fabric from a respective one of the input ports, on a respective one of the input channels during a respective one of the time frames responsive to the CTR;
  - coupling from each one of the input ports for data units received during any one of the time frames, on a respective one of the channels, for output during a predefined time frame to at least one selected one of the output ports on at least one selected one of the channels, responsive to the switch controller; and
  - forwarding from the output port of the second communications switch during a second predefined time frame on a selected one of the channels, the respective data units that are output during a first predefined time frame on a selected one of the channels from the output port on the first communications switch responsive to the switch controller.

22. The method as in claim 21,
- wherein the plurality of input ports each receives data units over at least one of a plurality of incoming channels (j), and wherein the plurality of output ports each sends data units over at least one of a plurality of outgoing channels (l);
- wherein each of the incoming channels (j) has a unique time reference (UTR-j) that is independent of the CTR;
- wherein the (UTR-j) is divided into super cycles (SCs), time cycles (TCs), and time frames (TFs) of the same durations as the super cycles (SCs), time cycles (TCs), and time frames (TFs) of the CTR;
- wherein each of the super cycles (SCs), time cycles (TCs), and time frames (TFs) of the (UTR-j) start and end in time that is different than the respective start and end in time of the super cycles (SCs), time cycles (TCs), and time frames (TFs) of the CTR.

23. The method as in claim 22, further comprising:
- providing a plurality of buffer queues, wherein each of the respective buffer queues is associated, for each of the time frames with a unique combination of one of the incoming channels and one of the outgoing channels, wherein each of the buffer queues is further comprised of an alignment subsystem comprised of a plurality of time frame queues;
- logically mapping, for each of the (UTR-j) time frames at least one of selected said incoming channels (j) to at least one of selected said buffer queues;
- logically mapping, for each of the CTR time frames, selected ones of the plurality of buffer queues to at least one of selected said outgoing channels (l);
- determining when the respective time frame queue is empty;
- determining when the respective time frame queue is not empty;
- storing the data units that arrive via at least one of the said incoming channels (j) in the respective time frame queue of the alignment subsystem responsive to the logically mapping, and
- coupling selected ones of the time frame queues to respective ones of the outgoing channels (l), for transfer of the respective stored data units during the respective associated CTR time frames.

24. The method as in claim 23,
- transferring all of the data units associated with a respective first time frame into an empty first time frame queue from at least one of the said incoming channels (j), during the respective selected first time frame of the time frames (TFs) as was defined by the UTR-j, wherein the respective time frame queue is designated as full, responsive to the logically mapping;
  - wherein the alignment subsystem, responsive to the mapping controller, transfers data units out of a fill second time frame queue to at least one of the said outgoing channels (l), during a selected one of the time frames as was defined by UTC, wherein the second time frame queue is designated as empty.

25. The method as in claim 24, further comprising maintaining the first time frame queue and the second time frame queue as mutually exclusive at all times.

26. The method as in claim 24, wherein the time frame queues are comprised of at least two time frame queues.

27. The method as in claim 22, further comprising:
- providing an optical link with a plurality of optical channels as the communications link; and
- adding a delay element to a selected one of the input ports.

28. The method as in claim 27, further comprising:
- phase aligning the UTR-j with the CTR by adding a link delay equal to the difference between a beginning of the CTR time frame and a beginning of the UTR-j time frame, utilizing the delay element.

29. The method as in claim 27, providing phase alignment of a start of a respective one of the CTR time cycles relative to a start of a respective one of the UTR-j time cycles, utilizing the delay element.

30. The method as in claim 21, further comprising:

coupling the switching system input to the switching system output via a switching fabric.

31. The method as in claim 30, wherein the switching fabric is at least one of the following: a crossbar, a generalized multi-stage cube network, a Clos network, a Benes network, an Omega network, a Delta network, a multi-stage shuffle exchange network, a Banyan network, a combination of demultiplexers and multiplexers, and an optical switch.

32. The method as in claim 31,
wherein there are a plurality of the first communication switches;
wherein there are a plurality of the communications links;
wherein each of the communications links has a plurality of channels, each associated with a respective wavelength.

33. The method as in claim 32, further comprising:

coupling a first predefined subset of the channels for each respective one of the communications links from the respective communication link to a second defined one of the communications links.

34. The method as in claim 33, further comprising:

demultiplexing the first predefined subset into a predefined respective second predefined subset of the respective channels.

* * * * *